United States Patent
Sullivan et al.

(10) Patent No.: US 11,178,251 B2
(45) Date of Patent: Nov. 16, 2021

(54) METHODS, APPARATUSES AND COMPUTER PROGRAM PRODUCTS FOR MANAGING ORGANIZATION CONNECTIONS IN A GROUP-BASED COMMUNICATION SYSTEM

(71) Applicant: Slack Technologies, Inc., San Francisco, CA (US)

(72) Inventors: Christopher Sullivan, Wellesley, MA (US); Myles Grant, San Carlos, CA (US); Michael Demmer, San Francisco, CA (US); Shanan Delp, San Francisco, CA (US); Sri Vasamsetti, San Francisco, CA (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 17/159,811

(22) Filed: Jan. 27, 2021

(65) Prior Publication Data

US 2021/0258401 A1 Aug. 19, 2021

Related U.S. Application Data

(60) Provisional application No. 62/977,690, filed on Feb. 17, 2020.

(51) Int. Cl.
*H04L 29/08* (2006.01)
*G06F 16/23* (2019.01)
(Continued)

(52) U.S. Cl.
CPC ............. *H04L 67/32* (2013.01); *G06F 9/451* (2018.02); *G06F 16/2379* (2019.01); *G06F 21/60* (2013.01)

(58) Field of Classification Search
None
See application file for complete search history.

(56) References Cited

U.S. PATENT DOCUMENTS 10,346,378 B1\* 7/2019 Jones ................. G06F 16/2228
2002/0090934 A1\* 7/2002 Mitchelmore ...... H04L 41/5054
455/412.2

(Continued)

FOREIGN PATENT DOCUMENTS

CN 111756618 A 10/2020

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Charles E Anya
(74) *Attorney, Agent, or Firm* — Lee & Hayes, P.C.

(57) ABSTRACT

Managing organization disconnections from a shared resource of a communication platform is described. In a sharing approval repository of a communication platform, a shared resource can be associated with a host organization identifier and a non-host organization identifier. In an example, in response to receiving, from a user computing device associated with the host organization identifier or the non-host organization identifier, a resource disconnection request comprising a disconnecting organization identifier and a resource identifier associated with the shared resource, the sharing approval repository can be updated to add a disconnection indication for the resource identifier in association with the disconnecting organization identifier. The disconnection indication can restrict access, of users of a (Continued)

disconnected organization, to data associated with the shared resource that is stored in a live shared resource repository and can cause a static shared resource to be presented based on a selection input corresponding to the shared resource.

20 Claims, 21 Drawing Sheets

(51) Int. Cl.
    *G06F 9/451*     (2018.01)
    *G06F 21/60*     (2013.01)

(56) References Cited

U.S. PATENT DOCUMENTS

| | | | | |
|---|---|---|---|---|
| 2006/0224678 | A1* | 10/2006 | Hall | H04L 51/12 |
| | | | | 709/206 |
| 2017/0220285 | A1* | 8/2017 | Ikegaya | G06F 3/0665 |
| 2018/0287982 | A1 | 10/2018 | Draeger et al. | |
| 2019/0089686 | A1* | 3/2019 | Jung | H04W 12/0431 |
| 2019/0253430 | A1* | 8/2019 | Gamache | H04L 63/0815 |
| 2019/0324948 | A1 | 10/2019 | Xu et al. | |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

PCT Search Report and Written Opinion dated Mar. 31, 2021 for PCT Application No. PCT/US2021/015450, 13 pages.

* cited by examiner

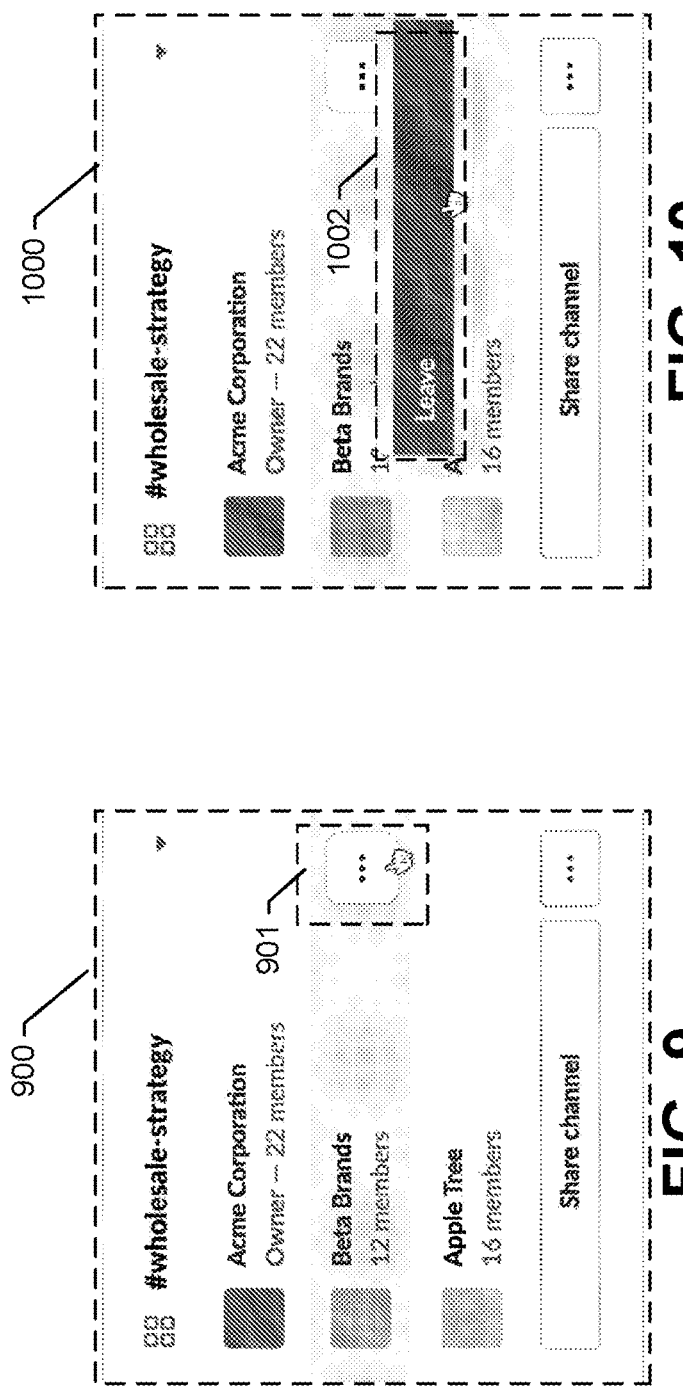

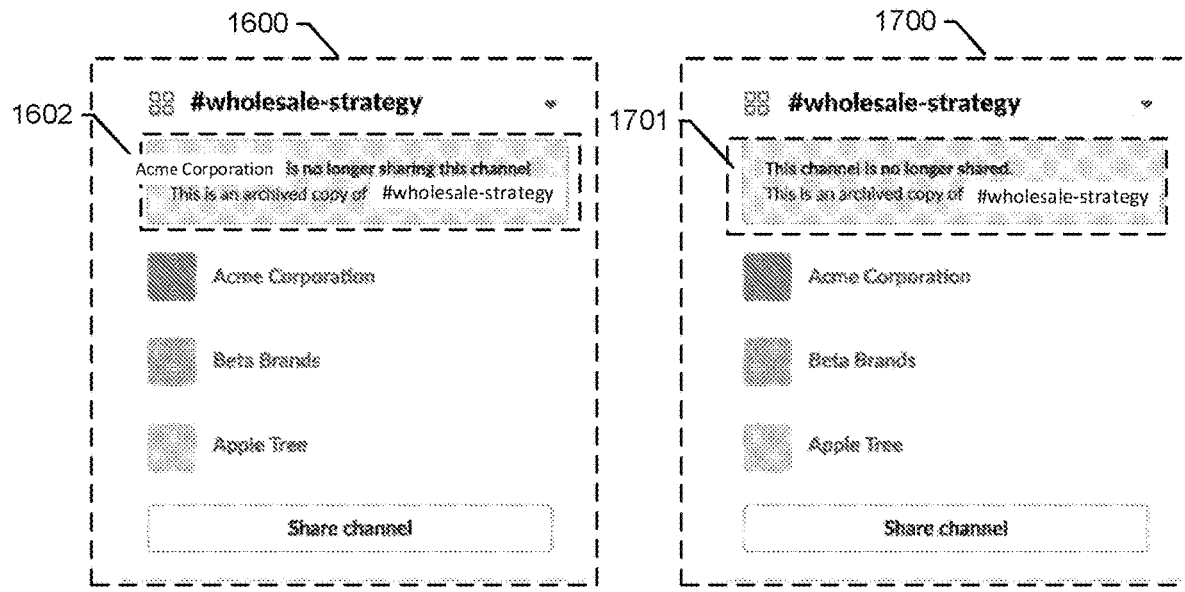
FIG. 16     FIG. 17
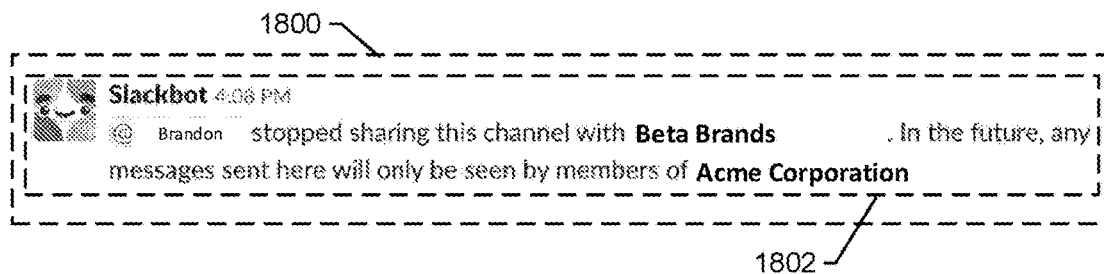
FIG. 18

METHODS, APPARATUSES AND COMPUTER PROGRAM PRODUCTS FOR MANAGING ORGANIZATION CONNECTIONS IN A GROUP-BASED COMMUNICATION SYSTEM

PRIORITY

This application claims priority to U.S. Provisional Application No. 62/977,690, filed on Feb. 17, 2020, the entire contents of which are incorporated by reference herein.

BACKGROUND

It is desirable to maintain privacy protocols over information posted to resources of a communication platform. That is, individual organizations have an expectation that, in using the communication platform, their data and communications is/are secure and private such that users of other organizations are not able to access their data and communications. With resources shared between multiple organizations, privacy and security are particularly important.

BRIEF DESCRIPTION OF THE DRAWINGS

Various embodiments of the present disclosure are described more fully hereinafter with reference to the accompanying drawings, in which some, but not all embodiments of the disclosure are shown.

FIGS. 5-14 are example illustrations showing example elements associated with example group-based communication interfaces in accordance with some examples of the present disclosure;

FIGS. 16-18 are example illustrations showing example elements associated with example group-based communication interfaces in accordance with some examples of the present disclosure;

The drawings are not drawn to scale and like numbers refer to like elements throughout.

DETAILED DESCRIPTION OF VARIOUS EMBODIMENTS

Figure 1:
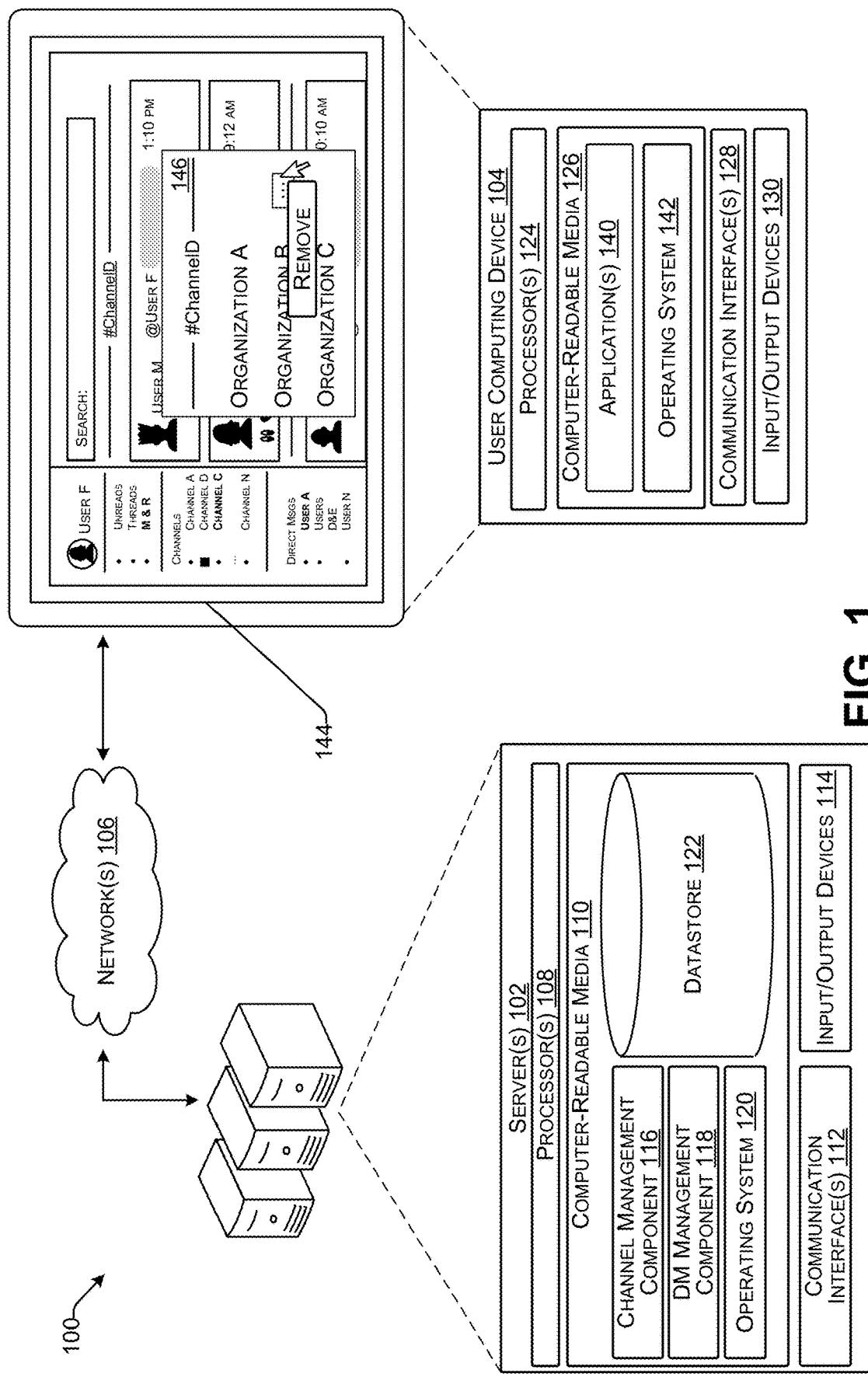
FIG. 1 is an example environment for performing techniques described in the present disclosure.

Managing organization connections to resources of a communication platform is described. In at least one example, the communication platform can be a channel-based communication system, a permission-based communication system, a channel-based messaging system, and/or any other system for facilitating communication between and among groups of users. Users of the communication platform can collaborate and/or communicate via resources of the communication platform. Resources can include channels, direct messages, workspaces, boards, and/or the like, each of which are described in more detail below. In some examples, access to such resources can be "group-based," such that resources have security (that can be defined by permissions) to limit access to defined groups of users. In some examples, groups of users can be defined by identifiers (e.g., group identifiers), which can be associated with common access credentials, domains, or the like. Resources that are shared between two or more groups can be referred to as "shared resources." That is, for the purpose of this discussion, a shared resource can comprise any resource, as described herein, that is shared between two or more groups. A shared resource, therefore, can comprise a channel shared between two or more groups, a direct message between users of two or more groups, a workspace shared between two or more groups, a board shared between two or more groups, and/or the like. Techniques described herein relate to management of connections, disconnections, and reconnections of groups and/or users associated therewith to shared resources of the communication platform.

In an example, communication and collaboration can occur in a communication platform via messages that are posted to channels, direct messages, and/or other virtual spaces. In at least one example, a channel can comprise a virtual communications environment or feed that is configured to display messages posted by channel members (e.g., validated users accessing the environment using user computing devices) that are viewable only to the members (or guests) of the channel. The format of the channel can appear differently to different members of the channel; however, in some examples, the content of the channel (i.e., messages) can be displayed to each member of the channel based on common message data from a live shared resource repository of a group-based communication repository, as described herein.

Users of the communication platform can join channels. Some channels can be globally accessible to those users having a particular group identifier associated with their user profile (i.e., users who are members of a specific team or organization). Access to some channels can be restricted to members of specified groups, whereby the channels are accessible to those users having a particular group identifier associated with their user profile. The channel identifier can be used to facilitate access control for a message (e.g., access to the message can be restricted to those users having the channel identifier associated with their user profile, or who have the ability to join the channel). The channel identifier can be used to determine context for the message (e.g., a description of the channel, such as a description of a project discussed in the channel, can be associated with the channel identifier).

In an example, the communication platform can be configured to support several group-based communication workspaces (e.g., a sales group-based communication workspace, an engineering group-based communication workspace, etc.) for a particular organization or group of organizations with each workspace having a plurality of channels (e.g., a sales channels for the sales group-based communication workspace, engineering channels for the engineering group-based communication workspace, etc.). That is, a group-based communication workspace can comprise a virtual communication environment configured to facilitate user interaction with the communication platform. In at least one example, a collection of channels can form a group-based communication workspace. In at least one example, user profiles sharing a common group identifier form part of a common group-based communication workspace. That is, each group-based communication workspace can be accessible and viewable (via a user interface) to a select group of users, such as a group of employees of a business or organization (e.g., an ACME Corporation interface would be accessible and viewable to the ACME employees, however the BETA Corporation group-based communication workspace would not be accessible and viewable to ACME employees). Each group-based communication workspace can include one or more channels (e.g., a marketing channel, sales channel, accounting channel, etc.), which are defined herein. In an example, a series of marketing focused channels can form a marketing group-based communication workspace for a particular organization (e.g., ACME Corporation) and user profiles associated with a group identifier corresponding to the marketing group-based communication workspace can be associated with the marketing group-based communication workspace.

In some examples, there are different types of channels, some of which can be shared externally. Some channels, which can be internal channels, can comprise a type of a channel having members affiliated with the same group (e.g., a same organization or a same workspace). In this regard, an internal channel can be accessible and viewable by users associated with a common group identifier. A shared channel (or an "externally shared channel") can comprise a type of channel having members affiliated with different groups (e.g., different organizations or different workspaces). In this regard, a shared channel can be accessible and viewable by users associated with different group identifiers.

In some examples, collaboration and communication can occur in shared channels. For example, when a user, Brandon, from ACME Corporation, intends to collaborate or share data with another user, Lisa, from Beta Brand, and another user, John, from Apple Tree Inc., Brandon can create a shared channel (e.g., #wholesale-strategy) structured in accordance with various examples for this purpose. Once membership for Lisa and John has been validated through an authorization and confirmation process administered by an administrator (an "admin administered authorization and confirmation process"), Brandon, Lisa, and John can freely communicate and collaborate via the #wholesale-strategy channel (even though they are associated with different organizations). Multiple additional member users from ACME Corporation, Beta Brand, Apple Tree Inc., and/or any other organizations can be added through similar admin administered authorization and confirmation processes.

It is desirable to maintain privacy protocols over information posted to shared channels and associated group-based communication workspaces. That is, individual organizations have an expectation that, in using the communication platform, their data and communications is/are secure and private such that users of other organizations are not able to access their data and communications. With shared channels, privacy and security are a top priority. Thus, connection (e.g., the addition of a group to a channel hosted by another group), disconnection (e.g., the removal of a group from a channel shared with multiple groups), and/or reconnection (e.g., rejoinder of a group to a channel hosted by another group) must be closely but efficiently managed.

Techniques described herein are applicable beyond shared channels. That is, techniques described herein are applicable to any sharable and/or shared resource associated with the communication platform. As described herein, such techniques can be applicable to channels, direct messages, workspaces, boards, and/or the like. As such, techniques described herein relate to the connection, disconnection, and/or reconnection of groups and/or associated users to sharable and/or shared resources of the communication platform.

A resource, as used herein, can refer to virtual spaces that users can utilize and/or share for group-based communication. Examples of resources include channels, direct messages, workspaces, boards, sets of the aforementioned channels, direct messages, workspaces, boards, and/or the like. A resource is "sharable" based at least in part on having been created as a sharable resource. For example, a resource sharing interface request, which can be a demand or instruction created by a user computing device upon user engagement with an interface element associated with creating a shared resource, can trigger the configuration of a resource as a sharable resource. In some examples, the resource sharing interface request can include a sending user identifier associated with the user who initiated the resource sharing interface request and a resource identifier associated with a resource to be shared. In at least one example, if a resource sharing interface request is associated with a channel, the request can be a channel sharing interface request.

In at least one example, the term "shared resource," as used herein, can refer to a resource associated with different group identifiers and/or user identifiers affiliated with different group identifiers. In this regard, a shared resource can be accessible and viewable by users having user computing devices associated with different group identifiers. A shared resource can be generated in an instance in which a sharing approval indication is added to a sharing approval repository associated with the resource identifier of the resource. A resource identifier can comprise one or more items of data by which a particular resource within the communication platform can be identified. For example, a resource identifier can comprise ASCII text, a pointer, a memory address, and the like. Examples of resource identifiers include communication channel identifiers, direct message identifiers, workspace identifiers, board identifiers, and/or the like.

In some examples, when new groups are connected to a shared resource, administrative users ("admin users") from such joining groups can effectively apply data retention settings to messages or other data that originate from their groups without disturbing messages or other data from other member groups. Such other member messages or other data are managed by data retention settings set by their respective group admin users. For example, in the #wholesale-strategy channel, described above, an admin user for ACME Corporation can establish data retention settings for messages and/or other data posted by ACME Corporation members (e.g., Brandon), an admin user for Beta Brand can establish data retention settings for messages and/or other data posted by Beta Brand members (e.g., Lisa), and an admin user for Apple Tree Inc. can establish data retention settings for messages and/or other data posted by Apple Tree Inc. members (e.g., John). As such, messages associated with each of the users and/or associated groups in the shared resource can be managed based on their established data retention settings. This can provide differentiated security and privacy for different groups that are connected to a shared resource.

It is also desirable to manage disconnections of groups and group members from shared resources in a manner that respects channel integrity, minimizes privacy risks, and creates a positive user experience. As such, when a user disconnects from a shared resource, the user and/or the group associated therewith (and other member users), can be permitted to access a static shared resource, as the shared resource existed at the time of disconnection. The static shared resource can be a "static view," an "archived view," a "frozen view," a "read-only view," or the like of the shared resource—that is the static shared resource can be a copy of live data associated with the shared resource at the time of disconnection. Users and/or groups (and other members users) that remain connected with the shared resource can continue to communicate and collaborate without interruption. For example, when Lisa either alone or on behalf of all Beta Brand users disconnects from the #wholesale-strategy channel, various examples discussed herein enable disconnecting users from Beta Brand to retain a static view of the #wholesale-strategy channel as it existed at the time of disconnection while connected members (e.g., Brandon, John, etc.) are enabled to continue communicating and collaborating without interruption. As will be discussed in detail below, various examples accomplish this result by serving shared resources (e.g., the #wholesale-strategy channel) for connected member users from a live shared resource repository while disconnected member users are directed to a static shared resource (e.g., a static copy of the #wholesale-strategy channel) served from a static shared resource repository.

In some examples, users can reconnect (or rejoin) shared resources after completing an admin administered authorization and confirmation process. Upon reconnecting with a shared resource, a user can be permitted to access all messages and/or other data associated with the shared resource (e.g., even those posted by other users associated with the shared resource while the user was not connected to the shared resource). In such an example, the user can be redirected from the static view of the shared resource to the live shared resource. For example, should Lisa, in the scenario described above, wish to reconnect to the #wholesale-strategy channel, she can do so after completing an admin administered authorization and confirmation process. Once the admin administered authorization and confirmation process is complete, in various examples discussed herein, Lisa can be afforded access to all messages of the #wholesale-strategy channel including those posted by Brandon or John during her disconnection period. As such, Lisa would be directed from the static copy of the #wholesale-strategy channel and reconnected to the live #wholesale-strategy channel so that she might reengage in communication and collaboration with Brandon and John. In some examples, the ability to reconnect to a shared resource can be limited to users associated with the host organization or group (originally or as reassigned). In some examples, a user that reconnects to a shared resource can receive live updates from the time that they reconnect.

In some examples, membership of the shared resource can change between when a user disconnects with the shared resource and reconnects with the shared resource. That is, a user can reconnect with a shared resource with which it was previously a member of regardless of whether the groups associated with the shared resource are the same as when the user left or different (so long as the group of the user is still a member of the shared resource). As such, in some examples, when the user reconnects, the shared resource can be associated with a same set of groups or a different set of groups.

Systems structured in accordance with various examples of the invention provide specific, technical solutions to technical problems faced by existing systems, the details of which are described hereinafter.

FIG. 1 illustrates an example environment 100 for performing techniques described herein, which relate to managing connections, disconnections, and/or reconnections of sharable and/or shared resources. In at least one example, the example environment 100 can include one or more server computing devices (or "server(s)") 102. In at least one example, the server(s) 102 can include one or more computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange messages and/or other data. In some examples, the communication platform can be a hub, offering a secure and private virtual space to enable users to chat, meet, call, collaborate, transfer files or other data, message, or otherwise communicate between or among each other. In at least one example, the communication platform can be "group-based" such that the platform, and associated systems, channels, messages, and/or virtual spaces, have security (that can be defined by permissions) to limit access to defined groups of users. Access can be facilitated by a validated request to join or an invitation to join transmitted by one group member user to another non-member user.

In some examples, groups of users can be defined by identifiers (e.g., group identifiers), which can be associated with common access credentials, domains, or the like. In at least one example, group identifiers can be used to associate data, information, messages, users, channels, etc., with specific groups of a communication platform as defined below. Each group identifier can be one or more items of data by which a group within the communication platform can be identified. For example, a group identifier can comprise ASCII text, a pointer, a memory address, and the like. In one example, a group identifier can be stored as a 64-bit unsigned integer and represented externally (outside of memory) as a base-34 encoded string. In another example, the group identifier can comprise a combination of ASCII characters. Group identifiers can be used to distinguish user access to channels, messages, files, members, etc.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. An organization identifier, as used herein, can refer to one or more items of data by which an organization within the communication platform can be uniquely identified. In embodiments, differing organizations as referenced herein refer to different enterprises, companies, or corporations (e.g., ACME Corporation v. BETA Corporation) with different information technology infrastructures (e.g., network security protocols, firewalls), admin users, information technology policies, and the like. An organization identifier can comprise ASCII text, a pointer, a memory address, and the like. A single organization can be associated with multiple workspaces within the group-based communication system 105. Thus, a given user can be associated with an organization identifier (i.e., for ACME Corporation) and multiple workspace identifiers (i.e., the engineering workspace, the new innovations workspace, etc.).

In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a workspace can be associated with multiple organizations.

In the context of shared resources as discussed herein, group identifiers can have two types: a host group identifier and a non-host group identifier. A host group identifier can be associated with the group that created the shared resource while a non-host group identifier can be associated with any group that joined the shared communication after it was created. As discussed in detail below, a shared resource can be associated with one or more non-host group identifiers but only one host group identifier. In an example where a group refers to an organization, a host organization identifier can be associated with the organization that created the shared resource while a non-host organization identifier can be associated with any organization that joined the shared communication after it was created. As discussed in detail below, a shared resource can be associated with a host organization identifier and one or more non-host organization identifiers.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (TOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices.

In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.). In at least one example, a user can be associated with a user identifier, which can comprise one or more items of data by which a user and the user's corresponding user profile can be identified within the communication platform. For example, a user identifier can comprise ASCII text, a pointer, a memory address, or other unique identifier. For the purpose of this discussion, a "user profile" can comprise information of the communication platform that is associated with a user, including, for example, a user identifier, a role identifier, one or more channel identifiers associated with channels that the user has been granted access to, one or more group identifiers for groups with which the user is associated, an indication as to whether the user is an owner or host of any channels, an indication as to whether the user has any channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user profile details can include a subset designation of user credentials, such as, for example, login information for the user including the user's username and password.

A role identifier, as used herein, can refer to one or more items of data by which a role of a user can be identified and is associated with a user profile. A role of a user can refer to the status of the user within the channel, the organization associated with the user or group, or other type of role. For example, a channel comprising users associated with a particular commercial organization can comprise roles such as "employee," "associate," "client," "supervisor," and the like. For example, a role identifier can comprise ASCII text, a pointer, a memory address, or other unique identifier.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

Data and information (including but not limited to, messages, search queries, etc.) can be sent to the server(s) 102 via, for example, the network(s) 106 directly by a user computing device, such as the user computing device 104. Additionally, or alternatively, data and information can be sent to the server(s) 102 via one or more intermediaries. That is, where a computing device is described herein to receive data from another computing device, it will be appreciated that the data can be received directly from another computing device or can be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data can be transmitted directly to another computing device or can be transmitted indirectly via one or more intermediary computing devices, such as, for example, one or more servers, relays, routers, network access points, base stations, hosts, and/or the like.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a channel management component 116, a direct message management component 118, an operating system 120, and a datastore 122. In some examples, the server(s) 102 can include additional or alternative functional components which can be used to manage additional or alternative resources (e.g., boards, workspaces, etc.), as described herein.

In at least one example, the channel management component 116 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform. In at least one example, a channel can be associated with a channel identifier. A channel identifier can comprise one or more items of data by which a channel can be identified. For example, a channel identifier can comprise ASCII text, a pointer, a memory address, and the like.

In at least one example, message communications can be exchanged via the communication platform (e.g., via channels, direct messages, and/or the like). A "message" or "message communication" can refer to any electronically generated digital object provided by a user using the user computing device 104 and that is configured for display within a channel and/or other virtual space for facilitating communications (e.g., a virtual space associated with direct message communication(s), etc.) as described herein. In some examples, messages can be automatically generated. A message can include any text, image, video, audio, or combination. In at least one example, a user can provide a message that includes text, as well as an image and a video, within the message as message contents. In such an example, the text, image, and video would comprise the message. Each message can include metadata comprising a sending user identifier, a message identifier, message contents, a group identifier, a channel identifier, or the like. In some examples, message metadata also comprises a timestamp that identifies the time that a message was transmitted (i.e., sent) or posted to a channel, direct message, board, workspace, etc. In at least one example, each of the foregoing identifiers can comprise American Standard Code for Information Interchange (ASCII) text, a pointer, a memory address, or the like. Such message metadata can be used to index, render, query, or organize messages within the communication platform. In addition to message metadata, messages can also include body content data that comprises text, an image, a file, video, or the like. For example, as graphical objects are added or appended to a selected message communication (e.g., as emojis or reactions), the communication platform can add graphical object identifiers associated with such added graphical objects to the message metadata associated with the selected message.

In some examples, a sending user identifier can be associated with the message. A sending user identifier can comprise ASCII text, a pointer, a memory address, and the like, which can refer to a particular user or user computing device 104 that sent the message. In one example, a message can be parsed (e.g., using PRP commands) to determine a sending user identifier of the user who sent or posted the message. In some examples, such sending user identifiers can correlate to target user identifiers in circumstances where an operating user is intending to view a series of messages posted by another user. Additionally, or alternatively, topics can be associated with the message. In one implementation, the message contents can be parsed (e.g., using PHP commands) to determine topics discussed in the message. For example, hashtags in the message can indicate topics associated with the message. In another example, the message can be analyzed (e.g., by itself, with other messages in a conversation primitive) or parsed using a machine learning technique, such as topic modeling, to determine topics associated with the message.

In some examples, attachments can be included with a message. If there is an attachment, files can be associated with the message. In at least one example, the message can be parsed (e.g., using PHP commands) to determine a file name of the attachment. For example, file contents can be analyzed to determine context for the message (e.g., a patent policy document can indicate that the message is associated with the topic "patents").

In some examples, third party metadata can be associated with the message. For example, third party metadata can provide additional context regarding the message or the user that is specific to a company, group, channel, and/or the like. In one implementation, the message can be parsed (e.g., using PHP commands) to determine third party metadata.

Users of the communication platform can interact with messages in various ways. In some examples, a user can comment on a message in a "thread." A thread can be a message associated with another message that is not posted to a channel, but instead is maintained within an object associated with the original message. Messages and/or threads can be associated with file(s), emoji(s), application (s), etc. Such thread responses can be associated with messages as metadata or the like.

In some examples, responses to messages can include reactions (e.g., selection of an emoji associated with the message, selection of a "like" button associated with the message), clicking on a hyperlink embedded in the message, replying to the message (e.g., posting a message to the channel in response to the message), downloading a file associated with the message, sharing the message from one channel to another channel, pinning the message, starring the message, and/or the like. In one example, data regarding a response to a message by another user can be included with the message, and the message can be parsed (e.g., using PHP commands) to determine the response. In another example, data regarding responses to the message can be retrieved from storage repository.

In at least one example, data regarding response(s) to a message can be used to determine context for the message (e.g., a social score for the message from the perspective of an operating user). In another example, data regarding responses to the message can be analyzed to determine context regarding the user (e.g., the user's expertise in a topic can be determined based on the responses to the user's message regarding the topic).

Additionally, or alternatively, a conversation primitive can be associated with the message. In one example, a conversation primitive is an element used to analyze, index, store, and/or the like messages. In at least one example, the message can be analyzed by itself, and can form its own conversation primitive. In another example, the message can be analyzed along with other messages that make up a conversation, and the messages that make up the conversation can form a conversation primitive. In one example, the conversation primitive can be determined as the message, a specified number (e.g., two) of preceding messages and a specified number (e.g., two) of following messages. In another implementation, the conversation primitive can be determined based on analysis of topics discussed in the message and other messages (e.g., in the channel) and/or proximity (e.g., message send order proximity, message send time proximity) of the messages.

Additionally, or alternatively, various metadata, determined as described above, and/or the contents of the message can be used to index the message (e.g., using the conversation primitive) to facilitate various facets of searching (i.e., search queries that return results from the datastore 122).

In some examples, a channel can be "public," which can allow any user within a group (e.g., associated with an organization identifier, associated with a workspace identifier, etc.) with which the channel is associated to join and participate in the data sharing through the channel. In some examples, a channel can be "private," which can restrict data communications in the channel to certain users or users having particular roles (e.g., managers, administrators, etc.) and/or types (e.g., verified, etc.). In some examples, a channel can be "shared," which can allow users associated with two or more different groups (e.g., entities associated with two or more different organization and/or workspace identifiers) to join and participate in the data sharing through the channel. A shared channel can be public such that it is accessible to any user of groups associated with the shared channel, or can be private such that it is restricted to access by certain users or users having particular roles and/or types. A shared channel can be shared externally (e.g., with different group identifiers). In some examples, a channel can be an "internal" channel indicating that the channel is associated with a single group identifier.

A "shared channel," which can also be referred to as an "externally shared channel," can enable two or more organizations, such as a first organization and a second organization to share data, exchange communications, and the like. In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of a shared channel. In some examples, a shared channel can be shared with one or more different organizations that, without having a shared communication, would not otherwise have access to each other's data by the nature of the permission-based and/or group-based configuration of the communication platform described herein. In at least one example, the channel management component 116 can manage shared channel membership using techniques described herein. More specifically, the channel management component 116 can utilize data or other information stored in the datastore 122 to determine and/or otherwise manage sharing approvals (or denials), connections, disconnections, and/or reconnections. Additional details are described below.

In at least one example, the channel management component 116 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the channel management component 116 can establish a channel between and among various user computing devices associated with user identifiers associated with the channel, allowing the user computing devices to communicate and share data between and among each other. As described herein, in some examples, such communication and/or sharing of data can be via one or more messages that can be exchanged via a channel. In at least one example, the channel management component 116 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions and/or messages permitted in the channel, which user(s) and/or type(s) of users are permitted to add or remove members, which user(s) and/or types of users are permitted to share the channel with other users, a retention policy associated with data in the channel, whether the channel is public or private, or the like.

In at least one example, the direct message (DM) management component 118 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform. In some examples, a direct message can be a private message between two or more users of the communication platform. In some examples, a direct message can be "shared," which can allow users associated with two or more different groups (e.g., entities associated with two or more different organization and/or workspace identifiers) to join and participate in the data sharing through the direct message.

In at least one example, the direct message management component 118 can receive a request to generate a direct message. In some examples, the request can include identifiers associated with one or more users that are intended recipient(s) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message management component 118 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user computing device 104. The datastore 122 can comprise one or multiple databases. Additional details associated with the datastore 122 are described below with reference to FIG. 2.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, APIs (e.g., using API calls), HypterText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

As described above, users of the communication platform can access services of the communication platform via user computing devices. The user computing device 104 is provided as an example of a user computing device that a user can use to access services of the communication platform. In at least one example, the user computing device 104 can be associated with a user identifier. For example, in the context of the ACME Corporation example discussed above, if the Brandon accesses the communication platform via the user computing device 104 (for example, through an app or a web browser), the user computing device 104 can be associated with the user identifier corresponding to Brandon's user profile.

While a single user computing device 104 is illustrated, as noted above, in practice, multiple user computing devices can be associated with the environment 100. In some examples, individual of the user computing devices can be associated with different organizations. In some examples, the user computing device 104 can be associated with an organization identifier. In continuing from the above example, ACME Corporation can be assigned organization identifier 12345, Beta Brand can be assigned organization identifier 98765, and Apple Tree Inc. can be assigned organization identifier 00005. When Brandon operates the user computing device 104 to access the communication platform, the user computing device 104 can be associated with organization identifier 12345 corresponding to ACME Corporation.

In at least one example, the user computing device 104 can include one or more processors 124, computer-readable media 126, one or more communication interfaces 128, and input/output devices 130.

In at least one example, each processor of the processor(s) 124 can be a single processing unit or multiple processing units, and can include single or multiple computing units or multiple processing cores. The processor(s) 124 can comprise any of the types of processors described above with reference to the processor(s) 108 and can be the same as or different than the processor(s) 108.

The computer-readable media 126 can comprise any of the types of computer-readable media 126 described above with reference to the computer-readable media 110 and can be the same as or different than the computer-readable media 110. Functional components stored in the computer-readable media can optionally include application(s) 132 and an operating system 134.

In at least one example, the application(s) 132 can be one or more of a mobile application, a web application, or a desktop application, which can be provided by the communication platform or which can be an otherwise dedicated application. In at least one example, an application of the application(s) 132 can be a native application associated with the communication platform. In some examples, individual user computing devices associated with the environment 100 can have an instance or versioned instance of such an application (e.g., the native application), which can be downloaded from an application store, accessible via the Internet, or otherwise executable by the processor(s) 124 to perform operations as described herein. That is, in at least one example, reference to an application on the user computing device 104 can be an instance of the application.

In at least one example, an application of the application(s) 132 can be an access point, enabling the user computing device 104 to interact with the server(s) 102 to access and/or use communication services available via the communication platform. In some examples, an application of the application(s) 132 can be a web browser by which a user can access communication services provided by the communication platform as described herein. In some examples, an application of the application(s) 132 can be a dedicated application associated with the communication platform as described herein. In at least one example, the application(s) 132 can facilitate the exchange of data between and among various other user computing devices, for example via the server(s) 102. In at least one example, the application(s) 132 can present user interface(s), as described herein. In at least one example, a user can interact with the user interface(s) via touch input, keyboard input, mouse input, spoken input, or any other type of input.

A non-limiting example of a user interface 144 is shown in FIG. 1. Additional details associated with the user interface 144 are described below with reference to FIG. 3. In at least one example, the user interface 144 can present a disconnection authorization interface 146 that can enable a member of a shared resource to remove another organization, for example, from the shared resource and/or to remove itself from the shared resource. Additional details associated with disconnection authorization interfaces are described below. In some examples, the user interface 144 can present a connection authorization interface, a reconnection authorization interface, user interface(s) for facilitating authorization and confirmation process(es), and/or the like.

In at least one example, the operating system 134 can manage the processor(s) 124, computer-readable media 126, hardware, software, etc. of the user computing device 104.

The communication interface(s) 128 can include one or more interfaces and hardware components for enabling communication with various other devices (e.g., the user computing device 104), such as over the network(s) 106 or directly. In some examples, the communication interface(s) 128 can facilitate communication via Websockets, APIs (e.g., using API calls), HTTPs, etc.

The user computing device 104 can further be equipped with various input/output devices 130 (e.g., I/O devices). Such I/O devices 130 can include a display, various user interface controls (e.g., buttons, joystick, keyboard, mouse, touch screen, etc.), audio speakers, connection ports and so forth.

Figure 2:
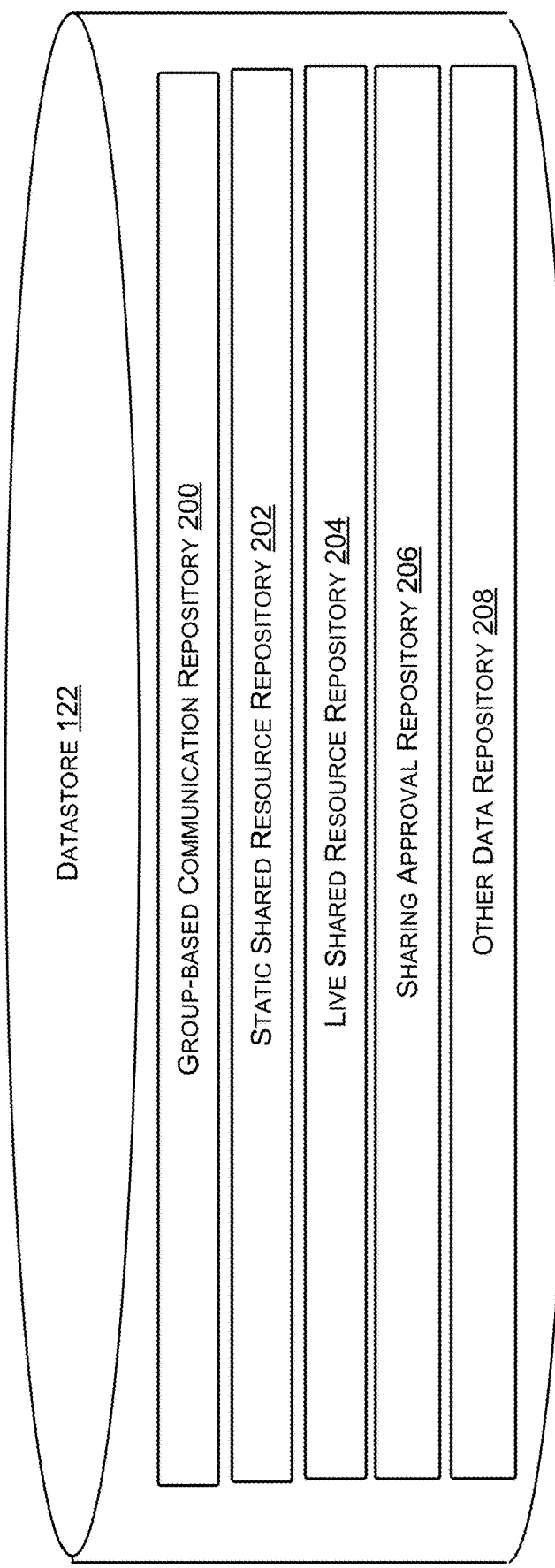
FIG. 2 is an example of a datastore associated with the example environment.

FIG. 2 illustrates additional details associated with the datastore 122. The datastore 122 can comprise one or more repositories, which can include, but are not limited to as the group-based communication repository 200, the static shared resource repository 202, the live shared resource repository 204, the sharing approval repository 206, and a repository for other data (e.g., other data repository 208). In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user computing device 104, via the network(s) 106. In some examples, individual of the repositories shown can be combined or separated.

Individual of the repositories described herein can store table data. The term "table data" can refer to data associated with a resource identifier stored in tabular form. The table data comprises data associated with the resource identifier and can include one or more user identifiers, one or more admin user identifiers, a sharing approval indication, one or more organization identifiers, one or more timestamps, and/or data associated with one or more policies associated with the resource identifier. In some examples, the table data can indicate that two or more organization identifiers can be associated with a resource identifier corresponding to a shared resource. In this example, these two or more organizations can be member organizations of the shared resource, and members from these organizations can exchange messaging communications with one another through the shared resource.

In at least one example, the group-based communication repository 200 can store electronic data relating to user interactions with the communication platform. In at least one example, the group-based communication repository 200 can store data and instructions to serve and support a plurality of shared resources and associated data and/or communications, including but not limited to, a plurality of messages, requests, invitations, communications, user identifiers, files, data and/or information that are received from, transmitted to, and/or exchanged between user computing devices as described herein. The group-based communication repository 200 can be dynamically updated or can be static. For example, table data associated with the group-based communication repository 200 can be uploaded to the group-based communication repository 200 simultaneously with the generation of a shared resource interface request and/or generation of a confirmation indication associated with the shared resource interface request. Alternatively, data may not be uploaded simultaneously upon generation and instead can be batch uploaded based on other factors, such as based on time intervals (e.g., uploads occur every 15 minutes), user initiation (e.g., user can press a button to initiate the upload), or the like. The group-based communication repository 200 can be encrypted in order to limit unauthorized access of data and associated engagement data.

In some examples, a component of the server(s) 102 can create a storage message based upon a received message to facilitate message indexing and storage in the group-based communication repository 200. In some examples, the storage message can include one or more index objects. Additionally, or alternatively, the storage message can include data such as a message identifier, a group identifier, a channel identifier, a sending user identifier, topics, responses, message contents, attachments, message hierarchy data, a thread identifier, third party metadata, conversation primitive data, and/or the like. In at least one example, a storage message can facilitate indexing in the group-based communication repository 200. In some examples, metadata associated with a message can be determined and the message can be indexed in the group-based communication repository 200. In one example, the message can be indexed such that a group's messages are indexed separately (e.g., in a separate index associated with the group and/or company that is not shared with other groups and/or companies). In at least one example, messages can be indexed at a separate distributed repository (e.g., to facilitate data isolation for security purposes). If there are attachments associated with the message, file contents of the associated files can be used to index such files in the group-based communication repository 200 to facilitate searching. In one example, the files can be indexed such that an organization's or a group's files are indexed at a separate distributed repository.

In at least one example, the static shared resource repository 202 can store messages, files, objects, links, and other data that supports viewing of a defined set of messages and other collaboration that occurred as of a disconnection time in association with a shared resource. That is, the static shared resource repository 202 can store copies of portions of the live shared resource repository 204 that correspond to shared resources, at particular times (e.g., at a time when a user and/or group disconnects therefrom). In at least one example, such copies can be used to generate static shared resources representative of shared resources at times when users and/or groups disconnect therefrom. In at least one example, user computing devices operating in connection with the communication platform can be configured to render user interfaces that include or otherwise embody a static shared resource (i.e., a static copy of a shared resource) based on data and instructions stored to the static shared resource repository 202. In some examples, the channel management component 116 can generate a static shared resource based at least in part on a portion of the live shared communication repository 204 associated with the shared resource. That is, the static shared resource can be a copy of a portion of the live shared communication repository 204 associated with the shared resource, which can be stored in the static shared resource repository 202. In at least one example, the channel management component 116 can provide a static shared resource to a user associated with the disconnected organization instead of a live version of the shared resource (i.e., served from the live shared communication repository 204) in response to access requests.

In at least one example, the live shared resource repository 204 can store messages, files, objects, links, and other data that supports messages and other collaboration occurring in association with a shared resource (i.e., in real-time, or near real-time). The live shared resource repository 204 can include a corpus of common resource data ("common resource data") that is available to and used by user computing devices of member users associated with a particular shared resource. Such common resource data includes all content of the shared resource such as messages, files, objects, and the like. Common resource data can be queried or otherwise partitioned based on organization identifier to isolate channel data that has been contributed by each respective member organization of the shared resource. Such queried or partitioned data sets are referred to herein as "member organization resource data."

In at least one example, the sharing approval repository 206 can store data for tracking connections and disconnections for group-based resources. That is, the sharing approval repository 206 comprises information to facilitate membership, connection, disconnection, and reconnection operations of the communication platform. In at least one example, the sharing approval repository 206 can be a table that is configured for storing sharing approval indications, sharing denial indications, disconnection indications, and/or reconnection indications correlated to specific user identifiers and/or organization identifiers for individual resources associated with the communication platform.

The sharing approval repository 206 can include, without limitation, sharing approval indications associated with the communication platform. A sharing approval indication can comprise an indicator, such as a flag, stored in the sharing approval repository 206. A sharing approval indication can be stored in association with a resource identifier (e.g., a channel identifier) and a particular user identifier and/or group identifier to indicate that such user and/or group is approved for validated access to the associated shared resource. That is, a sharing approval indication can be associated with a channel identifier or another identifier of a particular shared resource. A sharing approval indication can be stored in the sharing approval repository 206 in response to receiving one or more authorization confirmations from one or more admin user computing devices. In at least one example, the sharing approval indication can be associated with an approval timestamp, which can represent a date on which an associated shared resource candidate request was approved by one or more admin users. In some examples, the sharing approval indication can comprise an approval timestamp. In at least one example, the presence of a sharing approval indication can indicate that a channel associated with the channel identifier and/or resource associated with the particular resource identifier is shared between two or more groups (e.g., groups identifiers).

A sharing denial indication, which can be stored in the sharing approval repository 206, can be stored in association with a resource identifier and a particular user identifier and/or group identifier to indicate that such user and/or group has been denied access to the shared resource. That is, a sharing denial indication can be associated with a channel identifier or another identifier of a particular shared resource. In at least one example, the sharing denial indication can be associated with a timestamp, which can represent a date on which access to an associated shared resource candidate request was denied by one or more admin users. In some examples, the sharing denial indication can comprise a timestamp. In at least one example, the presence of a sharing denial indication can indicate that a channel associated with the channel identifier and/or resource associated with the particular resource identifier is not shared between two or more groups (e.g., group identifiers).

A disconnection indication, which can be stored in the sharing approval repository 206, can refer to an indication of a resource disconnection request. A resource disconnection request can refer to a demand or instruction that is generated by a user computing device 104 and transmitted to the server(s) 102 for triggering disconnection of a particular user and/or group from a shared resource. The resource disconnection request can include a disconnecting group identifier ("disconnecting group identifier") and a resource identifier associated with the shared resource. In some examples, a resource disconnection request includes a disconnecting user identifier. Of course, if the group is an organization, such a request can be associated with a disconnecting organization identifier.

A reconnection indication, which can be stored in the sharing approval repository 206, can refer to an indication that a resource reconnection request is approved. A resource reconnection request can refer to a demand or instruction that is generated by a user computing device 104 and transmitted to the server(s) 102 for triggering reconnection of a particular user and/or group to a shared resource. The resource reconnection request can include a disconnecting group identifier and a resource identifier associated with the shared resource. In some examples, a resource reconnection request can include a disconnecting user identifier. In some examples, a resource reconnection request can trigger an authorization interface to be rendered to a user computing device 104 associated with an admin user so as to confirm and approve connection to the shared resource. If reconnection is approved (i.e., based on a confirmation indication), a reconnection indication can be stored to the sharing approval repository 206 in association with the disconnecting group identifier and the resource identifier for the shared resource.

The other data repository 208 can store data user data, channel data, direct message data, permission data, etc. In at least one example, the user data can store data associated with users of the communication platform. In at least one example, the user data can store data in user profiles (which can also be referred to as "user accounts"), as described above. In some examples, such user data can be stored in association with a user identification repository. The user identification repository can store identification data for one or more users. In some examples, the user identification repository can include user identifiers, user profiles, channel identifiers, group identifiers, workspace identifiers, organization identifiers, and the like. In some examples, the user identification repository can receive user profile information from the server(s) 102, and also receive additional identification data.

In at least one example, the user data can be associated with permission data, which can indicate permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the channel data can store data associated with individual channels. As described above, the channel management component 116 can establish a channel between and among various user computing devices, allowing the user computing devices to communicate and share data between and among each other. In at least one example, a channel identifier can be assigned to a channel, which indicates the physical address in the channel data where data related to that channel is stored.

In at least one example, the direct message (DM) data associated with individual direct messages. In at least one example, the direct message management component 118 can establish a direct message between and among various user computing devices, allowing the user computing devices to communicate and share data between and among each other via the direct message. In at least one example, a direct message identifier can be assigned to a direct message, which indicates the physical address in the DM data where data related to that direct message is stored.

In some examples, the permission data can indicate permissions of groups associated with the communication platform, individual channels associated with the communication platform, etc. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above. In some examples, permissions associated with a channel can be mapped to, or otherwise associated with, data associated with the channel in the channel data. In some examples, permissions can indicate restrictions on individual channels, restrictions on user(s) associated with individual channels, and the like.

In some examples, the datastore 122 can be partitioned into discrete items of data that can be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), channels, direct messages, users, or the like.

Figure 3:
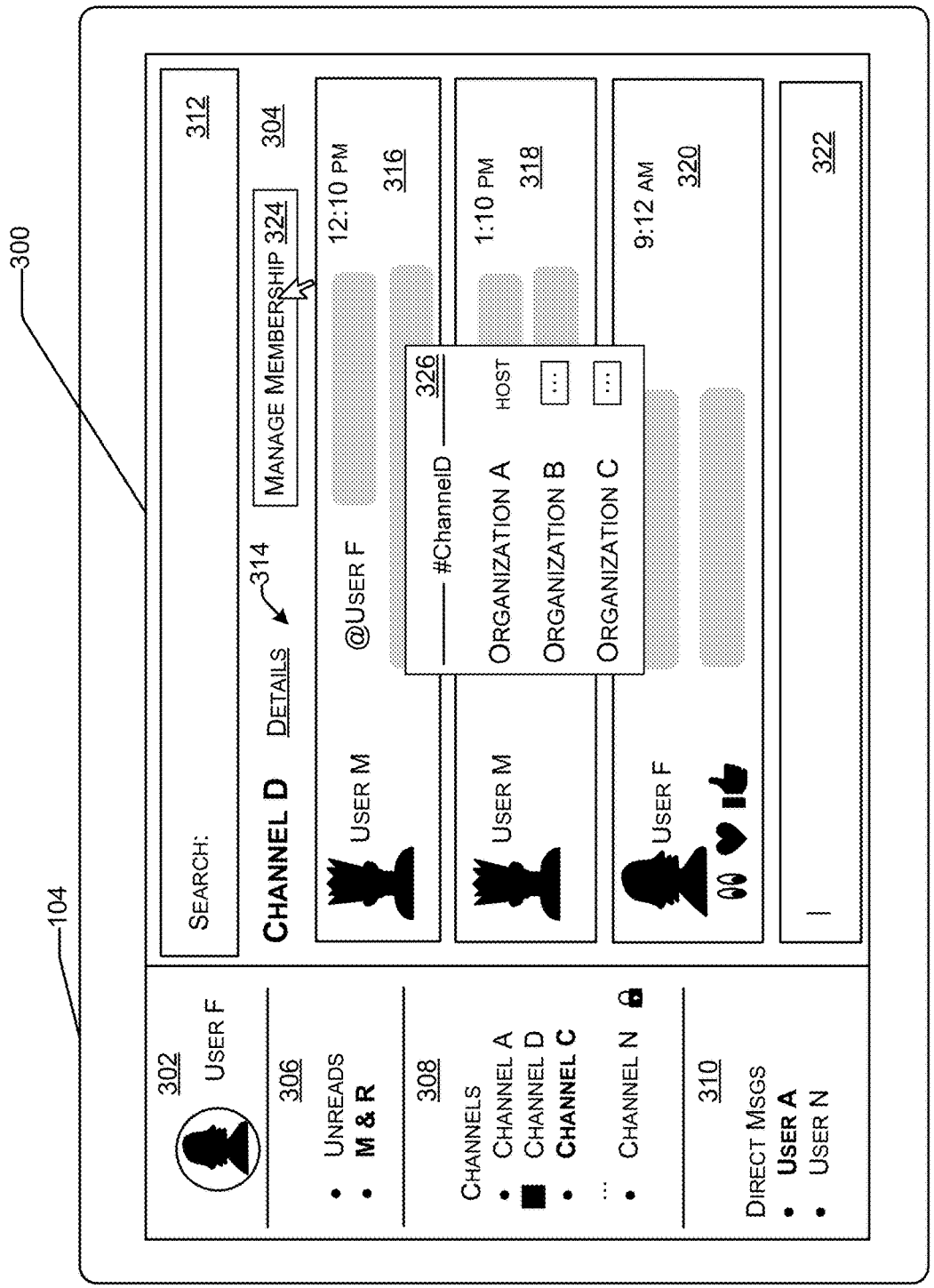
FIG. 3 is an example user interface associated with a communication platform, as described in the present disclosure.

FIG. 3 illustrates an example user interface 300 that can be presented via a user computing device 104, as described herein. The user interface 300 can correspond to the user interface 144 described above with reference to FIG. 1. In at least one example, the user interface 300 can be associated with the communication platform, described above. That is, in at least one example, the server(s) 102 can send instructions to the user computing device 104 for presenting the user interface 300 via an application. The user interface 300, which can be referred to as a "group-based communication interface," can refer to a graphical user interface that can be configured to allow users to view and engage with the communication platform.

In at least one example, the user interface 300 can present data associated with one or more channels. In some examples, the user interface 300 can be a "channel-based" user interface. In some examples, the user interface 300 can include a first section 302 (e.g., which can be a portion, pane, or other partitioned unit of the user interface 300), that includes indicator(s) (e.g., user interface element(s) or object(s)) representing data associated with channel(s), direct message(s), etc. with which the user (e.g., account of the user) is associated. In at least one example, the user interface 300 can include a second section 304 (e.g., which can be a portion, pane, or other partitioned unit of the user interface 300) that, in some examples, can be associated with a data feed (or, "feed") indicating messages posted to and/or actions taken with respect to one or more channels and/or other virtual spaces for facilitating communications (e.g., a virtual space associated with direct message communication(s), a virtual space associated with event(s) and/or action(s), etc.) as described herein. In at least one example, data associated with the second section 304 can be associated with the same or different workspaces. That is, in some examples, the second section 304 can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) posted the message and/or performed an action. In examples where the second section 304 presents data associated with multiple workspaces, at least some data can be associated with an indication of which workspace the data is associated with.

In some examples, the first section 302 can be referred to as "channel list pane" as, in some examples, it can be configured to display lists of channels. In some examples, as described below, such channels can include shared resources. As described below, the first section 302 can be configured to display lists of additional or alternative virtual spaces and/or resources. In some examples, the second section 304 can be referred to as a "message pane" and can be configured to display one or more messages of a channel upon user selection of a channel from the channel list pane. As described below, the second section 304 can display additional or alternative data or information (e.g., beyond messages).

In at least one example, the first section 302 can include one or more sub-sections, which can represent different virtual spaces. For example, a first sub-section 306 can include indicators representing virtual spaces that can aggregate data associated with a plurality of channels and/or workspaces. In at least one example, each virtual space can be associated with an indicator in the first sub-section 306. In some examples, an indicator can be associated with an actuation mechanism, that when actuated, can cause data associated with the corresponding virtual space to be presented via a second section 304 of the user interface 300. In some examples, instead of presenting the data associated with the corresponding virtual space via the second section 304, such data can be presented via another user interface presented via another application, as described herein.

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 304, for example in a feed. In another example, "threads" can be associated with messages, files, etc. posted in threads to messages posted in a channel and/or a virtual space associated with "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. In some examples, if the user requests to access the virtual space associated with "snippets of content," snippets of content associated with the user, which can be associated with different channels and/or virtual spaces, can be presented via a same feed. In some examples, such data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user (e.g., member of the channel) posted the message, performed an action, and/or the like. Additional details are described below.

In at least one example, the first section 302 of the user interface 300 can include a second sub-section 308 that includes indicators representing channels. In some examples, the channels can include public channels, private channels, shared channels (e.g., between workspaces or organizations), internal channels (e.g., single workspace channels), cross-workspace channels, combinations of the foregoing, or the like. In some examples, the channels represented can be associated with a single workspace. In some examples, the channels represented can be associated with different workspaces (e.g., cross-workspace). In some examples, the channels represented can be associated with combinations of channels associated with a single workspace and channels associated with different workspaces.

In some examples, the second sub-section 308 can depict all channels, or a subset of all channels, that the user has permission to access (e.g., as determined by the channel data 126). In such examples, the channels can be arranged alphabetically, based on most recent interaction, based on frequency of interactions, based on channel type (e.g., public, private, shared, cross-workspace, etc.), based on workspace, in user-designated sections, or the like. In some examples, the second sub-section 308 can depict all channels, or a subset of all channels, that the user is a member of, and the user can interact with the user interface 300 to browse or view other channels that the user is not a member of but are not currently displayed in the second sub-section 308. In some examples, different types of channels (e.g., public, private, shared, etc.) can be in different sections of the second sub-section 308, or can have their own sub-sections or sub-sections in the user interface 300. In some examples, channels associated with different workspaces can be in different portions of the second sub-section 308, or can have their own sections or sub-sections in the user interface 300.

In some examples, channels can be organized in list form within the channel list pane of the user interface based on group-defined titles. A "group-defined title" can refer to a channel name or text string that can be conceived and stored at the time a channel is created for common identification to all members of the channel. In some examples, group-defined titles are created based on a group-wide nomenclature/procedure so that group members can readily understand the purpose of any associated channel. Example group-defined titles include: #accounting—audit 2019, #accounting—payroll, #HR—onboarding procedure, #food truck frenzy, and the like. A shared resource can have a unique group-defined title for each user identifier and/or organization identifier associated with the shared resource.

In some examples, the indicators can be associated with user interface elements that visually differentiate types of channels. For example, Channel D is associated with a square user interface element instead of a circle user interface element. As a non-limiting example, and for the purpose of this discussion, the square user interface element can indicate that the associated channel (e.g., Channel D) is a shared channel. In some examples, such a user interface element can be the same for all shared channels. In other examples, such a user interface element can be specific to the other group with which the shared channel is associated. In some examples, additional or alternative graphical elements can be used to differentiate between public channels, private channels, shared channels, channels associated with different workspaces, and the like. In other examples, channels that the user is not a current member of may not be displayed in the second sub-section 308 of the user interface 300. In such examples, the user can navigate to a different interface to browse additional channels that are accessible to the user but to which the user is not currently a member.

In addition to the second sub-section 308, the first section 302 can include a third sub-section 310 that can include indicators representative of direct messages. That is, the third sub-section 310 can include indicators representative of virtual spaces that are associated with private messages between one or more users, as described above.

As described above, in at least one example, the user interface 300 can include a second section 304 that, in some examples, can be associated with a feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second section 304 can be associated with the same or different workspaces. That is, in some examples, the second section 304 can present data associated with the same or different workspaces via an integrated feed. In some examples, the data can be organized and/or is sortable by date, time (e.g., when associated data is posted or an associated operation is otherwise performed), type of action and/or data, workspace, channel, user, topic, relevance metric, and/or the like. In some examples, such data can be associated with an indication of which user posted the message and/or performed an action.

A channel or other virtual space can be associated with data and/or content other than messages, or data and/or content that is associated with messages. For example, non-limiting examples of additional data that can be presented via the second section 304 of the user interface 300 include members added to and/or removed from the channel, file(s) (e.g., file attachment(s)) uploaded and/or removed from the channel, application(s) added to and/or removed from the channel, post(s) (data that can be edited collaboratively, in near real-time by one or members of a channel) added to and/or removed from the channel, description added to, modified, and/or removed from the channel, modifications of properties of the channel, etc. In some examples, objects, as described above, can be associated with a channel or other virtual space (e.g., a direct message, board, etc.). In some examples, individual objects can be referenced in the second section 304. In some examples, individual objects can be associated with an actuation mechanism, such as a link.

In some examples, the second section 304 can be associated with a virtual space that can be associated with a board. In some examples, a board can be accessed from one of the sub-sections 306-310 and/or via another user interface element. A board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a channel and at least some members of the channel can view and/or edit the board. In some examples, a board can be sharable such that data associated with the board is accessible to and/or interactable for members of the multiple channels, workspaces, organizations, and/or the like.

In at least one example, a board can include section(s) and/or object(s). In some examples, each section can include one or more objects. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such information can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like.

In some examples, as illustrated in FIG. 3, the second section 304 can comprise a feed associated with a single channel (e.g., Channel D). In such examples, data associated with the channel can be presented via the feed. In at least one example, data associated with a channel can be viewable to at least some of the users of a group of users associated with a same group identifier. In some examples, for members of a channel, the content of the channel (e.g., messages and/or objects) can be displayed to each member of the channel. For instance, a common set of group-based messages can be displayed to each member of the channel such that the content of the channel (e.g., messages and/or objects) may not vary per member of the channel. In some examples, messages associated with a channel can appear differently for different users (e.g., based on personal configurations, group membership, permissions, policies, etc.).

In at least one example, the format of the individual channels or virtual spaces can appear differently to different users (e.g., based on personal configurations, group membership, permission(s), etc.). In some examples, the format of the individual channels or virtual spaces can appear differently based on which workspace or organization a user is currently interacting with or most recently interacted with. In at least one example, a common set of messages can be displayed, via a respective instance of the user interface 300, to each member of the respective channel such that the content of the channel (e.g., messages) may not vary per member of the channel except through application of organization-based information technology policies, such as data retention policies.

In at least one example, "policies" can refer to one or more rules, permissions, security agreements, and/or the like, which in some examples, can be associated with a channel identifier, a group identifier (e.g., a workspace identifier, an organization identifier, etc.), and/or the like. Policies can be determined by an organization (e.g., associated with an organization identifier) and/or users (e.g., admin or non-admin users) associated with an organization. In some examples, an organization or users (e.g., admin or non-admin users) can determine policies when a channel, direct message, board, workspace, etc. is created or at a later time. In at least one example, data associated with policies can indicate which members of a channel are permitted to perform certain actions, such as post messages to the channel, share files, invite new members, and/or the like. In at least one example, a data associated with policies can indicate retention policy settings, which can implement a data retention policy. Retention policy settings can be established by any admin user accessing the communication platform. For example, a host admin user associated with a group-based resource can establish host retention policy settings for the group-based resource. In another example, non-host admin users associated with a shared resource can establish retention policy settings that are applicable to message data posted by their respective groups or organizations.

In at least one example, the user interface 300 can include a search mechanism 312, wherein a user can input a search term and the server(s) 102 can perform a search associated with the communication platform. In some examples, the search can be performed across each group with which the user is associated, or the search can be restricted to a particular group, based on a user specification.

In FIG. 3, the user can interact with the user interface element that corresponds to Channel D in the second sub-section 308 and as such, a feed associated with the channel can be presented via the second section 304 of the user interface. In some examples, the second section 304 can be associated with a header that includes user interface elements 314 representing information associated with Channel D. Furthermore, the second section 304 can include user interface elements 316, 318, and 320 which each represent messages posted to the channel. As illustrated, the user interface elements 316-320 can include an indication of a user who posted the message, a time when the message was posted, content associated with the message, reactions associated with the message, and/or the like. In at least one example, the second section 304 can include an input mechanism 322, which can be associated with a message composition user interface to enable a user to compose a message to be posted to the channel.

In at least one example, the user interface 300 can include a user interface element 324 that can be associated with an actuation mechanism. Based at least in part on detecting actuation of the actuation mechanism, a user interface or element associated therewith can be presented to enable a user to manage membership of a shared resource, such as a channel. Additional examples of such user interfaces are provided below. In some examples, the user interface to enable management of membership can be presented as a pop-up (as illustrated in FIG. 3), an overlay, a new user interface, an update to the user interface 300, etc. FIG. 3 illustrates a shared resource group set interface 326, which can comprise an interface element that visually depicts groups that have been validated for accessing (i.e., at least one user associated with each respective organization identifier is validated for accessing) a shared resource, in this case, a shared channel (Channel D). A shared resource group set interface can visually depict member groups using an array or collection of group graphical identifiers such as logos, trademark designs, icons, colored shapes, and the like. In at least one example, a shared group set interface that includes member group graphical identifiers positioned in a horizontally arranged pattern. In at least one example, a shared group set interface can include a list comprising the member group graphical identifiers positioned in a vertically arranged pattern. In at least one example, a shared resource group set interface can include member counts associated with each group graphical identifier that indicate the number of members associated with each respective group that are validated for accessing the shared resource in question. In at least one example, a shared resource group set interface can include group graphical identifiers (and/or member counts) for groups that have been invited for membership (i.e., at least one user associated with the group identifier has been invited for membership) but which remain in a "pending status", i.e., are awaiting validation for membership to a given shared resource. Additional details associated with shared resources channel group set interfaces and/or other user interfaces that enable membership management of shared resources are described below.

It is noted that the scope of the present disclosure is not limited to the example user interfaces as described and illustrated herein, and the scope of the present disclosure can encompass various variations of the example user interfaces. For example, one or more elements can be added to and/or removed from these example user interfaces. Additionally, or alternatively, the position(s) of one or more elements can be adjusted and/or rearranged. Additionally, or alternatively, texts, graphics, and/or the like can be added to, removed from, and/or adjusted for these example user interfaces. In at least one example, actuation of actuation mechanisms, as described herein, can be associated with a selection input of a corresponding resource.

Below, individual figures are flowcharts representing example methods. It is noted that each block of a flowchart, and combinations of blocks in the flowcharts, can be implemented by various means such as hardware, firmware, circuitry and/or other devices associated with execution of software including one or more computer program instructions. For example, one or more of the procedures described below can be embodied by computer program instructions, which can be stored by a non-transitory memory of an apparatus employing an example of the present disclosure and executed by a processor in the apparatus. These computer program instructions can direct a computer or other programmable apparatus to function in a particular manner, such that the instructions stored in the computer-readable storage memory produce an article of manufacture, the execution of which implements the function specified in the flowchart block(s).

Managing Organization Disconnections

Figure 4:
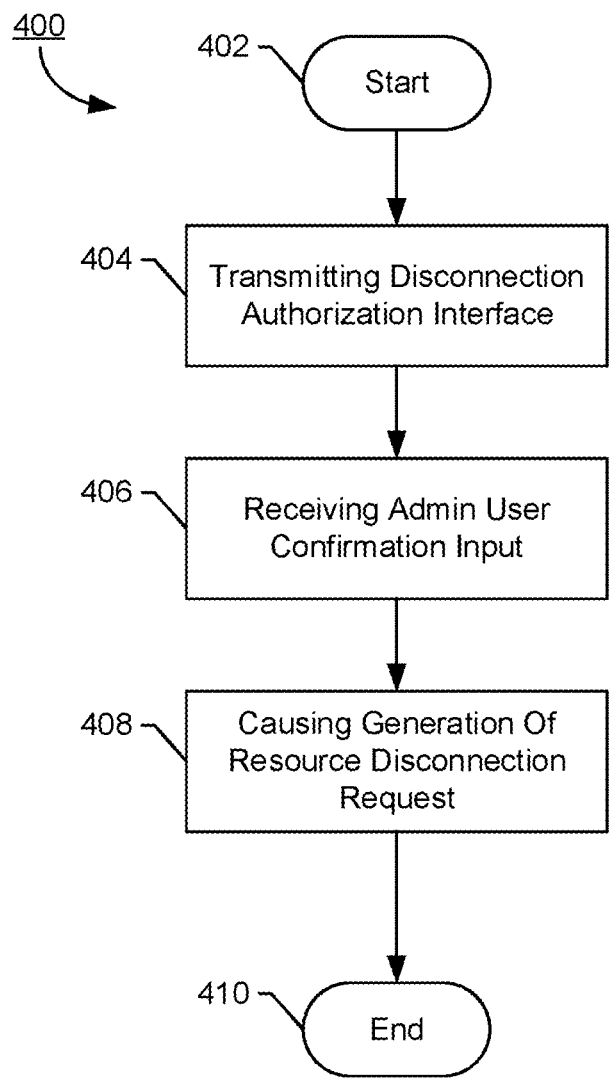
FIG. 4 is an example flowchart illustrating an example method in accordance with some examples of the present disclosure.

Referring now to FIG. 4, an example method 400 is illustrated. In particular, the example method 400 illustrates examples of managing organization disconnections from a shared resource of a communication platform. As described above, a shared resource can be a workspace, a board, a channel, a direct message, and/or the like. In some examples, the shared resource can be a group of shared resources that do not form an entire communication workspace. For example, ACME Corporation can host a workspace (strategy.acme.com) having 65 channels wherein 22 of these are shared. In this example, Brandon can designate a group of 12 of the 22 shared resources as a shared resource for group connection or disconnection operations of the type discussed herein. In another example, example shared resources can include groups of shared resources selected from two or more workspaces. For example, Brandon might designate four shared channels from the strategy.acme.com workspace and six shared channels from another workspace (hr.acme.com) as an example shared resource.

In describing various steps of the example method 400, references are made to example user interfaces as shown in FIGS. 5-14. It is noted that the scope of the present disclosure is not limited to these example user interfaces shown in FIGS. 5-14.

The example method 400 starts at block 402. At block 404, a component of the server(s) 102 can transmit data and instructions to a user computing device 104 that are sufficient for the user computing device 104 to render a disconnection authorization interface to its display. In some examples, such data and instructions can be sent responsive to receiving an indication of an actuation of an actuation mechanism associated with a user interface, such as the actuation mechanism associated with the user interface element 324 of the user interface 300. In at least one example, a disconnection authorization interface can refer to a modal, window, menu, pane, or other graphical user interface and/or element that is configured to enable admin user selection of a disconnection action associated with a shared resource. In some examples, the shared resource can be a shared channel, and the disconnection authorization interface can be associated with a channel identifier corresponding to the shared channel. In some examples, the component of the server(s) 102 can be configured to render data associated with a disconnecting organization identifier, a disconnecting user identifier, and/or the shared resource (e.g., via the user computing device 104) so that an admin user associated with a host group identifier can consider and potentially approve removal of a disconnecting group or a disconnecting user. In such cases, the disconnecting group or disconnecting user can be associated with a non-host group identifier that is within the admin user's administrative authority. Below, reference is made to a host organization and host organization identifier and a non-host organization and non-host organization identifier. However, additional or alternative groups (e.g., workspaces) can be hosts or non-hosts, as described herein.

As illustrated herein, with reference to FIGS. 5-14, the disconnection authorization interface is associated with the #wholesale-strategy channel, and the disconnection authorization interface is associated with a channel identifier corresponding to the #wholesale-strategy channel.

As was noted above, the disconnection authorization interface can be configured for rendering to a display of the user computing device 104. In some examples, the user computing device 104 can be associated with an admin user identifier that is associated with one of a host organization identifier or a non-host organization identifier. As described above, a host organization identifier can be associated with the organization that created the shared resource (here, the shared resource), and a non-host organization identifier can be associated with any organization that joined the shared resource after it was created.

For the purpose of this discussion, the term "admin user" can refers to a user who has authority to manage a channel, workspace, or the like, and associated resources, to make decisions on behalf of other users regarding various maintenance tasks. For example, an admin user can have the authority to set a channel as either "public" or "private." As another example, when receiving a request to create a shared resource or other resource, an admin user can have the authority to accept the request on behalf of an organization. An admin user computing device can be a user computing device 104 associated with an admin user identifier, or an identifier indicating that the user computing device 104 is granted admin-level permissions.

In at least one example, a disconnection authorization interface can be presented via an admin user computing device of an admin user and/or admin user identifier that is also associated with a host organization identifier. The disconnection authorization interface can be associated with an actuation mechanism that can cause the generation of a resource disconnection request.

At block 406, the component of the server(s) 102 can receive admin user confirmation input. In some examples, the admin user confirmation input can be generated in response to user engagement of the disconnection authorization interface. For example, the admin user confirmation input can be generated in response to user engagement of the example disconnection authorization interfaces shown in FIGS. 5-14. That is, in an example, detecting actuation of the actuation mechanism can cause the component of the server(s) 102 to receive an admin user confirmation input.

At block 408, the component of the server(s) 102 can cause generation of the resource disconnection request in response to admin user confirmation input received at block 406. That is, in an example, detecting actuation of the actuation mechanism can cause the component of the server(s) 102 to receive an admin user confirmation input and cause generation of the resource disconnection request.

The example method 400 ends at block 410.

Referring now to FIGS. 5-14, example disconnection request interfaces are illustrated. In some examples, these example disconnection request interfaces can be caused to be rendered for display on the user computing device 104, for example via a user interface 300 as described above. In the depicted examples, the user computing device 104 rendering the example disconnection request interfaces can be associated with a host organization identifier (e.g., ACME Corporation).

Figure 5:
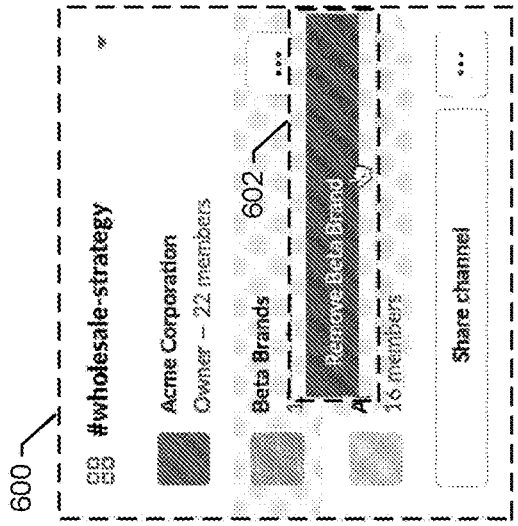

In the example disconnection request interface 500 shown in FIG. 5, a user (e.g., Brandon) from a host organization (e.g., ACME Corporation) of a shared resource, the #wholesale-strategy channel, may want to disconnect a non-host organization from the #wholesale-strategy channel (e.g., Beta Brand). In this example, Brandon can click on, tap on, or otherwise select an option button 501 associated Beta Brand. Subsequent to the option button 501 being selected, the component of the server(s) 102 can update the example disconnection request interface 500 shown in FIG. 5 to the example disconnection request interface 600 shown in FIG. 6, which provides a disconnect option 602 for disconnecting an organization from the shared resource (e.g., disconnecting Beta Brand from the channel). Subsequent to the disconnect option 602 being selected, the component of the server(s) 102 can be configured to receive an admin user confirmation input, which indicates and confirms Brandon's intent to remove Beta Brand from the #wholesale-strategy channel.

Figure 7:
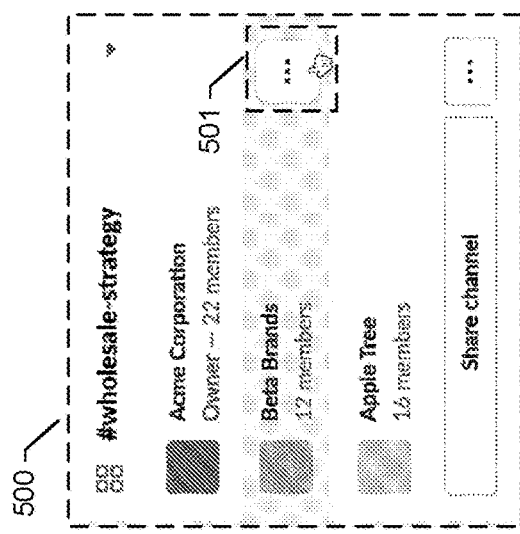

In the example disconnection request interface 700 shown in FIG. 7, a user from a host organization of the shared resource (e.g., Brandon from ACME Corporation) may want to stop sharing the shared resource with all other non-host organizations associated with the channel (e.g., Beta Brand and Apple Tree Inc.). In this example, Brandon can click on, tap on, or otherwise select an option button 701 associated with a shared resource (e.g., #wholesale-strategy channel). Subsequent to the option button 701 being selected, the component of the server(s) 102 can update the example disconnection request interface 700 shown in FIG. 7 to the example disconnection request interface 800 shown in FIG. 8, which provides a disconnect option 802 for disconnecting Beta Brand and Apple Tree Inc. from the shared resource. Said differently, the indicated disconnection option 802 can provide for Brandon to stop sharing the #wholesale-strategy channel with all other member organizations. Subsequent to the disconnect option 802 being selected, the component of the server(s) 102 can be configured to receive an admin user confirmation input, which indicates and confirms Brandon's intent to remove Beta Brand and Apple Tree Inc. from the #wholesale-strategy channel.

Referring now to FIG. 9 and FIG. 10, additional example disconnection request interfaces are provided. In some examples, these example disconnection request interfaces can be caused to be rendered for display on the user computing device 104, for example via a user interface 300 as described above. In the depicted example, the user computing device 104 is associated with a non-host organization identifier (e.g., Beta Brand). That is, as illustrated in FIGS. 5-8 and 9-10, a disconnection request interface can be different for different organizations, based at least in part on whether they are associated with a host or non-host designation.

In the example disconnection request interface 900 shown in FIG. 9, an admin user from a non-host organization of the shared resource (e.g., Lisa from Beta Brand) may want to disconnect the non-host organization from the shared resource (e.g., the #wholesale-strategy channel). In this example, Lisa can click on, tap on, or otherwise select an option button 901 associated with Beta Brand. Subsequent to the option button 901 being selected, the component of the server(s) 102 can update the example disconnection request interface 900 shown in FIG. 9 to the example disconnection request interface 1000 shown in FIG. 10, which provides a disconnect option 1002 for disconnecting an organization from the shared resource (e.g., disconnecting Beta Brand from the channel). Subsequent to the disconnect option 1002 being selected, the component of the server(s) 102 can receive an admin user confirmation input, which comprises a confirmation to disconnect Beta Brand from the #wholesale-strategy channel.

While the disconnection request interfaces shown in FIGS. 5-10 illustrate various example elements, it is noted that the scope of the present disclosure is not limited to an example disconnection request interface having these elements. For example, some example disconnection request interfaces of the present disclosure can comprise less than these elements or more than these elements. Additionally, or alternatively, one or more elements of some example group-based communication interfaces in accordance with examples of the present disclosure can be placed in a different location and/or orientation than these as shown in FIGS. 5-10.

In some examples, prior to generating the resource disconnection request, the component of the server(s) 102 can cause rendering of one or more warning messages associated with the resource disconnection request on a user computing device 104. Example variations of example warning messages are shown in at least FIGS. 11-14.

Figure 11:
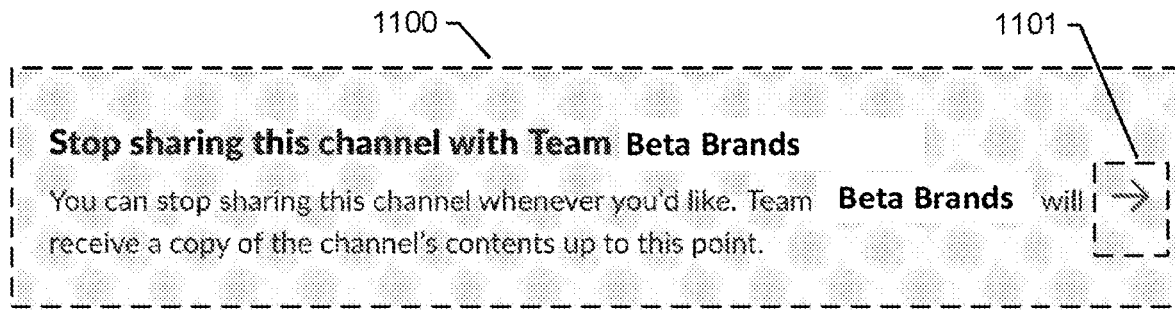

Referring to FIG. 11, for example, after an admin Brandon from ACME Corporation confirms to disconnect Beta Brand from the #wholesale-strategy channel, the component of the server(s) 102 can cause the rendering of the example user interface 1100, which can comprise a warning message that Beta Brand will receive a static shared resource associated with the #wholesale-strategy channel instead of data from the live shared resource repository 204. Once Brandon clicks, taps, or otherwise selects, the arrow 1101 in the example user interface 1100, the component of the server(s) 102 can cause the generation of a resource disconnection request.

Figure 12:

Referring to FIG. 12, for example, after an admin user (e.g., Brandon from ACME Corporation) confirms to disconnect Beta Brand from the #wholesale-strategy channel, the component of the server(s) 102 can cause the rendering of the example user interface 1200, which can comprise a warning message that Beta Brand will receive a static shared resource associated with the #wholesale-strategy channel instead of data from the live shared resource repository 204. Once Brandon clicks, taps, or otherwise selects, the confirmation button 1202 in the example user interface 1200, the component of the server(s) 102 can cause the generation of a resource disconnection request.

Figure 13:
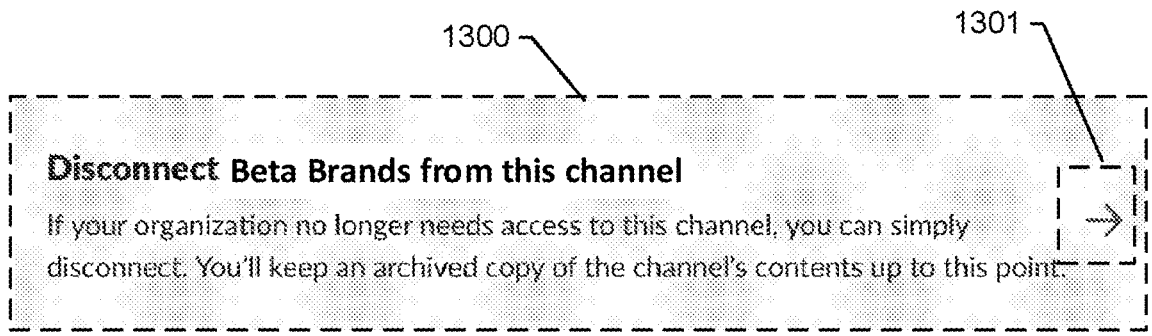

Referring to FIG. 13, for example, after an admin user (e.g., Lisa from Beta Brand) confirms to disconnect Beta Brand from the #wholesale-strategy channel, the component of the server(s) 102 can cause the rendering of the example user interface 1300, which can comprise a warning message that Beta Brand will receive a static shared resource associated with the #wholesale-strategy channel instead of data from the live shared resource repository 204. Once Lisa clicks, taps, or otherwise selects, the arrow 1301 in the example user interface 1300, the component of the server(s) 102 can cause the generation of a resource disconnection request.

Figure 14:
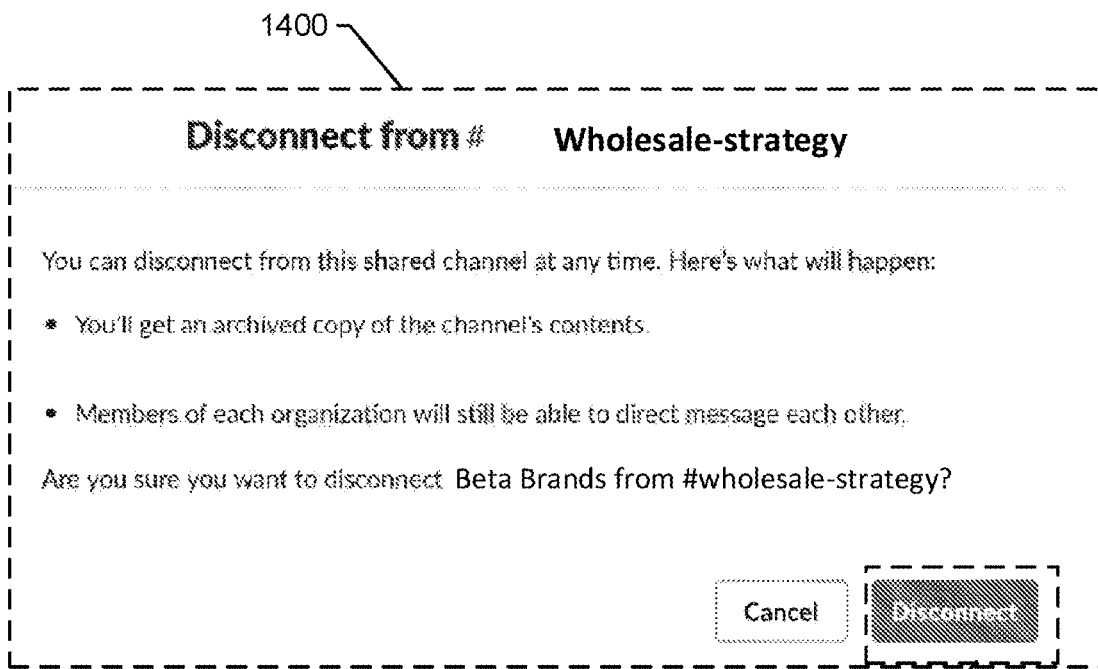

Referring to FIG. 14, for example, after an admin user (e.g., Lisa from Beta Brand) confirms to disconnect Beta Brand from the #wholesale-strategy channel, the component of the server(s) 102 can cause the rendering of the example user interface 1400, which can comprise a warning message that Beta Brand will receive a static shared resource associated with the #wholesale-strategy channel instead of data associated with the live shared resource repository 204. Once Lisa clicks, taps, or otherwise selects, the confirmation button 1402 in the example user interface 1400, the component of the server(s) 102 can cause the generation of a resource disconnection request.

In some examples, subsequent to causing generation of the resource disconnection request, the component of the server(s) 102 can update the sharing approval repository 206, details of which are described in connection with at least FIG. 15.

Figure 15:
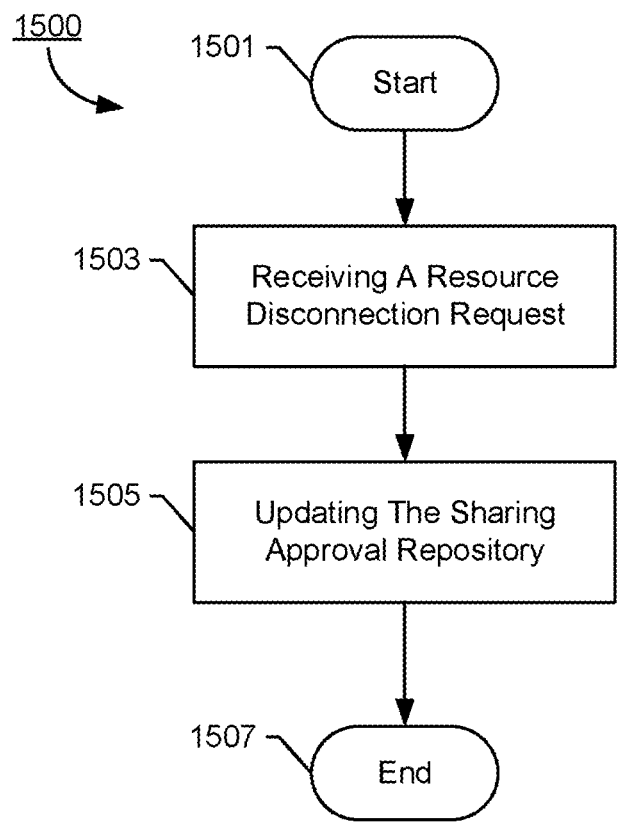
FIG. 15 is an example flowchart illustrating an example method in accordance with some examples of the present disclosure.

Referring now to FIG. 15, an example method 1500 is illustrated. In particular, the example method 1500 illustrates examples of managing organization disconnections from a shared resource of a communication platform.

The example method 1500 starts at block 1501. At block 1503, a component of the server(s) 102 can receive a resource disconnection request from a user computing device 104. In some examples, the resource disconnection request can comprise a disconnecting organization identifier and a resource identifier associated with a shared resource. In at least one example, the shared resource can be associated with at least one shared channel, and the resource identifier can be associated with at least one channel identifier corresponding to the at least one shared channel. In some examples, the at least one shared channel can be associated with two or more organization identifiers, indicating that the at least one shared channel can be shared among users from two or more organizations corresponding to the two or more organization identifiers.

Figure 6:
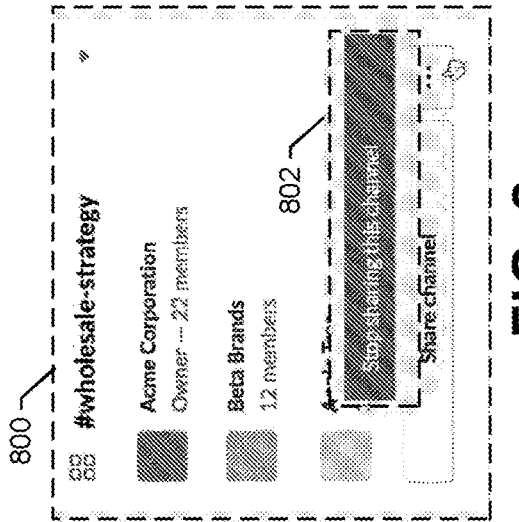

In the example depicted in FIGS. 5 and 6, the resource disconnection request is received from a user computing device associated with Brandon, who is a member of the ACME Corporation. The resource disconnection request comprises a resource identifier in the form of a channel identifier corresponding to the #wholesale-strategy channel. The #wholesale-strategy channel can be shared between organizations ACME Corporation, Beta Brand, and Apple Tree Inc., and the resource disconnection request includes a disconnecting organization identifier corresponding to the organization identifier of Beta Brand. In other words, the resource disconnection request indicates that Brandon requests Beta Brand to be disconnected from the #wholesale-strategy channel.

In some examples, the shared resource can be associated with a host organization identifier and one or more non-host organization identifiers in the sharing approval repository 206. As described above, the host organization identifier can be associated with the organization that created the shared resource, and the non-host organization identifier can be associated with any organization(s) that joined the shared resource after it was created. In some examples, the user computing device transmitting the resource disconnection request can be associated with one of the host organization identifier or the one or more non-host organization identifiers.

Continuing from the example above, the resource disconnection request is received from a user computing device associated with Brandon, who is a member of ACME Corporation. In an example, ACME Corporation can be the organization that created the #wholesale-strategy channel, and therefore Brandon's user computing device is associated with the host organization identifier. In another example (e.g., as depicted in FIGS. 9 and 10), the resource disconnection request can be received from a user computing device associated with Lisa. Lisa is a member of Beta Brand, which, in this example, is not the organization that created the #wholesale-strategy channel. Therefore, in this example, Lisa's user computing device is associated with a non-host organization identifier.

At block 1505, the component of the server(s) 102 can update the sharing approval repository 206 to add a disconnection indication for the resource identifier in association with the disconnecting organization identifier. For example, in response to receiving the resource disconnection request at block 1503, the component of the server(s) 102 can determine the resource identifier from the resource disconnection request. Based on the resource identifier, the component of the server(s) 102 can retrieve, for example, relevant table data from the sharing approval repository 206. The component of the server(s) 102 can update the table data to add a disconnection indication for the resource identifier in association with the disconnecting organization identifier.

Continuing from the above example, after receiving the resource disconnection request from a user computing device associated with Brandon (e.g., as depicted in FIGS. 5 and 6, for example), the component of the server(s) 102 can determine the channel identifier corresponding to the #wholesale-strategy channel. The component of the server(s) 102 can retrieve table data associated with the #wholesale-strategy channel and can update the table data to remove the connection between organization identifier associated with Beta Brand and the channel identifier associated with the #wholesale-strategy channel. In some examples, subsequent to updating the sharing approval repository 206, the component of the server(s) 102 can cause rendering of one or more notification messages associated with the resource disconnection request, examples of which are illustrated in connection with FIG. 16, FIG. 17, and FIG. 18.

FIG. 15, the example method 1500 ends at block 1507.

Example notification messages are illustrated in the example user interface 1600 of FIG. 16, the example user interface 1700 of FIG. 17, and the example user interface 1800 of FIG. 18.

Referring to FIG. 16, for example, after an admin Brandon from ACME Corporation confirms to disconnect Beta Brand from the #wholesale-strategy channel, the component of the server(s) 102 can cause the rendering of the example user interface 1600 on user computing devices associated with members of Beta Brand. In this example, the example user interface 1600 can comprise the notification message 1602, which can indicate that members of Beta Brand will only receive a static shared resource associated with the #wholesale-strategy channel (e.g., an archived copy), which can be a copy of a portion of the live shared resource repository 204 associated with the #wholesale-strategy channel at the time Beta Brand was disconnected. Example details of generating static shared resources are further described herein.

Referring to FIG. 17, for example, after an admin Lisa from Beta Brand confirms to disconnect Beta Brand from the #wholesale-strategy channel, the component of the server(s) 102 can cause the rendering of the example user interface 1700 on user computing devices associated with members of Beta Brand. In this example, the example user interface 1600 can comprise the notification message 1701, which can indicate that members of Beta Brand will only receive a static shared resource associated with the #wholesale-strategy channel (e.g., an archived copy), which can be a copy of a portion of the live shared resource repository 204 associated with the #wholesale-strategy channel at the time Beta Brand was disconnected. Example details of generating static shared resources are further described herein.

Referring to FIG. 18, for example, after an admin Brandon from ACME Corporation confirms to disconnect Beta Brand from the #wholesale-strategy channel, the component of the server(s) 102 can cause the rendering of the example user interface 1800 on user computing devices associated with members of the #wholesale-strategy channel. In this example, the group-based communication interface 1800 can comprise the notification message 1802, which can indicate that any messages or other data posted to the #wholesale-strategy channel will be seen by current members of the channel (e.g., ACME Corporation).

Figure 19:
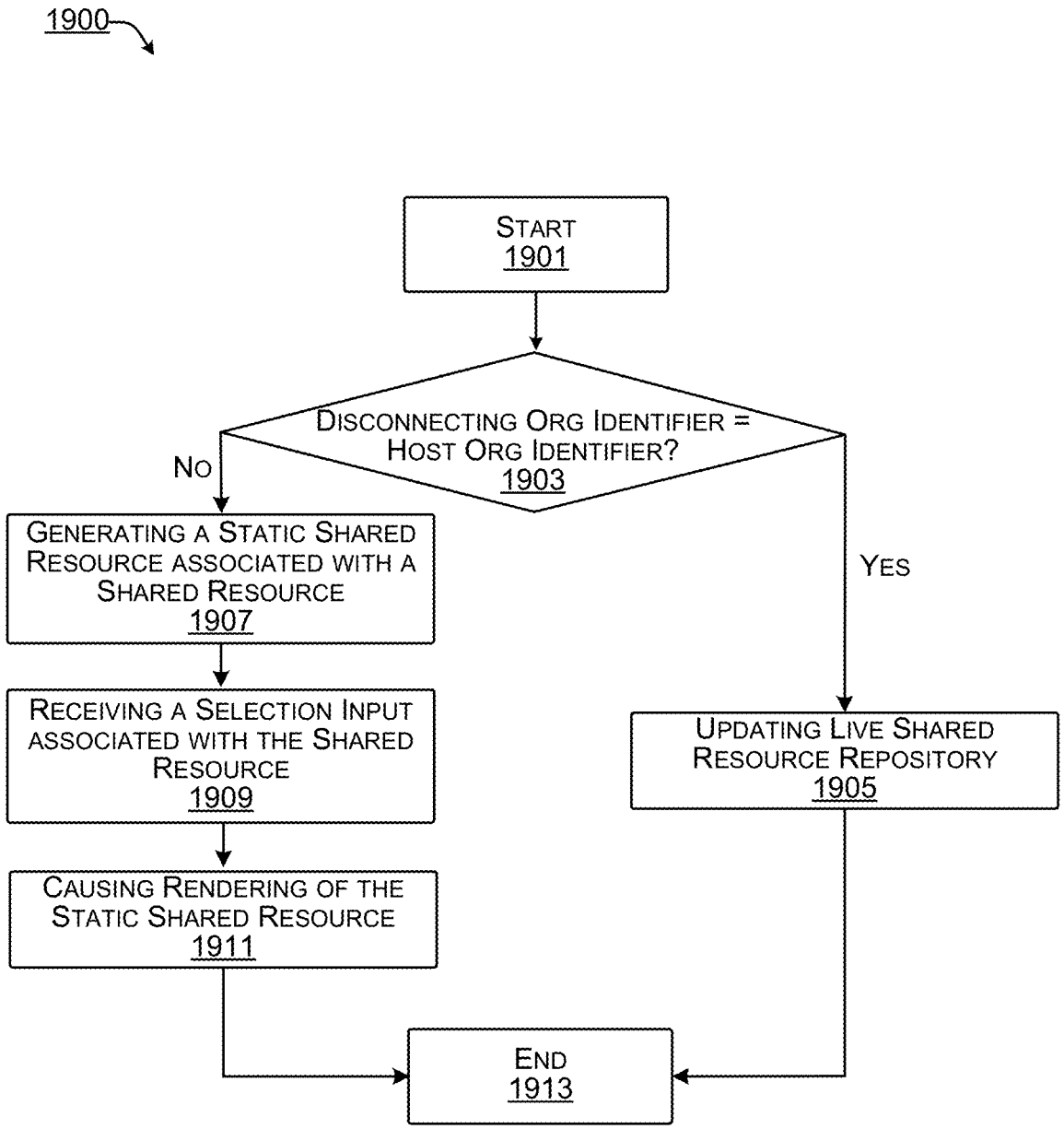
FIG. 19 is an example flowchart illustrating an example method in accordance with some examples of the present disclosure.

Referring now to FIG. 19, an example method 1900 is illustrated. In particular, the example method 1900 illustrates an example of managing organization disconnections from a shared resource of a communication platform, and generating a static shared resource, based at least in part on a copy of a portion of the live shared resource repository 204, for disconnecting organizations.

The example method 1900 starts at block 1901.

At block 1903, a component of the server(s) 102 can determine whether the disconnecting organization identifier associated with the resource disconnection request is the same as the host organization identifier associated with the shared resource.

If, at block 1903, the component of the server(s) 102 determines that the disconnecting organization identifier associated with the resource disconnection request is the same as the host organization identifier associated with the shared resource (i.e., the disconnecting organization is a host organization), the method 1900 proceeds to block 1905. At block 1905, the component of the server(s) 102 can update the live shared resource repository 204 associated with the shared resource to indicate that the shared resource is no longer shared outside of its host organization (i.e., an "internal" channel). Similar updates can be provided in some examples to the sharing approval repository 206.

In such examples, the component of the server(s) 102 can enable the live shared resource repository 204 to continue to serve live updates associated with the internal resource (i.e., the former shared resource) to user computing devices associated with the host organization subsequent to the host organization being disconnected from the now former shared resource.

Figure 8:
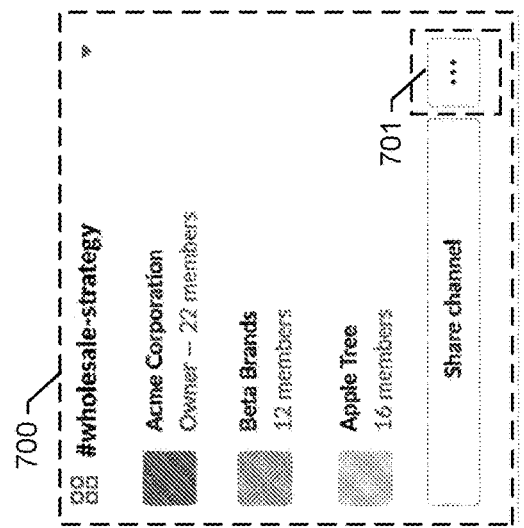

In reference to the ACME Corporation example referenced above (and as depicted in FIGS. 7 and 8), Brandon from ACME Corporation can confirm disconnection of ACME Corporation from the #wholesale-strategy channel. For users of ACME Corporation, this disconnection will simply be perceived as converting the #wholesale-strategy channel to an internal channel (i.e., messages from Beta Brand and Apple Tree Inc. will no longer be posted following such disconnection). However, disconnection will not disrupt communication and collaboration occurring between members of ACME Corporation as the #wholesale-strategy channel will continue to be served by a live shared resource repository 204.

In contrast to the experience of ACME Corporation users, member users from Beta Brand and Apple Tree Inc. will not be privy to updated messages posted by ACME Corporation members after the above referenced disconnection. That is, all Beta Brand and Apple Tree Inc. access requests associated with the #wholesale-strategy channel can be served from the static shared resource repository 202 such that a static shared resource, which can be a copy of a portion of the live shared resource repository 204 associated with the #wholesale-strategy channel, is presented. This effectively deactivates the Beta Brand and Apple Tree Inc. members from receiving updates associated with the #wholesale-strategy channel (e.g., from the live shared resource repository 204).

In some examples, when the component of the server(s) 102 determines that a disconnecting organization identifier is the same as the host organization identifier, the component of the server(s) 102 can still enable direct messaging between members of the disconnecting organization (e.g., Brandon) and other organization members (e.g., Lisa and John) associated with the shared resource. In alternate examples, the component of the server(s) 102 can disable direct messaging between members of the disconnecting organization (e.g., Brandon) and members from other organizations (e.g., Lisa and John) associated with the shared resource.

In some examples, when the component of the server(s) 102 determines that the disconnecting organization identifier is the same as the host organization identifier, the component of the server(s) 102 can update the live shared resource repository 204 to indicate that the shared resource is no longer configured to post future messages to a user interface associated with the shared resource on user computing devices associated with disconnected organizations (e.g., Beta Brand and Apple Tree Inc.). In such examples, the component of the server(s) 102 can turn off the live shared resource repository 204 for the shared resource (effectively archiving the live shared resource repository 204), and the component of the server(s) 102 can be configured to generate copy of the live shared resource repository 204, from the static shared resource repository 202, associated with the shared resource to serve all organizations (including the host organization) associated with the shared resource. Static shared resources can be stored and/or served from the static shared resource repository 202.

Returning to the example above, subsequent to host organization ACME Corporation requesting disconnection from the #wholesale-strategy channel, the component of the server(s) 102 can be configured to generate a static shared resource based on a portion of the live shared resource repository 204. The static shared resource can be stored in the static shared resource repository 202 and the component of the server(s) 102 can serve channel access requests for each of ACME Corporation, Beta Brand, and Apple Tree Inc. from the static shared resource repository 202 (instead of the live shared resource repository 204).

In some examples, when the disconnecting organization identifier is the same as the host organization identifier, the component of the server(s) 102 can be configured to disconnect the current host organization from the shared resource and can transmit electronic requests to user computing devices associated with users of other non-host organizations associated with the shared resource to determine if one of the non-host organizations wishes to become the new host organization. In some examples, a non-host organization that agrees to become the host organization can become the new host organization. In such examples, assuming appropriate admin approvals by the former host organization, the continuing organizations can remain connected to the live shared resource repository 204 while the former host organization is directed to the static shared resource repository 202. In some examples, the disconnecting host organization can designate or otherwise select one of the other non-host organizations as the new host organization. In such an example, the continuing organizations can remain connected and the selected non-host organization can become the host organization. In such examples, assuming appropriate admin approvals by the former host organization, the continuing organizations can remain connected to the live shared resource repository 204 while the former host organization is directed to the static shared resource repository 202.

Continuing from the example above, subsequent to a host organization ACME Corporation of a shared resource #wholesale-strategy requesting to be disconnected from the #wholesale-strategy channel, the component of the server(s) 102 can transmit requests to user computing devices associated with admin users of Beta Brand and Apple Tree Inc. The requests can comprise an indication that ACME Corporation has been disconnected from the #wholesale-strategy channel and can comprise an option interface that allows the admin users of Beta Brand and Apple Tree Inc. to determine whether to continue operating the channel or discontinue operating the channel. If admin users of Beta Brand and Apple Tree Inc. confirm to continuing operating the channel, the component of the server(s) 102 can request admin users to select a new host organization for the channel. If admin users of Beta Brand and Apple Tree Inc. confirm to discontinue operating the channel, the component of the server(s) 102 can archive the channel, consistent with the operations discussed above.

In some examples, subsequent to block 1905, the method 1900 can end at block 1913.

If, at block 1903, the component of the server(s) 102 determines that the disconnecting organization identifier associated with the resource disconnection request is not the same as the host organization identifier associated with the shared resource (i.e. the disconnecting organization is a non-host organization), the method 1900 proceeds to block 1907. At block 1907, the component of the server(s) 102 can generate a static shared resource associated with the shared resource, which can be a copy of a portion of the live shared resource repository 204 associated with the shared resource. The static shared resource can be an archived copy of a portion of the live shared resource repository 204 associated with the shared resource at the time the disconnecting organization is disconnected.

As defined above, the live shared resource repository 204 can be a database that is configured to store messages, files, objects, links, and other data that supports messages and other collaboration occurring in association with a shared resource. In some examples, subsequent to an organization identifier being disconnected from a shared resource (for example, a shared channel), a component of the server(s) 102 can generate a static shared resource, which can be a copy of a portion of the live shared resource repository 204 associated with the shared resource. The static shared resource can be stored in the static shared resource repository 202 and can be associated with the resource identifier of the former shared resource. The static shared resource repository 202, as described above, can include a database that is configured to store messages, files, objects, links, and other data that supports viewing of a defined set of messages and other collaboration that occurred as of a disconnection time in association with a shared resource. In at least one example, the live shared resource repository 204 can be dynamically updated. In at least one example, the static shared resource repository 202 can be static (but for the addition of new static shared resources and/or removal of previously generated static shared resources).

Continuing from the example above, the organization Beta Brand can be disconnected from the shared resource #wholesale-strategy (for example, in response to receiving a resource disconnection request as described above in connection with FIG. 4 and FIG. 5). The component of the server(s) 102 can generate a static shared resource based on a portion of the live shared resource repository 204 associated with the #wholesale-strategy channel at the time Beta Brand is disconnected. In some examples, the static shared resource can comprise a defined set of messages and other collaboration that occurred as of a disconnection time (e.g., a timestamp associated with the resource disconnection request) associated with Beta Brand. In at least one example, the static shared resource can be stored in the static shared resource repository 202 and can be associated with a resource identifier of the previously shared resource.

In some examples, subsequent to a non-host organization being disconnected from the shared resource, other organizations that are still connected with the shared resource can continue exchange data and information (such as messages) via the shared resource. Continuing from the above example, subsequent to a non-host organization Beta Brand of a shared resource #wholesale-strategy requesting to be disconnected from the #wholesale-strategy channel, the component of the server(s) 102 can enable members of ACME Corporation and members of Apple Tree Inc. to exchange data and information (such as messages) via the #wholesale-strategy channel.

In some examples, when disconnecting organization identifier is not the same as the host organization identifier, the component of the server(s) 102 can enable direct messaging between members of the disconnecting organization and other organizations associated with the shared resource. Continuing from the example above, the members from Beta Brand can still transmit direct messaging or multi-organization direct messaging to members from ACME Corporation or Apple Tree Inc. In some examples, when the disconnecting organization identifier is not the same as the host organization identifier, the component of the server(s) 102 can disable direct messaging between members of the disconnecting organization and other organizations associated with the shared resource. Continuing from the example above, the members from Beta Brand can no longer be able to transmit direct messaging or multi-organization direct messaging to members from ACME Corporation or Apple Tree Inc. after Beta Brand is disconnected from the #wholesale-strategy channel.

In some examples, the component of the server(s) 102 can retrieve a retention policy setting associated with the shared resource prior to generating the static shared resource. As described above, retention policy settings can be used to implement a data retention policy. In some examples, the component of the server(s) 102 can generate the static shared resource repository 202 based at least in part on the retention policy setting. For example, the component of the server(s) 102 can set a deletion date for the static shared resource repository 202 based on the retention policy setting. Additional details regarding the retention policy setting are described further herein.

At block 1909, the component of the server(s) 102 can receive a selection input associated with the shared resource. In some examples, the selection input can be associated with the resource identifier and the disconnecting organization identifier. For example, a user associated with the organization that has been disconnected from the shared resource can click, tap, or otherwise select the shared resource (e.g., a resource name displayed within user interface or the like) via a user interface as described herein. That is, when a user associated with a disconnected organization requests to access the shared resource, they can click, tap, or otherwise interact with a user interface to select the shared resource. Such an interaction can cause a selection input to be received by the server(s) 102.

Continuing from the above example, subsequent to the organization Beta Brand being disconnected from the #wholesale-strategy channel, the component of the server(s) 102 can receive a selection input from a user computing device associated with Lisa who is a member of Beta Brand. The selection input can indicate that Lisa clicks on the #wholesale-strategy channel name displayed to a channel list pane of a user interface that is rendered for display on her user computing device. For example, Lisa can wish to review one of her prior messages posted with the #wholesale-strategy channel.

At block 1911, a component of the server(s) 102 can cause rendering of a static shared resource generated based at least in part on the static shared resource repository 202. In some examples, the component of the server(s) 102 can cause rendering of the static shared resource in response to receiving the selection input at block 1909. In some examples, the static shared resource can be rendered to a user interface associated with the disconnecting organization identifier.

Continuing from the above example, subsequent to receiving a selection input from the user computing device associated with Lisa, the component of the server(s) 102 can generate a static shared resource based at least in part on a portion of the static shared resource repository 202 associated with the #wholesale-strategy channel. This static shared resource can be a static copy of the #wholesale-strategy channel that includes messages that existed at the time of Beta Brand disconnection (so long as such messages comply with the data retention policy(s) associated with the #wholesale-strategy channel).

As such, the component of the server(s) 102 can provide a "frozen copy" of messages and/or other data associated with a shared resource to members from an organization that has been disconnected from the shared resource and can prevent unauthorized sharing of information to organizations who have been disconnected from the shared resource.

The method 1900 ends at block 1913.

Figure 20A:
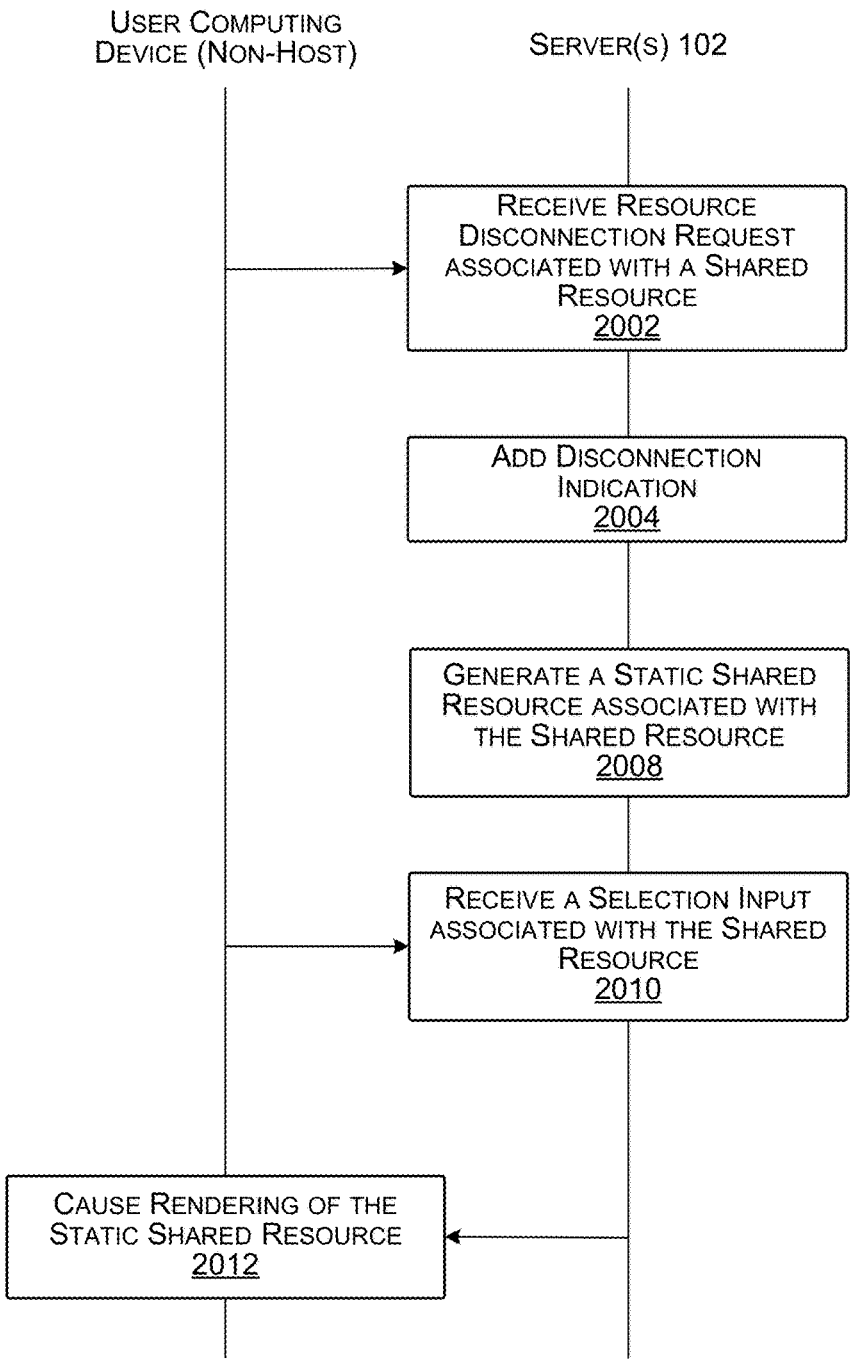
FIG. 20A is an example data flow chart illustrating an example data flow in accordance with some examples of the present disclosure.

Referring now to FIG. 20A, an example data flow diagram 2000 is illustrated. In particular, FIG. 20A illustrates example data flows between a user computing device associated with a host organization identifier and a component of the server(s) 102.

At block 2002, the component of the server(s) 102 can receive a resource disconnection request associated with a shared resource, similar to those described above in connection with FIG. 4 and FIG. 15.

Returning to the ACME Corporation example, Lisa, operating a user computing device associated with a non-host organization identifier for Beta Brand, can transmit a resource disconnection request to the server(s) 102 (e.g., via the user computing device), and the resource disconnection request can comprise an indication to disconnect Beta Brand (a non-host organization) from the #wholesale-strategy channel.

At block 2004, the component of the server(s) 102 can update the sharing approval repository 206 to add a disconnection indication to a resource identifier associated with the shared resource, as described above in connection with FIG. 15.

Continuing from the above example, subsequent to receiving the resource disconnection request from the user computing device associated with Lisa, of Beta Brand, the component of the server(s) 102 can update the sharing approval repository 206 and add a disconnection indication to table data associated with the #wholesale-strategy channel, indicating that the organization Beta Brand is disconnected from the #wholesale-strategy channel. In the above example, the component of the server(s) 102 can determine that the disconnection request is associated with Beta Brand. The component of the server(s) 102 can retrieve the table data and determine that the organization Beta Brand is a non-host organization for the channel #wholesale-strategy.

At block 2008, the component of the server(s) 102 can access the static shared resource repository 202, to generate a static shared resource associated with the shared resource similar to those described above in connection with block 1907 of FIG. 19. As described above, the static shared resource can be associated with a portion of the live shared resource repository 204 associated with the shared resource at a particular time when the disconnection request is approved and/or the disconnection indication is added to the sharing approval repository 206. The static shared resource can be stored in the static shared resource repository 202 in association with the resource identifier.

At block 2010, the component of the server(s) 102 can receive a selection input associated with the shared resource from a user computing device associated with the non-host organization identifier, similar to those described in connection with block 1909 of FIG. 19.

Continuing from the above example, Lisa can click, tap, or otherwise select the channel title #wholesale-strategy on a user interface that is rendered for display on her user computing device, and the user computing device can generate and transmit a selection input to the component of the server(s) 102.

At block 2012, the component of the server(s) 102 causes rendering of a static shared resource to the user computing device associated with the non-host organization identifier, similar to the operation described above in connection with block 1911 of FIG. 19.

Continuing from the above example, the component of the server(s) 102 can generate a static shared resource based (e.g., at block 2008) and can cause the static shared resource to be rendered for display on Lisa's user computing device, which is associated with the non-host organization identifier, Beta Brand. The static shared resource comprises messages associated with the #wholesale-strategy channel that existed at the time that Beta Brand was disconnected. In other words, Lisa's user computing device can be configured to render a "read-only" copy or a "frozen" copy of messages associated with the #wholesale-strategy channel that were posted to the channel prior to the organization Beta Brand being disconnected.

Figure 20B:
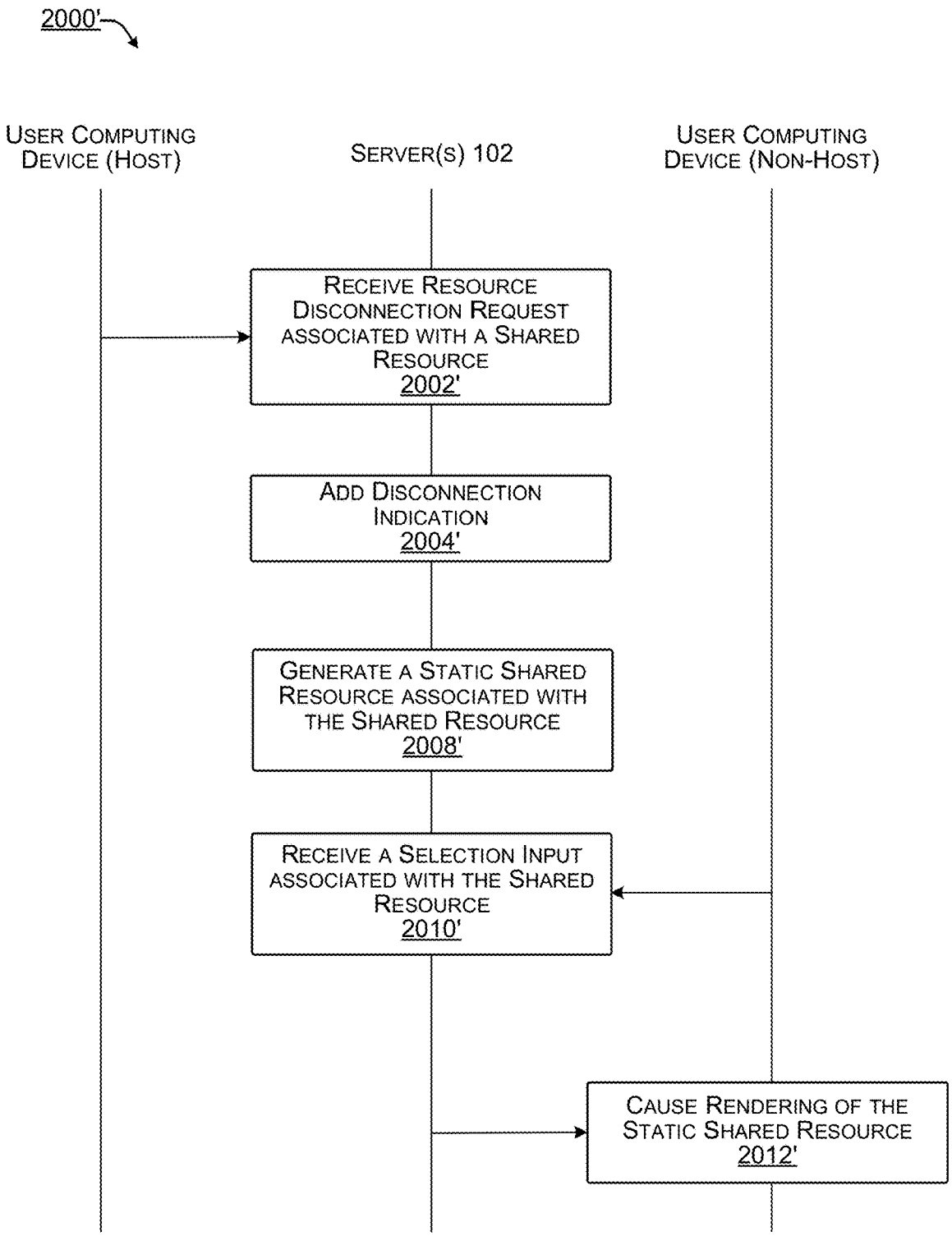
FIG. 20B is an example data flow chart illustrating an example data flow in accordance with some examples of the present disclosure.

Referring now to FIG. 20B, an example data flow diagram 2000' is illustrated. In particular, FIG. 20B illustrates example data flows between a user computing device associated with a host organization identifier, a user computing device associated with a non-host organization identifier, and the server(s) 102 (e.g., a component of the server(s) 102).

At block 2002', the component of the server(s) 102 can receive a resource disconnection request associated with a shared resource, as described above in connection with FIG. 4 and FIG. 15.

Returning to the ACME Corporation example described herein, Brandon, operating a user computing device associated with a host organization identifier for ACME Corporation, can transmit a resource disconnection request to the component of the server(s) 102. The depicted resource disconnection request includes an indication to disconnect Beta Brand (a non-host organization) from the #wholesale-strategy channel.

At block 2004', the component of the server(s) 102 can update a sharing approval repository 206 to add a disconnection indication, as described above in connection with FIG. 15.

Continuing from the above example, subsequent to receiving the resource disconnection request from the user computing device associated with ACME Corporation, the component of the server(s) 102 can update the sharing approval repository 206 to add a disconnection indication to table data associated with the #wholesale-strategy channel, indicating that the organization Beta Brand is disconnected from the #wholesale-strategy channel.

In the example depicted in FIGS. 4 and 5, the component of the server(s) 102 determines that the disconnection request is associated with Beta Brand. The component of the server(s) 102 then retrieves table data to determine that the organization Beta Brand is a non-host organization for the channel #wholesale-strategy.

At block 2008', the component of the server(s) 102 can access the static shared resource repository 202, to generate a static shared resource associated with the shared resource similar to those described above in connection with block 1907 of FIG. 19. As described above, the static shared resource can be associated with a portion of the live shared resource repository 204 associated with the shared resource at a particular time when the disconnection request is approved and/or the disconnection indication is added to the sharing approval repository 206. The static shared resource can be stored in the static shared resource repository 202 in association with the resource identifier.

At block 2010', the component of the server(s) 102 can receive a selection input associated with the shared resource from the user computing device associated with the non-host organization identifier, as described above in block 1909 of FIG. 19.

Continuing from the above example, Lisa from Beta Brand can click, tap, or otherwise select the channel title #wholesale-strategy on user interface that is rendered for display on her user computing device, and the user computing device can generate and transmit a selection input to the component of the server(s) 102.

At block 2012', the component of the server(s) 102 can cause rendering of a static shared resource to the user computing device associated with the non-host organization identifier, similar to the operation described above in connection with block 1911 of FIG. 19.

Continuing from the above example, the component of the server(s) 102 generates a static shared resource based on the static shared resource repository 202 and causes the static shared resource to be rendered for display on Lisa's user computing device, which is associated with the non-host organization identifier, Beta Brand. The static shared resource comprises messages associated with the #wholesale-strategy channel that existed at the time that Beta Brand was disconnected. In other words, Lisa's user computing device can be configured to render a "read-only" copy or "frozen" copy of messages associated with the #wholesale-strategy channel that were posted to the channel prior to the organization Beta Brand being disconnected.

Figure 21:
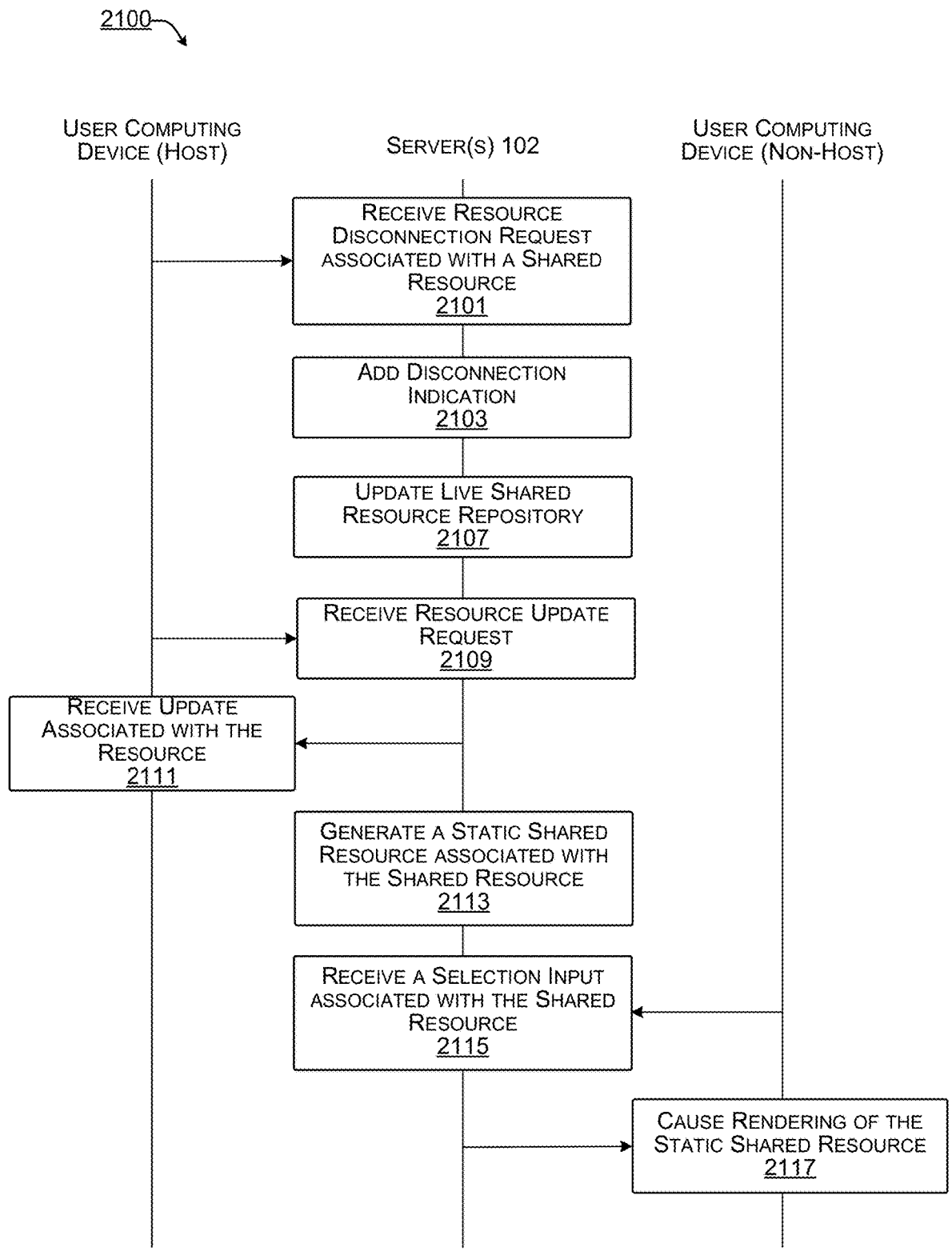
FIG. 21 is an example data flow chart illustrating an example data flow in accordance with some examples of the present disclosure.

Referring now to FIG. 21, an example data flow diagram is illustrated. In particular, FIG. 21 illustrates example data flows between a user computing device associated with a host organization identifier, the server(s) 102, and a user computing device associated with a non-host organization identifier.

At block 2101, a component of the server(s) 102 can receive a resource disconnection request associated with a shared resource, as described above in connection with FIG. 4 and FIG. 15.

In the ACME Corporation example, Brandon, operating a user computing device associated with a host organization identifier (ACME Corporation), can transmit a resource disconnection request to the component of the server(s) 102 at block 2101. The depicted resource disconnection request can comprise an instruction to disconnect ACME Corporation (a host organization) from the #wholesale-strategy channel.

At block 2103, the component of the server(s) 102 can update a sharing approval repository 206 to add a disconnection indication, as described above in connection with FIG. 15.

Continuing from the above example, subsequent to receiving the resource disconnection request from a user computing device associated with ACME Corporation, the component of the server(s) 102 updates the sharing approval repository 206 to add a disconnection indication to table data associated with the #wholesale-strategy channel, indicating that the organization ACME Corporation is disconnected from the #wholesale-strategy channel. In the above example, the component of the server(s) 102 can determine that the disconnection request is associated with ACME Corporation. The component of the server(s) 102 can retrieve the table data and determine that the organization ACME Corporation is a host organization for the channel #wholesale-strategy.

At block 2107, the component of the server(s) 102 can update the live shared resource repository 204, similar to the operation described above in connection with block 1905 of FIG. 19. As described above in connection with FIG. 19, the present disclosure can include many examples when a host organization is disconnected from a shared resource. As such, FIG. 21 illustrates one of the many examples, and the scope of the present disclosure is not limited to the example as shown in FIG. 21 only.

At block 2109, the component of the server(s) 102 can receive a resource update request associated with the shared resource from the user computing device associated with the host organization identifier. In response, the component of the server(s) 102 can transmit an update associated with the shared resource to the user computing device at block 2111.

Continuing from the above example, subsequent to a host organization, ACME Corporation, of a shared resource #wholesale-strategy requesting to be disconnected from the #wholesale-strategy channel, the component of the server(s) 102 can enable members of ACME Corporation (for example, an admin Brandon) to monitor the #wholesale-strategy channel, and can push live updates of the #wholesale-strategy channel to user computing devices associated with members of ACME Corporation (for example, Brandon). For example, Brandon can wish to review messages posted by other members of the #wholesale-strategy channel. The user computing device associated with Brandon can transmit a request to the component of the server(s) 102 for a live update on the #wholesale-strategy channel, and, in response, can receive a live copy of the live shared resource repository 204 associated with the #wholesale-strategy channel. That is, the user computing device can receive a live copy of the portion of the live shared resource repository 204 that is associated with the #wholesale-strategy channel.

At block 2113, the component of the server(s) 102 can generate a static shared resource for a non-host organization previously associated with the shared resource, similar to that described above in connection with block 1907 of FIG. 19.

Continuing from the above example, after the host organization, ACME Corporation, requests to be disconnected from the #wholesale-strategy channel, the component of the server(s) 102 can disconnect all other organizations (for example, Beta Brand and Apple Tree Inc.) from the #wholesale-strategy channel. The component of the server(s) 102 can generate a static shared resource based at least in part on a portion of the live shared resource repository 204 associated the #wholesale-strategy channel for each of Beta Brand and Apple Tree Inc., at the time ACME Corporation requests to be disconnected and/or the disconnection indication is added to the sharing approval repository 206. As described above, the static shared resource can be a "read only" copy or a "frozen copy" of the messages associated with the #wholesale-strategy channel up until the time point that ACME Corporation is disconnected from the #wholesale-strategy channel.

In the depicted example, at block 2115, the component of the server(s) 102 receives an additional selection input associated with the shared resource from a user computing device associated with a non-host organization identifier.

Continuing from the above example, Lisa from Beta Brand (a non-host organization of the #wholesale-strategy channel) can click, tap, or otherwise select the channel title #wholesale-strategy that is rendered to a channel list pane of a group-based communication interface that is rendered for display to her user computing device. For example, Lisa can wish to review prior messages that she posted before ACME Corporation was disconnected. Lisa's user computing device thus generates and transmits a selection input to the component of the server(s) 102 at block 2115.

At block 2117, a component of the server(s) 102 causes rendering of a static shared resource to the user computing device (i.e., Lisa's user computing device) associated with the non-host organization identifier in response to receiving the selection input from the user computing device associated with the non-host organization identifier at block 2115.

Continuing from the above example, the component of the server(s) 102 generates a static shared resource (generated at block 2113) and causes the static shared resource to be rendered for display on the user computing device (Lisa's user computing device) associated with the non-host organization identifier, Beta Brand.

As described above, in some examples, the component of the server(s) 102 can additionally, or alternatively generate a static shared resource for members associated with the host organization. In these examples, the static shared resource for the host organization and static shared resource for the non-host organization can contain similar messages as they can be generated from a single static shared resource repository 202. However, in some examples, as discussed in connection with FIG. 26 below, the messages displayed for each of the two static shared resources may not be identical as they can be governed by data retention settings for the two respective organizations (e.g., ACME Corporation and Beta Brand).

Figure 22:
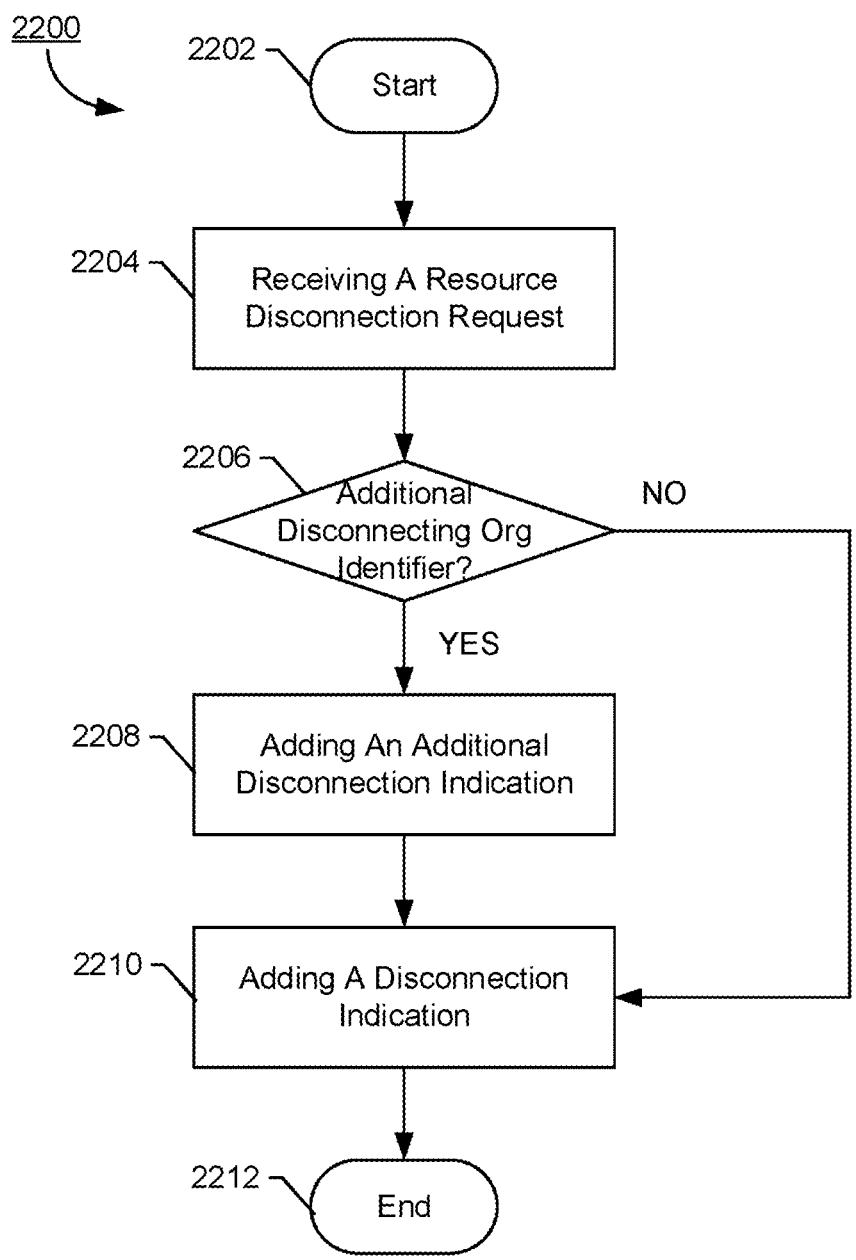
FIGS. 22-27 are example flowcharts illustrating example methods in accordance with some examples of the present disclosure.

Referring now to FIG. 22, an example method 2200 is illustrated. In particular, the example method 2200 illustrates example operations for managing organization disconnections from a shared resource of a communication platform.

The example method 2200 starts at block 2202. At block 2204, the component of the server(s) 102 can receive a resource disconnection request from a user computing device 104. In some examples, the resource disconnection request can be received or caused to be generated in a manner similar to those described above in connection with at least FIG. 4 and FIG. 5. In the ACME Corporation example described herein, the user computing device is Brandon's user computing device and is associated with the host organization identifier (ACME Corporation). The depicted resource disconnection request comprises a channel identifier for the #wholesale-strategy channel and a disconnecting organization identifier, as described below.

At block 2206, the component of the server(s) 102 can determine if the resource disconnection request comprises an additional (i.e., a second) disconnecting organization identifier beyond the disconnecting organization identifier (i.e. a first) referenced above. In circumstances where two or more disconnecting organization identifiers are received, each can be associated with a single resource identifier.

Continuing from the above example, when a resource disconnection request is received from a user computing device (for example, a user computing device associated with the Brandon), the component of the server(s) 102 can determine whether the resource disconnection request comprises more than one disconnecting organization identifier. For example, Brandon can request that the organization Beta Brand and the organization Apple Tree Inc. be disconnected from the #wholesale-strategy channel. In such an example, the resource disconnection request includes a disconnecting organization identifier corresponding to Beta Brand and an additional disconnecting organization identifier corresponding to Apple Tree Inc.

If, at block 2206, the component of the server(s) 102 can determine that the resource disconnection request does not include an additional disconnecting organization identifier (i.e., there is only one disconnecting organization identifier associated with the resource disconnection request), the method 2200 proceeds to block 2210. At block 2210, the component of the server(s) 102 can add a disconnection indication in the sharing approval repository 206, similar to that described above in connection with block 1505 of FIG. 15.

If, at block 2206, the component of the server(s) 102 can determine that the resource disconnection request comprises an additional disconnecting organization identifier (i.e., there is more than one disconnecting organization identifier associated with the resource disconnection request), the method 2200 proceeds to block 2208. At block 2208, the component of the server(s) 102 can add an additional disconnection indication in the sharing approval repository 206, in addition to the disconnection indication added at block 2210, each similar to that described above in connection with block 1505 of FIG. 5.

Continuing from the above example, if the component of the server(s) 102 determines, at block 2206, that the resource disconnection request comprises a disconnecting organization identifier associated with the organization Beta Brand and an additional disconnecting organization identifier associated with the organization Apple Tree Inc., the component of the server(s) 102 generates a disconnection indication for Beta Brand (indicating that Beta Brand is disconnected from the #wholesale-strategy channel) and an additional disconnection indication for Apple Tree Inc. (indicating that Apple Tree Inc. is disconnected from the #wholesale-strategy channel).

The example method 2200 ends at block 2212.

Figure 23:
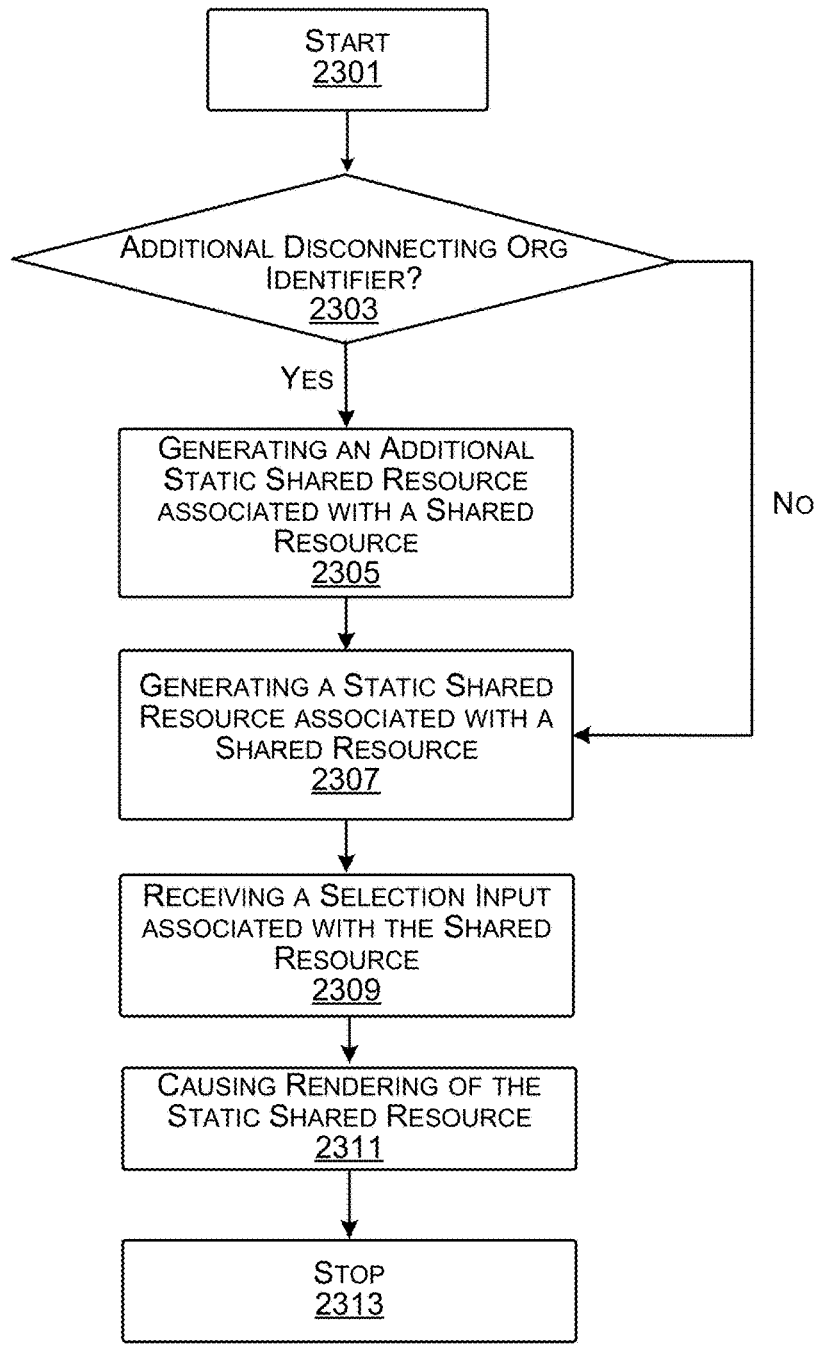

Referring now to FIG. 23, an example method 2300 is illustrated. In particular, the example method 2300 illustrates example operations for managing organization disconnections from a shared resource of a communication platform.

The example method 2300 starts at block 2301. At block 2303, a component of the server(s) 102 can determine whether a resource disconnection request comprises an additional disconnecting organization identifier, similar to the operation described above in connection with block 2206 of FIG. 22.

If, at block 2303, the component of the server(s) 102 determines that the resource disconnection request does not comprise an additional disconnecting organization identifier (i.e. there is only one disconnecting organization identifier associated with the resource disconnection request), the method 2300 proceeds to block 2307. At block 2307, the component of the server(s) 102 can generate a static shared resource based at least in part on a portion of the live shared resource repository 204 associated with the shared resource, similar to the operation described above in connection with block 1907 of FIG. 19.

If, at block 2303, the component of the server(s) 102 determines that the resource disconnection request comprises an additional disconnecting organization identifier (i.e., there is more than one disconnecting organization identifier associated with the resource disconnection request), the method 2100 proceeds to block 2305. At block 2305, the component of the server(s) 102 can generate an additional static shared resource based at least in part on a portion of the live shared resource repository 204 associated with the shared resource, which is in addition to the static shared resource generated at block 2307. Each of the additional static shared resources are generated similar to that described above in connection with block 1907 of FIG. 19.

Continuing from ACME Corporation example above, if the component of the server(s) 102 determines, at block 2303, that the resource disconnection request comprises a disconnecting organization identifier associated with the organization Beta Brand and an additional disconnecting organization identifier associated with the organization Apple Tree Inc., the component of the server(s) 102 can generate a static shared resource associated with the Beta Brand organization identifier and an additional static shared resource associated with the Apple Tree Inc. organization identifier.

At block 2309, the component of the server(s) 102 can receive a selection input associated with the resource identifier (e.g., the #wholesale-strategy channel identifier) and at least one of the disconnecting organization identifier or the additional disconnecting organization identifier, similar to input received above in connection with block 1909 of FIG. 19.

At block 2311, the component of the server(s) 102 can cause rendering to a user interface associated with the a least one of the disconnecting organization identifier or the additional disconnecting organization identifier of a static shared resource in response to receiving the selection input, similar to the operation described above in connection with block 1911 of FIG. 19.

In some examples, the component of the server(s) 102 can generate the static shared resource based at least in part on the static shared resource or the additional static shared resource, both of which can be stored in the static shared resource repository 202.

Continuing from the above example, the component of the server(s) 102 can determine, at block 2303, that the resource disconnection request comprises a disconnecting organization identifier associated with Beta Brand and an additional disconnecting organization identifier associated with Apple Tree Inc. In one example, the component of the server(s) 102 can receive a selection input from Lisa's user computing device, associated with Beta Brand, and can generate a static shared resource based on the static shared resource repository 202 for Beta Brand. The component of the server(s) 102 can thus cause rendering of the static shared resource (e.g., a read only copy of the #wholesale-strategy channel) to Lisa's user computing device.

In another example, the component of the server(s) 102 can receive a selection input from John's user computing device, associated with Apple Tree Inc., and can generate a static shared resource based on the static shared resource repository 202 for Apple Tree Inc. The component of the server(s) 102 can cause rendering of the static shared resource (e.g., a read only copy of the #wholesale-strategy channel) to John's user computing device.

The method 2300 ends at block 2313.

In addition to the examples described above, an organization can be disconnected from a shared resource, or other shared resource, based on receiving organizational relationship severing request associated with two organizations. In at least one example, the terms "organizational relationship severing request" or "request to sever organizational relationship" refer to an electronically generated request to terminate an organizational relationship between two or more organizations. For example, an admin user of Organization A can transmit a request to a communication platform to sever organizational relationship with Organization B, and the communication platform can disconnect Organization A from all shared resources where Organization B is the host organization, and can disconnect Organization B from all shared resources where Organization A is the host organization.

Returning to the ACME Corporation example above, ACME Corporation and Beta Brand can be members of one or more shared resources, such as the #wholesale-strategy channel, a #new-information channel, a #logistics channel, and a #gathering channel. In some examples, ACME Corporation can be the host organization of the #wholesale-strategy channel and the #new-information channel, and Beta Brand can be the host organization of the #logistics channel and the #gathering channel.

In some examples, an admin user of ACME Corporation (for example, Brandon) can request to sever an organizational relationship between ACME Corporation and Beta Brand. For example, Brandon can provide a user input to a user computing device indicating that the organizational relationship between ACME Corporation and Beta Brand is requested to be severed, and the user computing device can generate and transmit an organizational relationship sever request to the server(s) 102.

In response to receiving the organizational relationship sever request, the component of the server(s) 102 can determine one or more shared resources where both ACME Corporation and Beta Brand are members (for example, the #wholesale-strategy channel, the #new-information channel, the #logistics channel, and the #gathering channel). Based on determining that ACME Corporation is the host organization of the #wholesale-strategy channel and the #new-information channel, the component of the server(s) 102 can disconnect Beta Brand from the #wholesale-strategy channel and the #new-information channel, and can provide static shared resources associated with these two channels to user computing devices associated with Beta Brand. Based on determining that Beta Brand is the host organization of the #logistics channel and the #gathering channel, the component of the server(s) 102 can disconnect ACME Corporation from the #logistics channel and the #gathering channel, and can provide static shared resources associated with these two channels to user computing devices associated with ACME Corporation.

In some examples, ACME Corporation and Beta Brand can be members of a shared resource for which neither of them is the host organization. For example, ACME Corporation and Beta Brand can be non-host organizations of a shared resource #tomorrow, and the host organization for the #tomorrow channel can be Apple Tree Inc.

In some example, the component of the server(s) 102 can disconnect the organization that initiated the request to sever the organizational relationship between two organizations from the shared resource that neither of the two organizations are the host organization. Continuing from the example above, because ACME Corporation initiated the request to sever the organizational relationship, the communication platform can disconnect ACME Corporation from the #tomorrow channel.

In some examples, once the organizational relationship between two organizations is severed, members from these two organizations can no longer exchange direct messaging or multi-organization direct messaging with members from a different organization.

Managing Organization Reconnections

Figure 24:
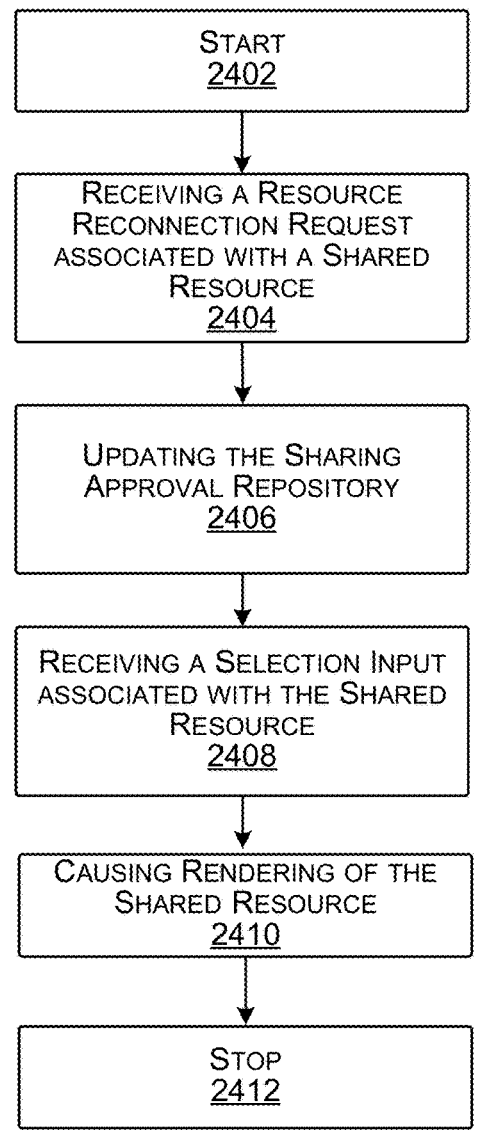

Referring now to FIG. 24, an example method 2400 is illustrated. In particular, the example method 2400 illustrates examples of managing organization reconnections.

The example method 2400 starts at block 2402. At block 2404, a component of the server(s) 102 can receive a resource reconnection request, associated with a (previously) shared resource, from a host user computing device associated with a host organization identifier. For example, a user and/or organization may have previously been disconnected form the shared resource in accordance with example method 1500 described above in connection with FIG. 15 and can desire to reconnect to the previously shared resource. In some examples, the resource reconnection request can comprise a disconnecting organization identifier and a resource identifier associated with the shared resource.

Returning to the ACME Corporation example, Brandon associated with ACME Corporation, operating a user computing device, can cause the user computing device to transmit a resource reconnection request indicating a request to reconnect organization Beta Brand to a shared resource #wholesale-strategy. In such an example, ACME Corporation can be the host organization of the #wholesale-strategy channel.

At block 2406, the component of the server(s) 102 can update the sharing approval repository 206 in response to receiving the reconnection request. For example, the component of the server(s) 102 can update the sharing approval repository 206 to add a reconnection indication for the resource identifier in association with the disconnecting organization identifier. The reconnection indication can indicate that the disconnecting organization identifier should be reconnected with the resource identifier. In some examples, the resource reconnection request can prompt an authorization and confirmation process, wherein one or more authorization and/or confirmation user interfaces can be presented to an admin user of the host organization (e.g., a user associated with an admin identifier and the host organization identifier) to review the resource reconnection request and authorize/confirm (or deny) the reconnection. If reconnection is approved (i.e., based on a confirmation indication), a reconnection indication can be stored to the sharing approval repository 206 in association with the disconnecting group identifier and the resource identifier for the shared resource.

Continuing from the example above, the component of the server(s) 102 can update the sharing approval repository 206 to add a reconnection indication, indicating that Beta Brand is reconnected to the #wholesale-strategy channel.

At block 2408, the component of the server(s) 102 can receive a selection input associated with the shared resource from a user computing device associated with the organization that has been reconnected to the shared resource.

Continuing from the above example, Lisa, associated with the organization Beta Brand, can request to access the #wholesale-strategy channel. For example, Lisa can provide the selection input by clicking, tapping, and/or otherwise selecting the channel title for #wholesale-strategy channel on a user interface associated with the communication platform. Subsequently, the user computing device can transmit the selection input to the communication platform.

At block 2410, the component of the server(s) 102 can cause rendering of the shared resource to a user interface associated with the disconnecting organization identifier. In some examples, the shared resource can be generated based at least in part on the live shared resource repository 204 in response to receiving a selection input associated with the resource identifier and the disconnecting organization identifier. That is, the rendering of the shared resource can be "live" such that it is associated with data that is served from the live shared resource repository 204.

As described above, after an organization is disconnected from a shared resource, the component of the server(s) 102 can generate a static shared resource, based on a portion of the live shared resource repository 204 associated with the shared resource, which can be stored in the static shared resource repository 202. In other words, the disconnecting organization can only access a "frozen" copy of communications associated with the shared resource. After the organization is reconnected to the shared resource, the component of the server(s) 102 can delete the static shared resource in the static shared resource repository 202, and can generate the shared resource based at least in part on data associated with the live shared resource repository 204 instead of the static shared resource repository 202. That is, the rendering of the shared resource at block 2410 can be a rendering of live data associated with the shared resource.

Continuing from the above example, in response to receiving the selection input from a user computing device associated with Lisa, the component of the server(s) 102 can delete the static shared resource that has previously been generated for Beta Brand, and can cause the rendering of a live #wholesale-strategy channel on a user interface of the user computing device associated with Lisa.

The method 2400 ends at block 2412.

In some examples, examples of the present disclosure can be implemented in the context of a non-host organization that has been disconnected from a shared resource attempting to reconnect to the channel. That is, in some examples, any user that was previously connected to the shared resource can reconnect with the shared resource.

Returning to the ACME example, referring to the discussion above in which Beta Brand has been disconnected from the #wholesale-strategy channel, Lisa from Beta Brand can determine that she wants to reconnect with her friends from the #wholesale-strategy channel. An admin user of Beta Brand (perhaps Lisa) can provide input to a user computing device indicating an electronic request to reconnect Beta Brand with the #wholesale-strategy channel. In response, the user computing device can generate and transmit a resource reconnection request to the server(s) 102 (for example, similar to block 2404 described above in connection with FIG. 24).

Upon receiving the resource reconnection request, the component of the server(s) 102 can transmit the request to a user computing device associated with an admin user of host organization of the #wholesale-strategy channel (for example, Brandon from ACME Corporation). In this example, the component of the server(s) 102 can cause rendering of a user interface on Brandon's user computing device. The user interface can display information associated with the resource reconnection request, including, for example, an organization indicator or an organization summary associated with Beta Brand. Brandon can provide an input to the user interface, indicating that he has approved the reconnection request. Subsequently, the component of the server(s) 102 can update the sharing approval repository 206, similar to block 2406 described above in connection with FIG. 24. Alternatively, Brandon can provide an input to the user interface indicating that he does not approve the reconnecting request. In such an example, Lisa can be informed via an error interface rendered to her user computing device that she is unable to reconnect Beta Brand to the #wholesale-strategy channel.

As described above, when a non-host organization is disconnected from a shared resource, the non-host organization can receive a static shared resource that is generated based on a portion of the live shared resource repository 204 associated with the shared resource. Accordingly, when a non-host organization such as Beta Brand is reconnected to the shared resource, the non-host organization can receive a live shared resource that is generated based on the live shared resource repository 204 associated with the shared resource. In other words, the non-host organization can receive an "unfrozen" copy of the messages in the shared resource. In some examples, the live shared resource can enable live updates to be served (e.g., from the live shared resource repository 204) after the user is reconnected to the shared resource.

Continuing from the example above, subsequent to Brandon approving the reconnection request, the component of the server(s) 102 can receive a selection input from the user computing device associated with Lisa. Lisa can request to access the #wholesale-strategy channel, and the component of the server(s) 102 can cause rendering of a user interface for the shared resource on a user computing device associated with Lisa, similar to block 2408 and block 2410 described above in connection with FIG. 24. The user interface can allow Lisa to communicate with members from other organizations associated with the #wholesale-strategy channel through, for example, messaging via the channel, direct messaging, multi-organization direct messaging, and/or the like. In such examples, the static shared resource that was previously generated for Beta Brand can be deleted.

In some examples, examples of the present disclosure can be implemented in the context of a host organization that has been disconnected from a shared resource wherein the host organization wishes to reconnect to the shared resource. In some examples, a user may be required to be associated with an organization or group designated as a host of the shared resource to reconnect with the shared resource.

Referring for example to the discussion above in which host organization ACME Corporation decides to disconnect from the #wholesale-strategy channel, the component of the server(s) 102 may have disconnected all non-host organizations associated with the shared resource, and may have generated static shared resources based on the portion of the live shared resource repository 204 associated with the shared resource to members associated with these non-host organizations. When the host organization requests to reconnect with the shared resource, the component of the server(s) 102 can transmit new connection request(s) to the prior non-host organizations indicating that they are invited to reconnect to the shared resource.

Continuing from the above example in which ACME Corporation disconnected as the host organization from the #wholesale-strategy channel it shared with non-host organizations Beta Brand and Apple Tree Inc., Brandon from ACME Corporation can request that ACME Corporation be reconnected with the #wholesale-strategy channel. The component of the server(s) 102 of the component of the server(s) 102 can thus be configured to transmit connection requests to the admin users of Beta Brand (Lisa) and Apple Tree (John). Such connection requests can invite Beta Brand and Apple Tree Inc. to reconnect with ACME Corporation in the #wholesale-strategy channel.

In some examples, when a user and/or organization reconnects to a shared resource, the membership of the shared resource may have changed. That is, in some examples, the same organizations can be associated with a shared resource when a user and/or organization disconnects and reconnects to the shared resource. In some examples, however, an organization can leave a shared resource and/or another organization can join the shared resource between when the organization disconnected with the shared resource and reconnects with the shared resource.

Returning to the ACME Corporation example, after ACME Corporation disconnected from the #wholesale-strategy channel, Beta Brand can disconnect with the channel. In such an example, when ACME Corporation reconnects with the #wholesale-strategy channel, Apple Tree Inc. can be the only organization in the channel. In another example, another organization, Delta Team, can join the channel after ACME Corporation disconnects. As such, when ACME Corporation reconnects with the channel, Beta Brand, Apple Tree Inc., and Delta Team can all be connected with the #wholesale-strategy channel.

Managing Organization Connections

Figure 25:
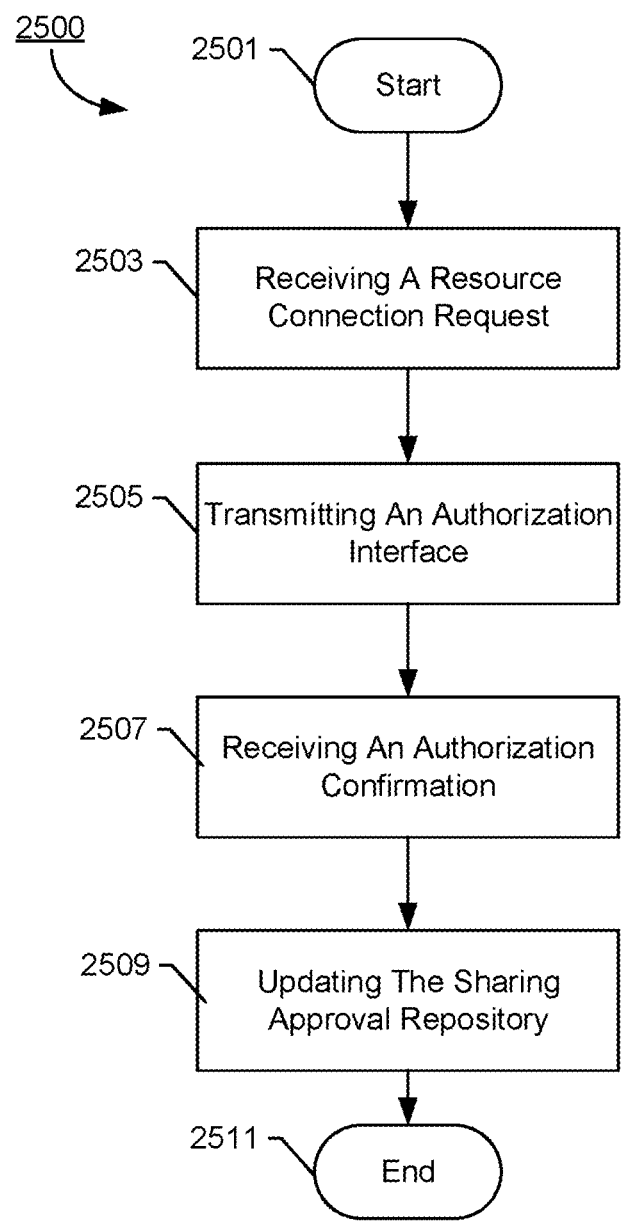

Referring now to FIG. 25, an example method 2500 is illustrated. In particular, the example method 2500 illustrates examples of managing organization connections in a communication platform.

The example method 2500 starts at block 2501. At block 2503, the component of the server(s) 102 can receive a resource connection request associated with a resource of the communication platform. In some examples, the resource connection request can be received from a user computing device. In some examples, the resource connection request can comprise a first organization identifier and a resource identifier associated with the resource.

Returning to the ACME Corporation example, Lisa, associated with Beta Brand, operating a user computing device, can cause the user computing device to transmit a resource connection request indicating a request to connect organization Beta Brand to the shared resource, #wholesale-strategy channel. In this example, the resource connection request can comprise the organization identifier for the organization Beta Brand, and the channel identifier for the channel, #wholesale-strategy.

At block 2505, the component of the server(s) 102 can transmit an authorization interface to a user computing device associated with a host organization identifier of the shared resource. In some examples, the user computing device can be associated with an admin user. In some examples, the authorization interface can be renderable for display via the user computing device associated with the host organization identifier of the shared resource. In some examples, the authorization interface can be associated with the resource connection request.

The term "authorization interface" can refer to a modal, window, menu, pane, or other graphical user interface element that is configured to enable admin user selection of an action to be taken, for example, in association with a shared resource candidate request or a shareable resource access request. In at least one example, the component of the server(s) 102 can be configured to render data associated with a shared resource candidate request or the shareable resource access request to an authorization interface such that an admin user associated with a host organization can consider and potentially approve a new member connection associated with a shareable resource.

In at least one example, a shared resource candidate request can refer to a demand or instruction that is generated by the component of the server(s) 102 in response to receiving a confirmation indication from user computing device associated with a target user identifier of a shareable resource. Data associated with the shared resource candidate request can be rendered to an admin user computing device associated with an admin user associated with the organization identifier of the shared resource candidate request. In some examples, a shared resource candidate request can comprise a shared channel candidate request, which can be a shared resource candidate request associated with a channel.

As used herein, the term "confirmation indication" refers to a demand or instruction generated by a user computing device and transmitted to the server(s) 102 in response to the user computing device receiving, for example, a shareable resource request, and the user associated with the user computing device subsequently approving the request. The confirmation indication can comprise data associated with a shareable resource, such as the sending user identifier, resource identifier, a receiving user identifier associated with a user who initiated the generation of the confirmation indication, and, in some examples, data associated with a workspace to associate with the resource identifier. Authorization interfaces and/or confirmation indications can be additionally or alternatively used for authorizing and/or confirming reconnection requests and/or the like.

Continuing from the example above, based on the table data associated with the #wholesale-strategy channel, the component of the server(s) 102 can determine that an organization ACME Corporation is the host organization of the #wholesale-strategy channel. The component of the server(s) 102 can also determine that a user identifier associated with Brandon indicates that Brandon is an admin user of the ACME Corporation. The component of the server(s) 102 can generate an authorization interface that is renderable for display by a user computing device associated with Brandon, and the authorization interface can comprise a rendering of the resource connection request, indicating that Lisa from Beta Brand requests that Beta Brand to be connected to the #wholesale-strategy channel.

At block 2507, the component of the server(s) 102 can receive an authorization confirmation associated with the resource connection request. In at least one example, an authorization confirmation can comprise a demand or instruction that is generated by a user computing device and transmitted to the component of the server(s) 102 in response to the user computing device receiving a shared resource candidate request and the user associated with the user computing device subsequently approving the request. In at least one example, the user computing device can be an admin user computing device operable by an admin user.

Continuing from the example above, Brandon can provide a user input to the user computing device indicating approval of Beta Brand connecting to the #wholesale-strategy channel. Based on user input, Brandon's user computing device can generate and transmit an authorization confirmation to the component of the server(s) 102.

At block 2509, the component of the server(s) 102 can update the sharing approval repository 206. For example, the component of the server(s) 102 can update the sharing approval repository 206 to add a sharing approval indication associated with the organization identifier of the resource reconnection request to table data associated with the resource identifier. In such an example, admin users from the host organization of the shared resource can control whether to connect another organization to the shared resource. Additionally, or alternatively, admin users from the non-host organizations of the shared resource can control whether to connect another organization to the shared resource, details of which are described herein.

Continuing from the above example, the component of the server(s) 102 can update the sharing approval repository 206 to add a sharing approval indication associated with the organization identifier for Beta Brand to the table data associated with the channel identifier for the #wholesale-strategy channel, indicating that Beta Brand is now connected to the #wholesale-strategy channel.

The example method 2500 ends at block 2511.

While the above description illustrates examples of managing organization connections to a shared resource from a perspective of a host organization, it is noted that the scope of the present disclosure is not limited to these examples.

In some examples, examples of the present disclosure can be implemented from a perspective of a non-host organization that has already been a member organization of the shared resource in connection with managing organization connections.

In some examples, each of the non-host organizations associated with the shared resource can be associated with a corresponding invitation policy setting. For example, the corresponding invitation policy setting can indicate that any new organizations to be connected to the shared resource must be approved by at least one admin user of the organization. As another example, the corresponding invitation policy setting can indicate that admin user of the organization does not need to approve any new organizations to be connected to the shared resource.

Returning to the examples discussed above concerning ACME Corporation, Beta Brand, and Apple Tree Inc., ACME Corporation can invite Delta Team to connect to the #wholesale-strategy channel and Delta Team can accept the invitation to connect. Subsequent to Delta Team accepting the invitation to connect, the component of the server(s) 102 can retrieve invitation policy settings associated with each of the non-host organizations, Beta Brand and Apple Tree Inc. In one example, the invitation policy setting associated with Beta Brand can indicate that any new organizations to be connected to any shared resource to which its member users below must be approved by at least one admin user of Beta Brand. Accordingly, the communication platform can transmit an authorization request to a user computing device associated with an admin user of Beta Brand (for example, Lisa), and can only connect Delta Team to the #wholesale-strategy channel if Lisa provides an authorization indication in response to the authorization request. Additionally, or alternatively, the invitation policy setting associated with Apple Tree Inc. can indicate that any new organizations to be connected to the shared resource does not need to be approved by an admin user of Apple Tree Inc. Accordingly, the component of the server(s) 102 can forgo transmitting any authorization request to a user computing device associated with an admin user of Apple Tree Inc.

In some other examples, the communication platform can generate and transmit an electronic notification to admin users associated with non-host organizations after a host organization has invited another organization to a particular shared resource and the invited organization has accepted the invitation. The electronic notification can comprise an authorization request that can comprise an electronic request to the admin user of the non-host organization to confirm whether to allow the invited organization to be connected to the shared resource.

Continuing from the above example related to ACME Corporation, Beta Brand, and Apple Tree Inc. in which ACME Corporation has invited Delta Team to connect to the #wholesale-strategy channel and Delta Team has accepted, the component of the server(s) 102 can be configured to generate and transmit an electronic notification comprising an authorization request to admin users associated with Beta Brand and Apple Tree Inc. If both admin users associated with Beta Brand and Apple Tree Inc. approve the authorization request, Delta Team can be connected to the #wholesale-strategy channel. If any one admin user of Beta Brand and/or Apple Tree Inc. does not approve the authorization request, Delta Team may not be connected to the #wholesale-strategy channel.

In still other examples, one or more admin users of the non-host organizations can opt out of receiving the electronic notifications triggered by invitations associated with a particular shared resource. For example, the admin user of Beta Brand can opt out of receiving the electronic notification triggered by invitations associated with #wholesale-strategy channel. As such, when Delta Team accepts the invitation to connect to the #wholesale-strategy channel, the component of the server(s) 102 can determine that Beta Brand is deemed to approve connecting Delta Team to the #wholesale-strategy channel, and may not generate an electronic notification to a user computing device associated with admin users of the Beta Brand. In this example, the admin users of Beta Brand can still opt in to receive electronic notifications from other shared resources.

Updating A User Interface

Figure 26:
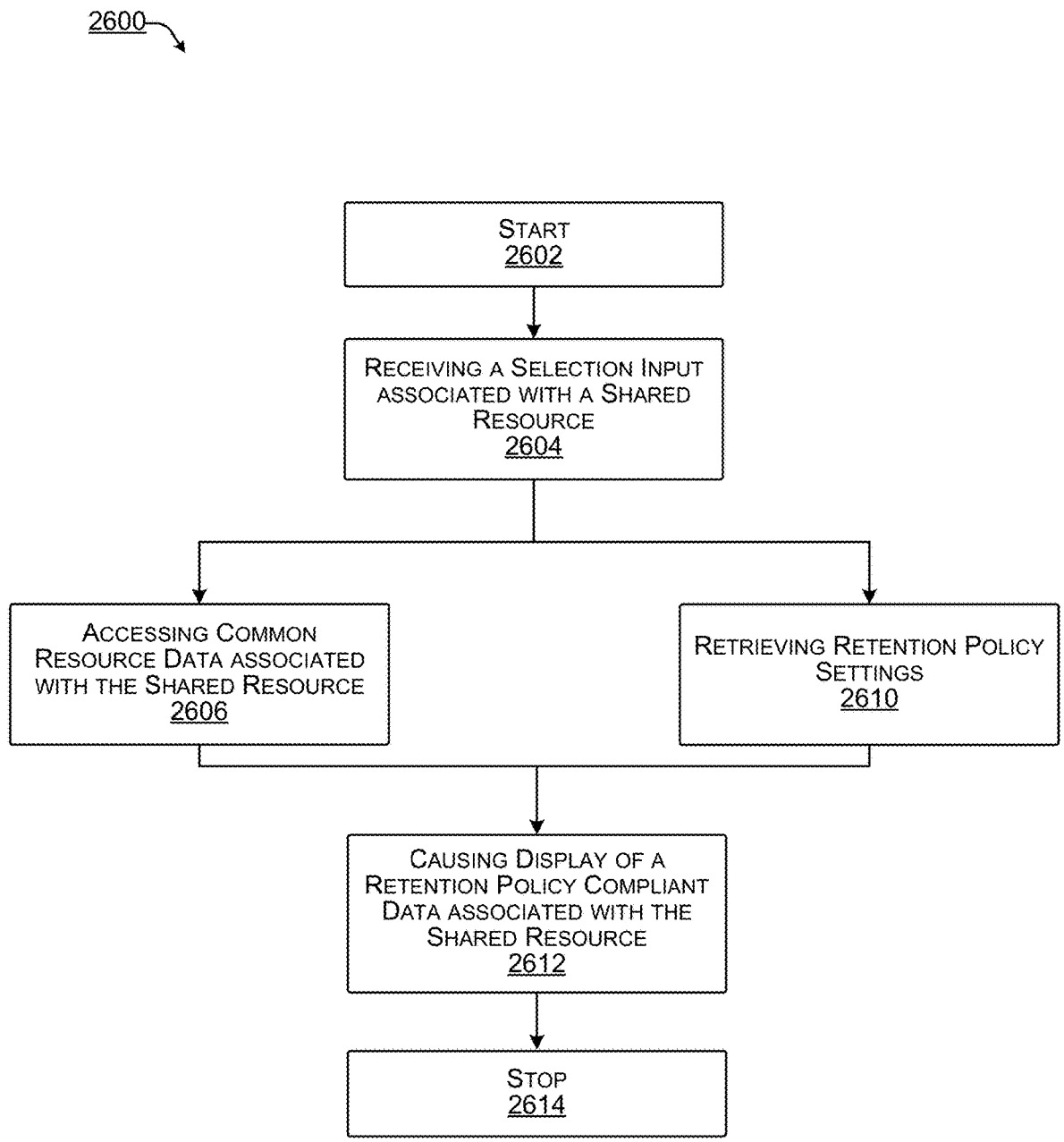

Referring now to FIG. 26, an example method 2600 is illustrated. In particular, the example method 2600 illustrates examples of updating user interface in a communication platform.

The example method 2600 starts at block 2602.

At block 2604, a component of the server(s) 102 can receive a selection input associated with a shared resource. In some examples, the selection input associated with a shared resource that is rendered for display on a user interface of a user computing device. In some examples, the shared resource can be configured to accessed by two or more member organizations. In some examples, the two or more member organizations are respectively associated with one of a host organization identifier and at least one non-host organization identifier.

For example, in the ACME Corporation example, Brandon from ACME Corporation can access a user interface for a shared resource, #wholesale-strategy channel by, for example, clicking, tapping, or otherwise selecting a channel title for #wholesale-strategy channel on the user interface.

As described above, the #wholesale-strategy channel can be configured for access by organizations ACME Corporation, Beta Brand, and Apple Tree Inc. ACME Corporation can be associated with a host organization identifier. Beta Brand can be associated with a first non-host organization identifier. Apple Tree can be associated with a second non-host organization identifier.

At block 2606, the component of the server(s) 102 can access common resource data retrieved from the live shared resource repository 204. In some examples, the live shared resource repository 204 can be associated with the shared resource in connection with the selection input. As described above, the live shared communication repository 204 can include a corpus of common resource data that is available to and used by user computing devices of all member users associated with a particular shared resource. Such common resource data includes all content of the shared resource such as message data, file data, object data, and the like.

Continuing from the above example, the live shared resource repository 204 can be associated with the #wholesale-strategy channel. As such, the common resource data can include messages and/or other data associated with the #wholesale-strategy channel.

At block 2610, the component of the server(s) 102 can retrieve a retention policy setting associated with each member organization of the shared resource. As described above, a user for each organization can establish a corresponding retention policy setting that can indicate a data retention policy of the organization. The data retention policy can provide protocol for retaining information for regulatory compliance and/or operational needs.

Continuing from the above example, the component of the server(s) 102 can retrieve first retention policy settings associated with ACME Corporation. The component of the server(s) 102 can retrieve second retention policy settings associated with Beta Brand. The component of the server(s) 102 can retrieve third retention policy settings associated with Apple Tree Inc.

At block 2612, the component of the server(s) 102 can cause display, in the user interface, of data associated with the shared resource that is compliant with the retention policy settings. In an example where the shared resource is a shared channel, the user interface can present a plurality of messages and/or other data associated with the shared channel. In some examples, causing display of the plurality of messages can comprise causing display via a user computing device associated with each member organization of retention policy compliant data that is selected based on applying the corresponding retention policy settings to the common resource data.

Continuing from the above example, the component of the server(s) 102 can cause display to a user computing device associated with ACME Corporation of first retention policy compliant data that is selected based on applying the first retention policy settings of ACME Corporation to the common resource data. For example, the first retention policy compliant data can only comprise messages and/or other data that are in compliance with the first retention policy settings.

Continuing from the above example, the component of the server(s) 102 can cause display to a user computing device associated with Beta Brand of second retention policy compliant data that is selected based on applying the second retention policy settings of Beta Brand to the common resource data. For example, the second retention policy compliant data can only comprise messages and/or other data that are in compliance with the second retention policy settings. Additionally, or alternatively, the component of the server(s) 102 can also apply the first retention policy settings of the ACME Corporation (a host organization) to the common resource data when generating the retention policy compliant data for Beta Brand (a non-host organization).

Continuing from the above example, the component of the server(s) 102 can cause display to a user computing device associated with Apple Tree Inc. of third retention policy compliant data that is selected based on applying the third retention policy settings of Apple Tree Inc. to the common resource data. For example, the third retention policy compliant data can only comprise messages and/or data that are in compliance with the third retention policy settings. Additionally, or alternatively, the component of the server(s) 102 can also apply the third retention policy settings of the ACME Corporation (a host organization) to the common resource data when generating the retention policy compliant message set for Apple Tree Inc. (a non-host organization).

The example method 2600 ends at block 2614.

Figure 27:
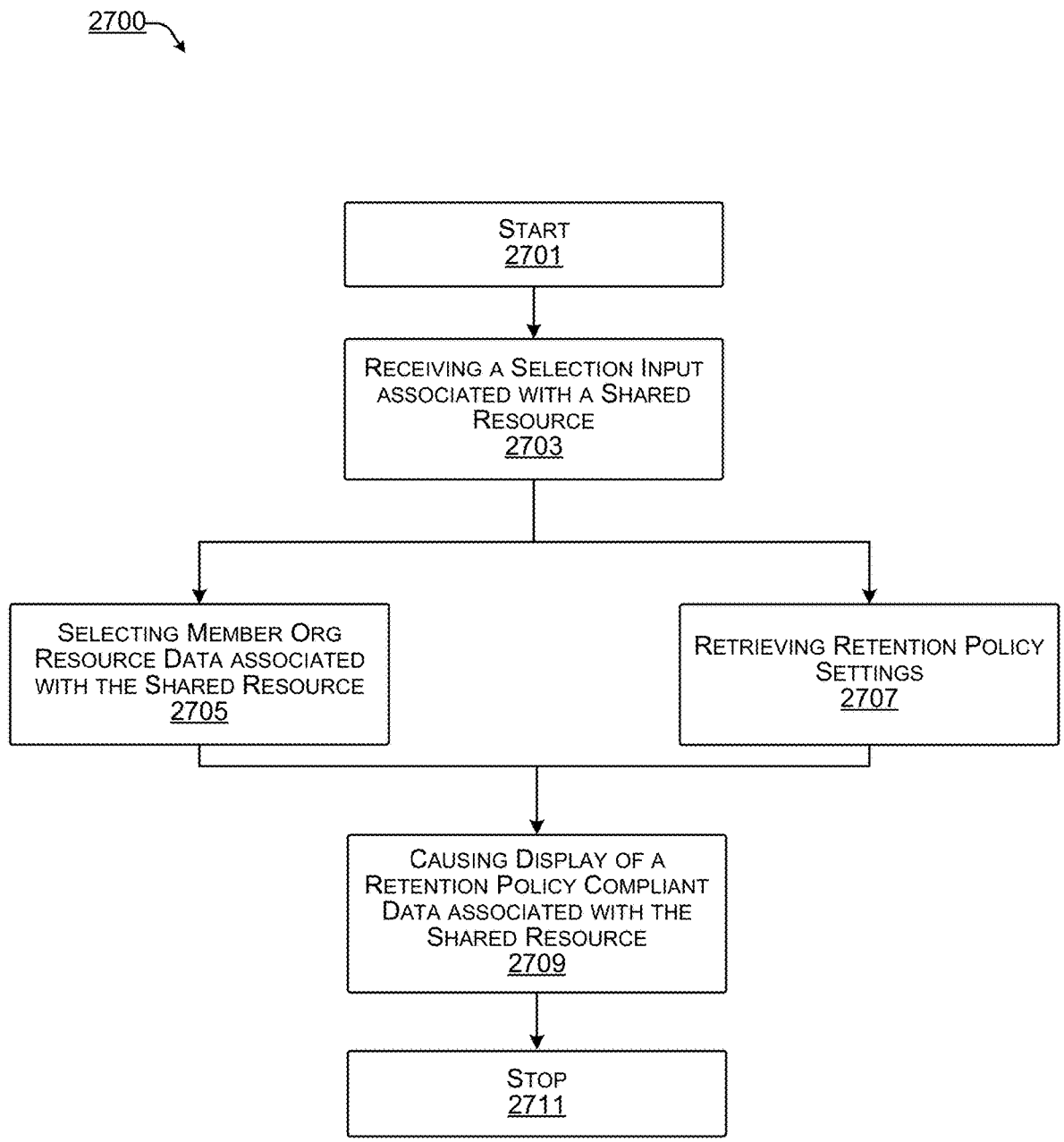

Referring now to FIG. 27, an example method 2700 is illustrated. In particular, the example method 2700 illustrates examples of updating a user interface associated with a communication platform.

The example method 2700 starts at block 2701.

At block 2703, the component of the server(s) 102 can receive a selection input associated with a shared resource, similar to those described above in connection with at least block 2604 of FIG. 26.

At block 2705, the component of the server(s) 102 can select member organization resource data for each organization associated with the shared resource from the common resource data retrieved from a live shared resource repository 204. As described above, common resource data can be queried or otherwise partitioned based on organization identifier to isolate member organization channel data that has been contributed by each respective member organization of the shared resource.

Continuing from the example above, the common resource data can comprise first member organization channel data that has been contributed by ACME Corporation, including messages that are provided to the #wholesale-strategy channel by members of ACME Corporation. The common resource data can comprise second member organization channel data that has been contributed by Beta Brand, including messages that are provided to the #wholesale-strategy channel by members of Beta Brand. The common resource data can comprise third member organization channel data that has been contributed by Apple Tree Inc., including messages that are provided to the #wholesale-strategy channel by members of Apple Tree Inc.

At block 2707, the component of the server(s) 102 can retrieve retention policy settings associated with each organization, similar to those described above in connection with at least block 2610 of FIG. 26.

At block 2709, the component of the server(s) 102 can cause display, in a user interface, of data associated with the shared resource. In an example where the shared resource is a shared channel, the data can comprise a plurality of messages and/or other data associated with the shared channel. In some examples, causing display the plurality messages comprises causing display to a user computing device associated with each member organization of retention policy compliant data that is selected based on applying the corresponding retention policy settings to the corresponding member organization channel data.

Continuing from the above example, the component of the server(s) 102 can cause display to a user computing device associated with ACME Corporation of first retention policy compliant data that is selected based on applying the first retention policy settings of ACME Corporation to the member organization channel data of ACME Corporation. For example, the first retention policy compliant data can comprise messages and/or that are contributed to the #wholesale-strategy channel by members of ACME Corporation. Such messages and/or data can be rendered for display in compliance with the first retention policy settings of ACME Corporation. For example, the first retention policy settings of ACME Corporation can set deletion time for member organization channel data of ACME Corporation.

Continuing from the above example, the component of the server(s) 102 can cause display to a user computing device associated with Beta Brand of second retention policy compliant data that is selected based on applying the second retention policy settings of Beta Brand to the member organization channel data of Beta Brand. For example, the second retention policy compliant data can comprise messages and/or data that are contributed to the #wholesale-strategy channel by members of Beta Brand. Such messages and/or data can be rendered for display in compliance with the second retention policy settings of Beta Brand. For example, the second retention policy settings of Beta Brand can set deletion time for member organization channel data of Beta Brand.

Continuing from the above example, the component of the server(s) 102 can cause display to a user computing device associated with Apple Tree Inc. of third retention policy compliant data that is selected based on applying the third retention policy settings of Apple Tree Inc. to the member organization channel data of Apple Tree Inc. For example, the third retention policy compliant data can comprise messages and/or data that are contributed to the #wholesale-strategy channel by members of Apple Tree Inc. Such messages and/or data can be rendered for display in compliance with the third retention policy settings of Apple Tree Inc. For example, the third retention policy settings of Apple Tree Inc. can set deletion time for member organization channel data of Apple Tree.

The example method 2700 ends at block 2711.

Figure 28:
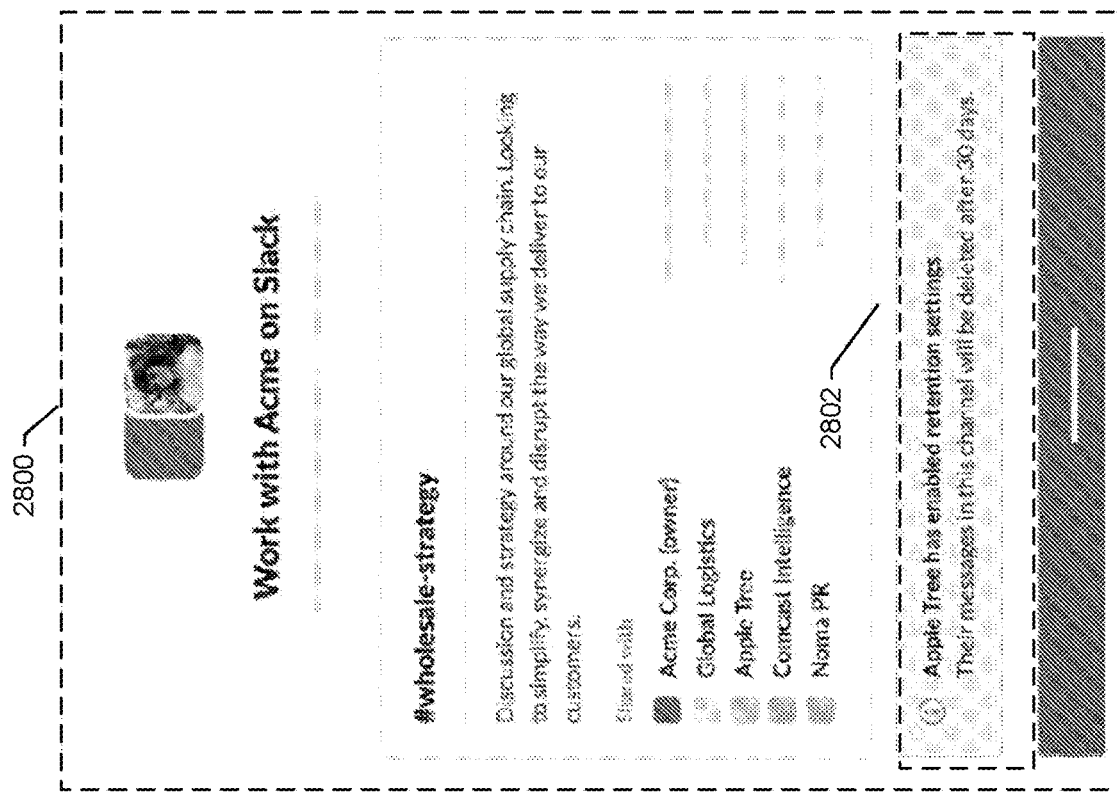
FIG. 28 is an example illustration showing example elements associated with example group-based communication interfaces in accordance with some examples of the present disclosure.

Referring now to FIG. 28, an example user interface 2800 is illustrated. In particular, the example user interface 2800 can comprise a retention policy setting notification 2802, including that one or more organizations associated with the shared resource have enabled one or more retention policy settings.

INCORPORATION BY REFERENCE

The entire contents of the following patent applications are incorporated herein by reference:

U.S. Patent Application Publication No. 2019/0026298, titled Method, Apparatus And Computer Program Product For Generating Externally Shared Communication Channels and filed Jul. 20, 2017, now known as U.S. Pat. No. 10,541,825, which issued on Jan. 21, 2020;

U.S. Patent Application Publication No. 2019/0028287, titled Method, Apparatus And Computer Program Product For Generating Externally Shared Communication Channels and filed Nov. 17, 2017, now known as U.S. Pat. No. 10,880,111, which issued on Dec. 29, 2020;

U.S. Patent Application Publication No. 2019/0098087, titled Method, Apparatus And Computer Program Product For Generating Externally Shared Communication Channels and filed Nov. 30, 2018, now known as U.S. Pat. No. 10,402,371, which issued on Sep. 3, 2019;

U.S. patent application Ser. No. 16/681,452, titled Authorizations Associated With Externally Shared Communication Resources and filed Nov. 12, 2019; and U.S. Patent Application No. 62/886,877, titled Dynamically Generated Context Pane Within A Group-Based Communication Interface and filed Aug. 14, 2019.

As used herein, the term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one example," "according to one example," "in some examples," "for example," and the like generally mean that the particular feature, structure, or characteristic following the phrase can be included in an example of the present disclosure, and can be included in more than one example of the present disclosure (importantly, such phrases do not necessarily refer to the same example).

Indeed, the disclosure can be embodied in many different forms and should not be construed as limited to the examples set forth herein. Rather, embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level.

While this specification contains many specific implementation details, these should not be construed as limitations on the scope of any disclosures or of what can be claimed, but rather as description of features specific to particular examples of particular disclosures. Certain features that are described herein in the context of separate examples can also be implemented in combination in a single example. Conversely, various features that are described in the context of a single example can also be implemented in multiple examples separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing can be advantageous. Moreover, the separation of various system components in the examples described above should not be understood as requiring such separation in all examples, and it should be understood that the described program components and systems can generally be integrated together in a single software product or packaged into multiple software products.

Thus, particular examples of the subject matter have been described. Other examples are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing can be advantageous.

Many modifications and other examples of the disclosures set forth herein will come to mind to one skilled in the art to which these disclosures pertain having the benefit of the teachings presented in the foregoing description and the associated drawings. Therefore, it is to be understood that the disclosures are not to be limited to the specific examples disclosed and that modifications and other examples are intended to be included within the scope of the appended claims. Although specific terms are employed herein, they are used in a generic and descriptive sense only and not for purposes of limitation, unless described otherwise.

Example Paragraphs

A. A computer-implemented method for managing organization connections from an externally shared communication resource of a group-based communication system, wherein the externally shared communication resource is associated in a sharing approval repository with a host organization identifier and one or more non-host organization identifiers, the computer-implemented method comprising: in response to receiving, from a client device associated with one of the host organization identifier or the one or more non-host organization identifiers, a resource disconnection request comprising a disconnecting organization identifier and a group-based communication resource identifier associated with the externally shared communication resource, updating the sharing approval repository to add a disconnection indication for the group-based communication resource identifier in association with the disconnecting organization identifier, and in response to the updating the sharing approval repository, deactivating at least one user associated with the disconnecting organization identifier from receiving updates associated with the externally shared communication resource.

B. The computer-implemented method of paragraph A, further comprising: transmitting, to the client device, a disconnection authorization interface renderable for display by the client device, wherein the disconnection authorization interface is associated with the externally shared communication resource, and the client device is associated with an admin user identifier that is associated with the one of the host organization identifier or the one or more non-host organization identifiers; and causing generation of the resource disconnection request in response to admin user confirmation input generated in response to user engagement of the disconnection authorization interface.

C. The computer-implemented method of paragraph A or B, further comprising: generating a static communication resource repository copy of a live shared communication resource repository associated with the externally shared communication resource; and in response to receiving an externally shared selection input associated with the group-based communication resource identifier and the disconnecting organization identifier, causing rendering to a group-based communication interface associated with the disconnecting organization identifier of a static externally shared communication resource generated based at least in part on the static communication resource repository copy.

D. The computer-implemented method of paragraph C, further comprising: retrieving a retention policy setting associated with the externally shared communication resource, wherein generating the static communication resource repository copy of the live shared communication resource repository associated with the externally shared communication resource is based at least in part on the retention policy setting.

E. The computer-implemented method of any of paragraphs A-D, wherein the client device is associated with the host organization identifier.

F. The computer-implemented method of paragraph E, wherein the resource disconnection request comprises the disconnecting organization identifier and an additional disconnecting organization identifier each associated with the group-based communication resource identifier, and wherein updating the sharing approval repository comprises: adding the disconnection indication for the group-based communication resource identifier in association with the disconnecting organization identifier; and adding an additional disconnection indication for the group-based communication resource identifier in association with the additional disconnecting organization identifier.

G. The computer-implemented method of paragraph F, further comprising: generating a static communication resource repository copy of a live shared communication resource repository associated with the externally shared communication resource associated with the disconnecting organization identifier; generating an additional static communication resource repository copy of the live shared communication resource repository associated with the externally shared communication resource associated with the additional disconnecting organization identifier; and in response to receiving an externally shared selection input associated with the group-based communication resource identifier and at least one of the disconnecting organization identifier or the additional disconnecting organization identifier, causing rendering to a group-based communication interface associated with the at least one of the disconnecting organization identifier or the additional disconnecting organization identifier of a static externally shared communication resource generated respectively based at least in part on the static communication resource repository copy or the additional static communication resource repository copy.

H. The computer-implemented method of any of paragraphs A-G, wherein the client device is associated with one of the one or more non-host identifiers.

I. The computer-implemented method of any of paragraphs A-H, wherein the externally shared communication resource is an externally shared group-based communication channel.

J. The computer-implemented method of any of paragraphs A-I, wherein the externally shared communication resource is an externally shared group-based communication workspace.

K. The computer-implemented method of any of paragraphs A-J, wherein the client device is associated with the host organization identifier, and wherein the externally shared communication resource is a plurality of externally shared group-based communication channels.

L. The computer-implemented method of any of paragraphs A-K, wherein the externally shared communication resource is a multi-organization direct messaging conversation.

M. The computer-implemented method of any of paragraphs A-L, wherein the updating the sharing approval repository to add the disconnection indication for the group-based communication resource identifier in association with the disconnecting organization identifier does not limit other member organizations from receiving updates associated with the externally shared communication resource.

N. The computer-implemented method of any of paragraphs A-M, wherein the updating the sharing approval repository to add the disconnection indication for the group-based communication resource identifier in association with the disconnecting organization identifier further deactivates the at least one user associated with the disconnecting organization identifier from engaging in direct messaging communications with other member users associated with the externally shared communication resource.

O. The computer-implemented method of any of paragraphs A-N, further comprising: receiving, from a disconnected client device associated with the disconnecting organization identifier, a resource reconnection request comprising the disconnecting organization identifier and a group-based communication resource identifier associated with the externally shared communication resource; and transmitting to the disconnected client device an error interface that is renderable for display to the disconnected client device.

P. The computer-implemented method of any of paragraphs A-O, further comprising: determining that the disconnecting organization identifier is the host organization identifier; generating a static communication resource repository copy of a live shared communication resource repository associated with the externally shared communication resource; and in response to receiving an externally shared selection input associated with the group-based communication resource identifier and one of the non-host identifiers, causing rendering to a group-based communication interface associated with the non-host identifiers of a static externally shared communication resource generated based at least in part on the static communication resource repository copy.

Q. The computer-implemented method of paragraph P, further comprising: in response to receiving a host externally shared selection input associated with the group-based communication resource identifier and the host identifier, causing rendering to a group-based communication interface associated with the host identifier of a live externally shared communication resource generated based at least in part on the live communication resource repository.

R. The computer-implemented method of any of paragraphs A-Q, further comprising: generating a static communication resource repository copy of a live shared communication resource repository associated with the externally shared communication resource; and in response to receiving an externally shared selection input associated with the group-based communication resource identifier and the disconnecting organization identifier, causing rendering to a group-based communication interface associated with the disconnecting organization identifier of a static externally shared communication resource generated based at least in part on the static communication resource repository copy.

S. The computer-implemented method of any of paragraphs A-R, further comprising: retrieving a retention policy setting associated with the externally shared communication resource, wherein generating the static communication resource repository copy of the live shared communication resource repository associated with the externally shared communication resource is based at least in part on the retention policy setting.

T. The computer-implemented method of any of paragraphs A-S, further comprising: in response to receiving, from a host client device associated with the host organization identifier, a resource reconnection request comprising the disconnecting organization identifier and a group-based communication resource identifier associated with the externally shared communication resource, updating the sharing approval repository to add a reconnection indication for the group-based communication resource identifier in association with the disconnecting organization identifier.

U. The computer-implemented method of paragraph T, further comprising: in response to receiving an externally shared selection input associated with the group-based communication resource identifier and the disconnecting organization identifier, causing rendering to a group-based communication interface associated with the disconnecting organization identifier of the externally shared communication resource generated based at least in part on the live shared communication resource repository.

V. The computer-implemented method of paragraph U, wherein the externally shared communication resource is an externally shared group-based communication channel.

W. The computer-implemented method of paragraph U or V, wherein the externally shared communication resource is an externally shared group-based communication workspace.

X. The computer-implemented method of any of paragraphs U-W, wherein the client device is associated with the host organization identifier, and wherein the externally shared communication resource is a plurality of externally shared group-based communication channels.

Y. A computer-implemented method for managing organization connections from an externally shared communication resource of a group-based communication system, wherein the externally shared communication resource is associated in a sharing approval repository with a host organization identifier and a plurality of non-host organization identifiers, the computer-implemented method comprising: in response to receiving, from a client device associated with one of the host organization identifier or the plurality of non-host organization identifiers, a resource disconnection request comprising a disconnecting organization identifier and a group-based communication resource identifier associated with the externally shared communication resource, updating the sharing approval repository to add a disconnection indication for the group-based communication resource identifier in association with the disconnecting organization identifier.

Z. A computer-implemented method for managing organization connections from an externally shared communication resource of a group-based communication system, wherein the externally shared communication resource is associated in a sharing approval repository with a host organization identifier and one or more non-host organization identifiers, the computer-implemented method comprising: in response to receiving, from a client device associated with a new organization identifier, a shareable resource access request comprising the new organization identifier and a group-based communication resource identifier associated with the externally shared communication resource, transmitting, to an admin client device, an authorization interface renderable for display by the admin client device, wherein the authorization interface is associated with the shareable resource access request, wherein the admin client device is associated with a respective admin user identifier associated with the host organization identifier; and in response to receiving an authorization confirmation associated with the shareable resource access request, updating the sharing approval repository to add a sharing approval indication associated with the new organization identifier and the group-based communication resource identifier.

AA. A computer-implemented method for updating a group-based communication interface, the computer-implemented method comprising: causing display in the group-based communication interface of a plurality of group-based communication messages associated with an externally shared communication channel, wherein the externally shared communication channel is configured for access by three or more member organizations.

AB. The computer implemented method of paragraph AA, wherein the three or more member organizations are respectively associated with one of a host organization identifier, a first non-host organization identifier, or a second non-host organization identifier.

AC. The computer implemented method of paragraph AB, wherein the plurality of group-based communication messages are each associated with an externally shared communication channel identifier and one of the host organization identifier, the first non-host organization identifier, or the second non-host organization identifier.

AD. The computer implemented method of any of paragraphs AA-AC, wherein the causing display in the group-based communication interface of the plurality of group-based communication messages includes accessing common channel data retrieved from a live shared communication channel repository.

AE. The computer implemented method of paragraph AD, wherein the causing display in the group-based communication interface of the plurality of group-based communication messages further comprises retrieving first retention policy settings associated with a first member organization of the three or more member organizations and causing display to a first client device of a first retention policy compliant message set that is selected based on applying the first retention policy settings to the common channel data.

AF. The computer implemented method of paragraph AE, wherein the causing display in the group-based communication interface of the plurality of group-based communication messages further comprises retrieving second retention policy settings associated with a second member organization of the three or more member organizations and causing display to a second client device of a second retention policy compliant message set that is selected based on applying the second retention policy settings to the common channel data.

AG. The computer implemented method of paragraph AF, wherein the causing display in the group-based communication interface of the plurality of group-based communication messages further comprises retrieving third retention policy settings associated with a third member organization of the three or more member organizations and causing display to a third client device of a third retention policy compliant message set that is selected based on applying the third retention policy settings to the common channel data.

AH. The computer implemented method of any of paragraphs AD-AG, wherein the common channel data comprises message data, file data, or object data.

AI. The computer implemented method of any of paragraphs AD-AH, wherein the causing display in the group-based communication interface of the plurality of group-based communication messages further comprises retrieving first retention policy settings associated with a first member organization of the three or more member organizations, selecting first member organization channel data from the common channel data, and causing display to a first client device of a first retention policy compliant message set that is selected based on applying the first retention policy settings to the first member organization channel data.

AJ. The computer implemented method of paragraph AI, wherein the causing display in the group-based communication interface of the plurality of group-based communication messages further comprises retrieving second retention policy settings associated with a second member organization of the three or more member organizations, selecting second member organization channel data from the common channel data, and causing display to a second client device of a second retention policy compliant message set that is selected based on applying the second retention policy settings to the second member organization channel data.

AK. The computer implemented method of paragraph AJ, wherein the causing display in the group-based communication interface of the plurality of group-based communication messages further comprises retrieving third retention policy settings associated with a third member organization of the three or more member organizations, selecting third member organization channel data from the common channel data, and causing display to a third client device of a third retention policy compliant message set that is selected based on applying the third retention policy settings to the third member organization channel data.

AL. An apparatus for managing organization connections from an externally shared communication resource of a group-based communication system, wherein the externally shared communication resource is associated in a sharing approval repository with a host organization identifier and one or more non-host organization identifiers, the apparatus comprising at least one processor and at least one non-transitory memory comprising program code, the at least one non-transitory memory and the program code configured to, with the at least one processor, cause the apparatus to at least: in response to receiving, from a client device associated with one of the host organization identifier or the one or more non-host organization identifiers, a resource disconnection request comprising a disconnecting organization identifier and a group-based communication resource identifier associated with the externally shared communication resource, update the sharing approval repository to add a disconnection indication for the group-based communication resource identifier in association with the disconnecting organization identifier, and in response to the updating the sharing approval repository, deactivate at least one user associated with the disconnecting organization identifier from receiving updates associated with the externally shared communication resource.

AM. An apparatus for managing organization connections from an externally shared communication resource of a group-based communication system, wherein the externally shared communication resource is associated in a sharing approval repository with a host organization identifier and a plurality of non-host organization identifiers, the apparatus comprising at least one processor and at least one non-transitory memory comprising program code, the at least one non-transitory memory and the program code configured to, with the at least one processor, cause the apparatus to at least: in response to receiving, from a client device associated with one of the host organization identifier or the plurality of non-host organization identifiers, a resource disconnection request comprising a disconnecting organization identifier and a group-based communication resource identifier associated with the externally shared communication resource, update the sharing approval repository to add a disconnection indication for the group-based communication resource identifier in association with the disconnecting organization identifier.

AN. An apparatus for managing organization connections from an externally shared communication resource of a group-based communication system, wherein the externally shared communication resource is associated in a sharing approval repository with a host organization identifier and one or more non-host organization identifiers, the apparatus comprising at least one processor and at least one non-transitory memory comprising program code, the at least one non-transitory memory and the program code configured to, with the at least one processor, cause the apparatus to at least: in response to receiving, from a client device associated with a new organization identifier, a shareable resource access request comprising the new organization identifier and a group-based communication resource identifier associated with the externally shared communication resource, transmit, to an admin client device, an authorization interface renderable for display by the admin client device, wherein the authorization interface is associated with the shareable resource access request, wherein the admin client device is associated with a respective admin user identifier associated with the host organization identifier; and in response to receiving an authorization confirmation associated with the shareable resource access request, update the sharing approval repository to add a sharing approval indication associated with the new organization identifier and the group-based communication resource identifier.

AO. An apparatus for updating a group-based communication interface, the apparatus comprising at least one processor and at least one non-transitory memory comprising program code, the at least one non-transitory memory and the program code configured to, with the at least one processor, cause the apparatus to at least: cause display in the group-based communication interface of a plurality of group-based communication messages associated with an externally shared communication channel, wherein the externally shared communication channel is configured for access by three or more member organizations.

AP. A computer program product for managing organization connections from an externally shared communication resource of a group-based communication system, wherein the externally shared communication resource is associated in a sharing approval repository with a host organization identifier and one or more non-host organization identifiers, the computer program product comprising at least one non-transitory computer-readable storage medium having computer-readable program code portions stored therein, the computer-readable program code portions comprising an executable portion configured to: in response to receiving, from a client device associated with one of the host organization identifier or the one or more non-host organization identifiers, a resource disconnection request comprising a disconnecting organization identifier and a group-based communication resource identifier associated with the externally shared communication resource, update the sharing approval repository to add a disconnection indication for the group-based communication resource identifier in association with the disconnecting organization identifier, and in response to the updating the sharing approval repository, deactivate at least one user associated with the disconnecting organization identifier from receiving updates associated with the externally shared communication resource.

AQ. A computer program product for managing organization connections from an externally shared communication resource of a group-based communication system, wherein the externally shared communication resource is associated in a sharing approval repository with a host organization identifier and a plurality of non-host organization identifiers, the computer program product comprising at least one non-transitory computer-readable storage medium having computer-readable program code portions stored therein, the computer-readable program code portions comprising an executable portion configured to: in response to receiving, from a client device associated with one of the host organization identifier or the plurality of non-host organization identifiers, a resource disconnection request comprising a disconnecting organization identifier and a group-based communication resource identifier associated with the externally shared communication resource, update the sharing approval repository to add a disconnection indication for the group-based communication resource identifier in association with the disconnecting organization identifier.

AR. A computer program product for managing organization connections from an externally shared communication resource of a group-based communication system, wherein the externally shared communication resource is associated in a sharing approval repository with a host organization identifier and one or more non-host organization identifiers, the computer program product comprising at least one non-transitory computer-readable storage medium having computer-readable program code portions stored therein, the computer-readable program code portions comprising an executable portion configured to: in response to receiving, from a client device associated with a new organization identifier, a shareable resource access request comprising the new organization identifier and a group-based communication resource identifier associated with the externally shared communication resource, transmit, to an admin client device, an authorization interface renderable for display by the admin client device, wherein the authorization interface is associated with the shareable resource access request, wherein the admin client device is associated with a respective admin user identifier associated with the host organization identifier; and in response to receiving an authorization confirmation associated with the shareable resource access request, update the sharing approval repository to add a sharing approval indication associated with the new organization identifier and the group-based communication resource identifier.

AS. A computer program product for updating a group-based communication interface, the computer program product comprising at least one non-transitory computer-readable storage medium having computer-readable program code portions stored therein, the computer-readable program code portions comprising an executable portion configured to: cause display in the group-based communication interface of a plurality of group-based communication messages associated with an externally shared communication channel, wherein the externally shared communication channel is configured for access by three or more member organizations.

AT. A computer-implemented method for managing organization disconnections from a shared resource of a communication platform, wherein, in a sharing approval repository associated with the communication platform, the shared resource is associated with a host organization identifier and non-host organization identifier, the computer-implemented method comprising: in response to receiving, from a user computing device, a resource disconnection request comprising a disconnecting organization identifier and a resource identifier associated with the shared resource, updating the sharing approval repository to add a disconnection indication for the resource identifier in association with the disconnecting organization identifier; in response to the updating the sharing approval repository, deactivating at least one user associated with the disconnecting organization identifier from receiving updates associated with the shared resource; generating a static shared resource associated with a portion of a live shared resource repository associated with the shared resource; and in response to receiving a selection input associated with the resource identifier and the disconnecting organization identifier, causing rendering of the static shared resource to a user interface associated with the disconnecting organization identifier.

AU. The computer-implemented method of paragraph AT, further comprising: transmitting, to the user computing device, a disconnection authorization interface renderable for display by the user computing device, wherein the disconnection authorization interface is associated with the shared resource; and causing generation of the resource disconnection request in response to admin user confirmation input generated in response to user engagement of the disconnection authorization interface.

AV. The computer-implemented method of paragraph AT or AU, further comprising: retrieving a retention policy setting associated with the shared resource, wherein generating the static shared resource is based at least in part on the retention policy setting.

AW. The computer-implemented method of any of paragraphs AT-AV, wherein the user computing device is associated with the host organization identifier, and wherein the resource disconnection request comprises the disconnecting organization identifier and an additional disconnecting organization identifier each associated with the resource identifier, and wherein updating the sharing approval repository comprises: adding the disconnection indication for the resource identifier in association with the disconnecting organization identifier; and adding an additional disconnection indication for the resource identifier in association with the additional disconnecting organization identifier.

AX. The computer-implemented method of any of paragraphs AT-AW, wherein the shared resource is at least one of a channel, a direct message, a board, or a workspace.

AY. The computer-implemented method of any of paragraphs AT-AX, further comprising: in response to receiving, from a host user computing device associated with the host organization identifier, a resource reconnection request comprising the disconnecting organization identifier and the resource identifier associated with the shared resource, updating the sharing approval repository to add a reconnection indication for the resource identifier in association with the disconnecting organization identifier.

AZ. The computer-implemented method of paragraph AY, further comprising: in response to receiving another selection input associated with the resource identifier and the disconnecting organization identifier, causing rendering, to a user interface associated with the disconnecting organization identifier, the shared resource generated based at least in part on data stored in the live shared resource repository.

BA. The computer-implemented method of paragraph AY or AZ wherein the shared resource, at a time when the resource reconnection request is received, is associated with at least one other non-host organization identifier.

BB. A system comprising: one or more processors; and one or more non-transitory computer-readable media storing instructions that, when executed by the one or more processors, cause the system to perform operations comprising: associating, in a sharing approval repository associated with a communication platform, a host organization identifier and non-host organization identifier with a resource identifier associated with a shared resource; in response to receiving, from a user computing device, a resource disconnection request comprising a disconnecting organization identifier and the resource identifier, updating the sharing approval repository to add a disconnection indication for the resource identifier in association with the disconnecting organization identifier; in response to the updating the sharing approval repository, deactivating at least one user associated with the disconnecting organization identifier from receiving updates associated with the shared resource; generating a static shared resource associated with a portion of a live shared resource repository associated with the shared resource; and in response to receiving a selection input associated with the resource identifier and the disconnecting organization identifier, causing rendering of the static shared resource to a user interface associated with the disconnecting organization identifier.

BC. The system of paragraph BB, the operations further comprising: transmitting, to the user computing device, a disconnection authorization interface renderable for display by the user computing device, wherein the disconnection authorization interface is associated with the shared resource; and causing generation of the resource disconnection request in response to admin user confirmation input generated in response to user engagement of the disconnection authorization interface.

BD. The system of paragraph BB or BC, the operations further comprising: retrieving a retention policy setting associated with the shared resource, wherein generating the static shared resource is based at least in part on the retention policy setting.

BE. The system of any of paragraphs BB-BD, wherein the shared resource is at least one of a channel, a direct message, a board, or a workspace.

BF. The system of any of paragraphs BB-BE, the operations further comprising: in response to receiving, from a host user computing device associated with the host organization identifier, a resource reconnection request comprising the disconnecting organization identifier and the resource identifier associated with the shared resource, updating the sharing approval repository to add a reconnection indication for the resource identifier in association with the disconnecting organization identifier.

BG. The system of paragraph BF, the operations further comprising: in response to receiving another selection input associated with the resource identifier and the disconnecting organization identifier, causing rendering, to a user interface associated with the disconnecting organization identifier, the shared resource generated based at least in part on data stored in the live shared resource repository.

BH. The system of paragraph BF or BG wherein the shared resource, at a time when the resource reconnection request is received, is associated with at least one other non-host organization identifier.

BI. One or more non-transitory computer-readable media storing instructions that, when executed by one or more processors, cause the one or more processors to perform operations comprising: associating, in a sharing approval repository associated with a communication platform, a host organization identifier and non-host organization identifier with a resource identifier associated with a shared resource; in response to receiving, from a user computing device, a resource disconnection request comprising a disconnecting organization identifier and the resource identifier, updating the sharing approval repository to add a disconnection indication for the resource identifier in association with the disconnecting organization identifier; in response to the updating the sharing approval repository, deactivating at least one user associated with the disconnecting organization identifier from receiving updates associated with the shared resource; generating a static shared resource associated with a portion of a live shared resource repository associated with the shared resource; and in response to receiving a selection input associated with the resource identifier and the disconnecting organization identifier, causing rendering of the static shared resource to a user interface associated with the disconnecting organization identifier.

BJ. The one or more non-transitory computer-readable media of paragraph BI, the operations further comprising: transmitting, to the user computing device, a disconnection authorization interface renderable for display by the user computing device, wherein the disconnection authorization interface is associated with the shared resource; and causing generation of the resource disconnection request in response to admin user confirmation input generated in response to user engagement of the disconnection authorization interface.

BK. The one or more non-transitory computer-readable media of paragraph BI or BJ, the operations further comprising: in response to receiving, from a host user computing device associated with the host organization identifier, a resource reconnection request comprising the disconnecting organization identifier and the resource identifier associated with the shared resource, updating the sharing approval repository to add a reconnection indication for the resource identifier in association with the disconnecting organization identifier.

BL. The one or more non-transitory computer-readable media of paragraph BK, the operations further comprising: in response to receiving another selection input associated with the resource identifier and the disconnecting organization identifier, causing rendering, to a user interface associated with the disconnecting organization identifier, the shared resource generated based at least in part on data stored in the live shared resource repository.

BM. The one or more non-transitory computer-readable media of paragraph BK or BL wherein the shared resource, at a time when the resource reconnection request is received, is associated with at least one other non-host organization identifier.

While the example clauses described above are described with respect to one particular implementation, it should be understood that, in the context of this document, the content of the example clauses can also be implemented via a method, device, system, a computer-readable medium, and/or another implementation. Additionally, any of examples A-BM may be implemented alone or in combination with any other one or more of the examples A-BM.

The invention claimed is:

1. A computer-implemented method for managing organization disconnections from a shared resource of a communication platform, wherein, in a sharing approval repository associated with the communication platform, the shared resource is associated with a host organization identifier and non-host organization identifier, the computer-implemented method comprising:
in response to receiving, from a user computing device, a resource disconnection request comprising a disconnecting organization identifier and a resource identifier associated with the shared resource, updating the sharing approval repository to add a disconnection indication for the resource identifier in association with the disconnecting organization identifier;
in response to the updating the sharing approval repository, deactivating at least one user associated with the disconnecting organization identifier from receiving updates associated with the shared resource;
in response to the updating the sharing approval repository, generating a static shared resource associated with a portion of a live shared resource repository associated with the shared resource at a time of the updating; and
in response to receiving a selection input associated with the resource identifier and the disconnecting organization identifier, causing rendering of the static shared resource to a user interface associated with the disconnecting organization identifier.

2. The computer-implemented method of claim 1, further comprising:
transmitting, to the user computing device, a disconnection authorization interface renderable for display by the user computing device, wherein the disconnection authorization interface is associated with the shared resource; and
causing generation of the resource disconnection request in response to admin user confirmation input generated in response to user engagement of the disconnection authorization interface.

3. The computer-implemented method of claim 1, further comprising:
retrieving a retention policy setting associated with the shared resource, wherein generating the static shared resource is based at least in part on the retention policy setting.

4. The computer-implemented method of claim 1, wherein the user computing device is associated with the host organization identifier, and wherein the resource disconnection request comprises the disconnecting organization identifier and an additional disconnecting organization identifier each associated with the resource identifier, and wherein updating the sharing approval repository comprises:
adding the disconnection indication for the resource identifier in association with the disconnecting organization identifier; and
adding an additional disconnection indication for the resource identifier in association with the additional disconnecting organization identifier.

5. The computer-implemented method of claim 1, wherein the shared resource is at least one of a channel, a direct message, a board, or a workspace.

6. The computer-implemented method of claim 1, further comprising:
in response to receiving, from a host user computing device associated with the host organization identifier, a resource reconnection request comprising the disconnecting organization identifier and the resource identifier associated with the shared resource, updating the sharing approval repository to add a reconnection indication for the resource identifier in association with the disconnecting organization identifier.

7. The computer-implemented method of claim 6, further comprising:
in response to receiving another selection input associated with the resource identifier and the disconnecting organization identifier, causing rendering, to a user interface associated with the disconnecting organization identifier, the shared resource generated based at least in part on data stored in the live shared resource repository.

8. The computer-implemented method of claim 6 wherein the shared resource, at a time when the resource reconnection request is received, is associated with at least one other non-host organization identifier.

9. A system comprising:

one or more processors; and one or more non-transitory computer-readable media storing instructions that, when executed by the one or more processors, cause the system to perform operations comprising:

associating, in a sharing approval repository associated with a communication platform, a host organization identifier and non-host organization identifier with a resource identifier associated with a shared resource;

in response to receiving, from a user computing device, a resource disconnection request comprising a disconnecting organization identifier and the resource identifier, updating the sharing approval repository to add a disconnection indication for the resource identifier in association with the disconnecting organization identifier;

in response to the updating the sharing approval repository, deactivating at least one user associated with the disconnecting organization identifier from receiving updates associated with the shared resource;

in response to the updating the sharing approval repository, generating a static shared resource associated with a portion of a live shared resource repository associated with the shared resource at a time of the updating; and in response to receiving a selection input associated with the resource identifier and the disconnecting organization identifier, causing rendering of the static shared resource to a user interface associated with the disconnecting organization identifier.

10. The system of claim 9, the operations further comprising:

transmitting, to the user computing device, a disconnection authorization interface renderable for display by the user computing device, wherein the disconnection authorization interface is associated with the shared resource; and causing generation of the resource disconnection request in response to admin user confirmation input generated in response to user engagement of the disconnection authorization interface.

11. The system of claim 9, the operations further comprising:

retrieving a retention policy setting associated with the shared resource, wherein generating the static shared resource is based at least in part on the retention policy setting.

12. The system of claim 9, wherein the shared resource is at least one of a channel, a direct message, a board, or a workspace.

13. The system of claim 9, the operations further comprising:

in response to receiving, from a host user computing device associated with the host organization identifier, a resource reconnection request comprising the disconnecting organization identifier and the resource identifier associated with the shared resource, updating the sharing approval repository to add a reconnection indication for the resource identifier in association with the disconnecting organization identifier.

14. The system of claim 13, the operations further comprising:

in response to receiving another selection input associated with the resource identifier and the disconnecting organization identifier, causing rendering, to a user interface associated with the disconnecting organization identifier, the shared resource generated based at least in part on data stored in the live shared resource repository.

15. The system of claim 13 wherein the shared resource, at a time when the resource reconnection request is received, is associated with at least one other non-host organization identifier.

16. One or more non-transitory computer-readable media storing instructions that, when executed by one or more processors, cause the one or more processors to perform operations comprising:

associating, in a sharing approval repository associated with a communication platform, a host organization identifier and non-host organization identifier with a resource identifier associated with a shared resource;

in response to receiving, from a user computing device, a resource disconnection request comprising a disconnecting organization identifier and the resource identifier, updating the sharing approval repository to add a disconnection indication for the resource identifier in association with the disconnecting organization identifier;

in response to the updating the sharing approval repository, deactivating at least one user associated with the disconnecting organization identifier from receiving updates associated with the shared resource;

in response to the updating the sharing approval repository, generating a static shared resource associated with a portion of a live shared resource repository associated with the shared resource at a time of the updating; and in response to receiving a selection input associated with the resource identifier and the disconnecting organization identifier, causing rendering of the static shared resource to a user interface associated with the disconnecting organization identifier.

17. The one or more non-transitory computer-readable media of claim 16, the operations further comprising:

transmitting, to the user computing device, a disconnection authorization interface renderable for display by the user computing device, wherein the disconnection authorization interface is associated with the shared resource; and causing generation of the resource disconnection request in response to admin user confirmation input generated in response to user engagement of the disconnection authorization interface.

18. The one or more non-transitory computer-readable media of claim 16, the operations further comprising:

in response to receiving, from a host user computing device associated with the host organization identifier, a resource reconnection request comprising the disconnecting organization identifier and the resource identifier associated with the shared resource, updating the sharing approval repository to add a reconnection indication for the resource identifier in association with the disconnecting organization identifier.

19. The one or more non-transitory computer-readable media of claim 18, the operations further comprising:

in response to receiving another selection input associated with the resource identifier and the disconnecting organization identifier, causing rendering, to a user interface associated with the disconnecting organization identifier, the shared resource generated based at least in part on data stored in the live shared resource repository.

20. The one or more non-transitory computer-readable media of claim 18 wherein the shared resource, at a time when the resource reconnection request is received, is associated with at least one other non-host organization identifier.

\* \* \* \* \*